US009291799B2

(12) United States Patent
Amanai et al.

(10) Patent No.: US 9,291,799 B2
(45) Date of Patent: Mar. 22, 2016

(54) ZOOM LENS, IMAGE PICKUP APPARATUS USING THE SAME, AND INFORMATION PROCESSING APPARATUS

(71) Applicant: OLYMPUS CORPORATION, Tokyo (JP)

(72) Inventors: Takahiro Amanai, Tokyo (JP); Kenichiro Abe, Tokyo (JP); Takuya Otsu, Tokyo (JP); Takashi Fujikura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 274 days.

(21) Appl. No.: 13/789,969

(22) Filed: Mar. 8, 2013

(65) Prior Publication Data

US 2013/0242156 A1  Sep. 19, 2013

(30) Foreign Application Priority Data

Mar. 16, 2012 (JP) ................. 2012-060438
Mar. 16, 2012 (JP) ................. 2012-060439
Mar. 16, 2012 (JP) ................. 2012-060440
Mar. 16, 2012 (JP) ................. 2012-060441
Jul. 10, 2012 (JP) ................. 2012-154402
Jul. 10, 2012 (JP) ................. 2012-154806
Jul. 10, 2012 (JP) ................. 2012-154809

(51) Int. Cl.
*G02B 15/14* (2006.01)
*G02B 13/04* (2006.01)
*G02B 15/177* (2006.01)

(52) U.S. Cl.
CPC .............. *G02B 13/04* (2013.01); *G02B 15/177* (2013.01)

(58) Field of Classification Search
CPC ............................. G02B 15/14; G02B 15/177
USPC .................................................. 359/683, 686
See application file for complete search history.

(56) References Cited

U.S. PATENT DOCUMENTS 6,954,311 B2   10/2005  Amanai
7,339,744 B2    3/2008  Hankawa et al.
(Continued)

FOREIGN PATENT DOCUMENTS

JP   2002-286987 A   10/2002
JP   2004-088713 A    3/2004
(Continued)

OTHER PUBLICATIONS

Japanese Patent Office Action in Japanese Patent Application No. 2012-060440, Sep. 24, 2015.

*Primary Examiner* — Scott J Sugarman
(74) *Attorney, Agent, or Firm* — Brosemer, Kolefas & Assoc. LLC

(57) ABSTRACT

A zoom lens includes in order from an object side, a first lens group having a negative refractive power, a second lens group having a positive refractive power, a third lens group having a negative refractive power, and a fourth lens group having a positive refractive power, and at the time of zooming, the first lens group is fixed, the second lens group moves, the third lens group moves, and the fourth lens group is fixed. The first lens group includes in order from the object side, a negative lens, a reflecting optical element, and a positive lens. The second lens group includes in order from the object side, an aperture stop, a positive lens, a cemented lens having a negative refractive power, and a positive lens. The cemented lens includes a positive lens and a negative lens.

39 Claims, 34 Drawing Sheets

(56) References Cited

U.S. PATENT DOCUMENTS

| | | |
|---|---|---|
| 7,379,250 B2 | 5/2008 | Souma |
| 7,443,599 B2 | 10/2008 | Kohno et al. |
| 7,458,735 B2 | 12/2008 | Souma et al. |
| 2004/0066561 A1* | 4/2004 | Nagata et al. ................. 359/676 |
| 2006/0221212 A1* | 10/2006 | Hankawa et al. .......... 348/240.2 |
| 2010/0165480 A1* | 7/2010 | Yamaguchi et al. .......... 359/686 |
| 2012/0026603 A1 | 2/2012 | Wang et al. |
| 2012/0188436 A1 | 7/2012 | Ozaki |
| 2012/0307372 A1* | 12/2012 | Ichikawa ............. G02B 15/177 359/680 |

FOREIGN PATENT DOCUMENTS

| | | |
|---|---|---|
| JP | 2006-284790 A | 10/2006 |
| JP | 2006-343554 A | 12/2006 |
| JP | 2007-093955 A | 4/2007 |
| JP | 2007-232974 A | 9/2007 |
| JP | 2007-279147 A | 10/2007 |
| JP | 2009-216941 A | 9/2009 |
| JP | 2010-152143 A | 7/2010 |
| JP | 2011-112992 A | 6/2011 |
| WO | 2011/145288 A1 | 11/2011 |

* cited by examiner

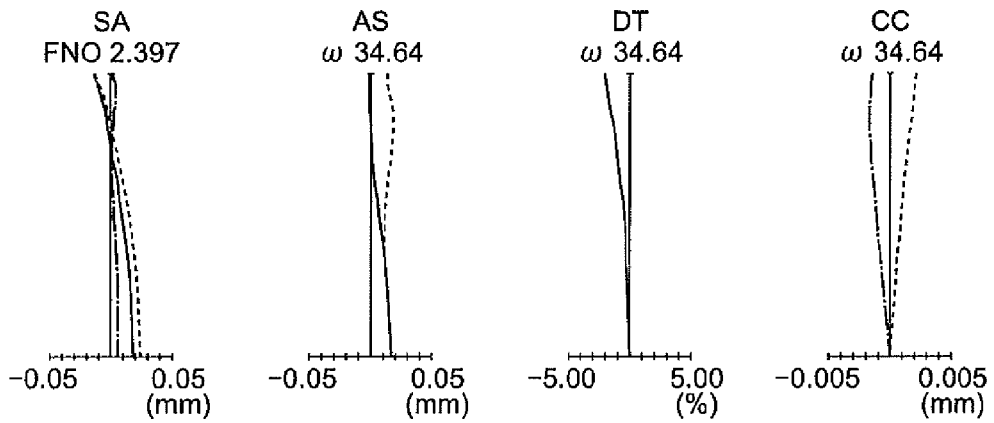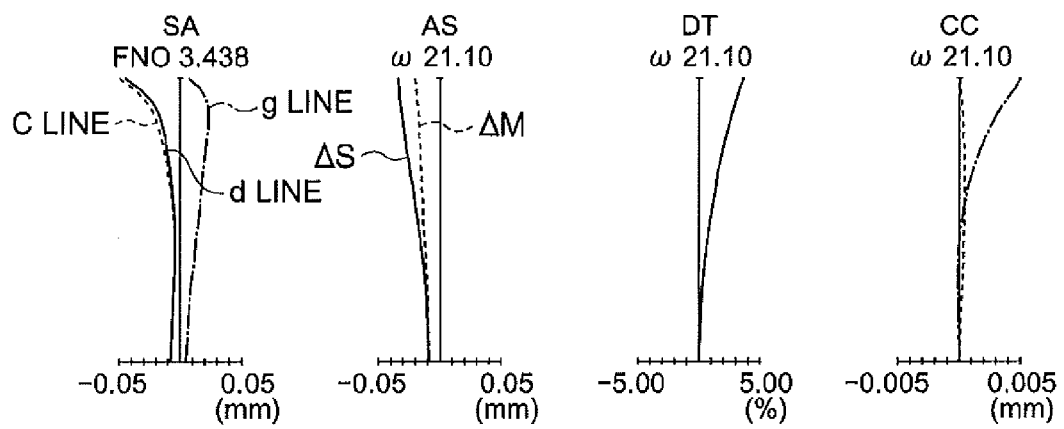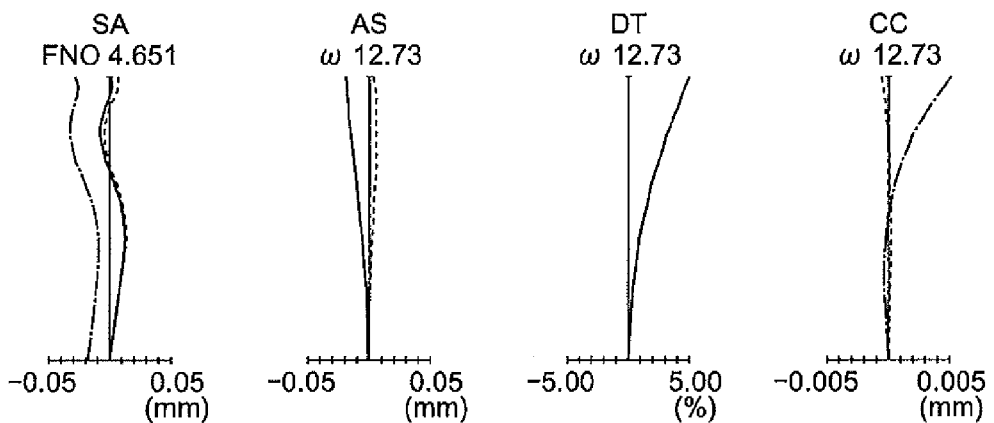

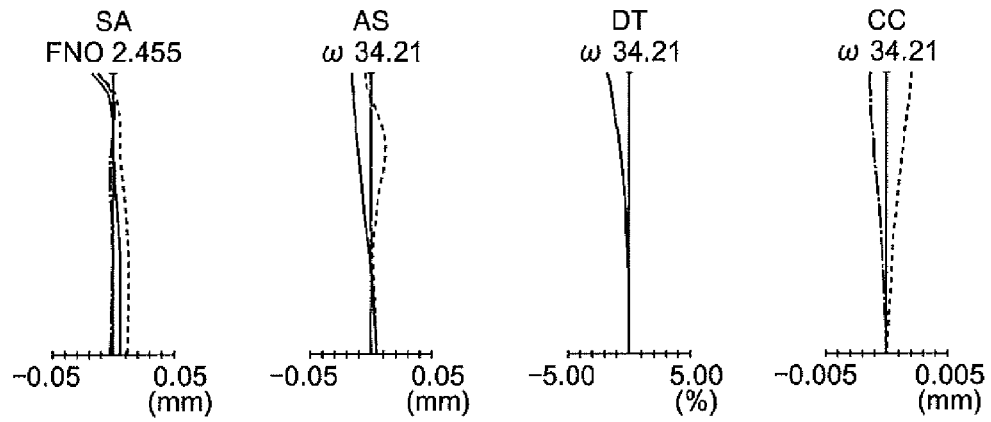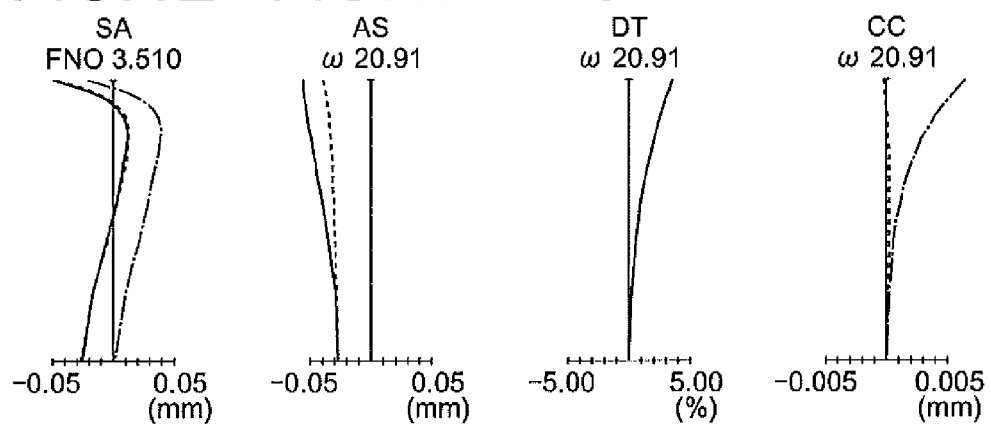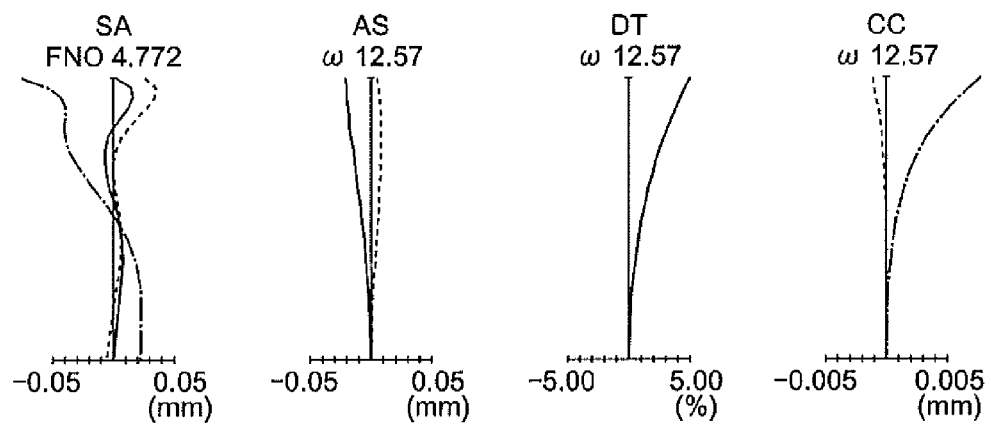

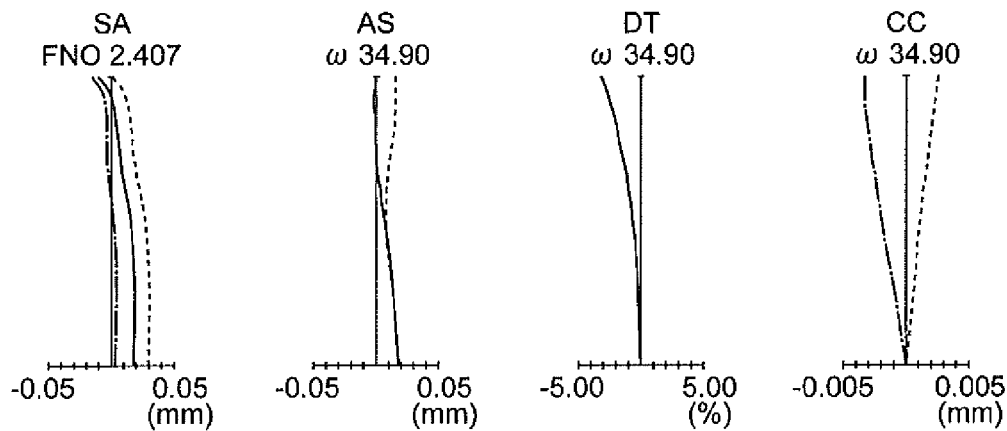
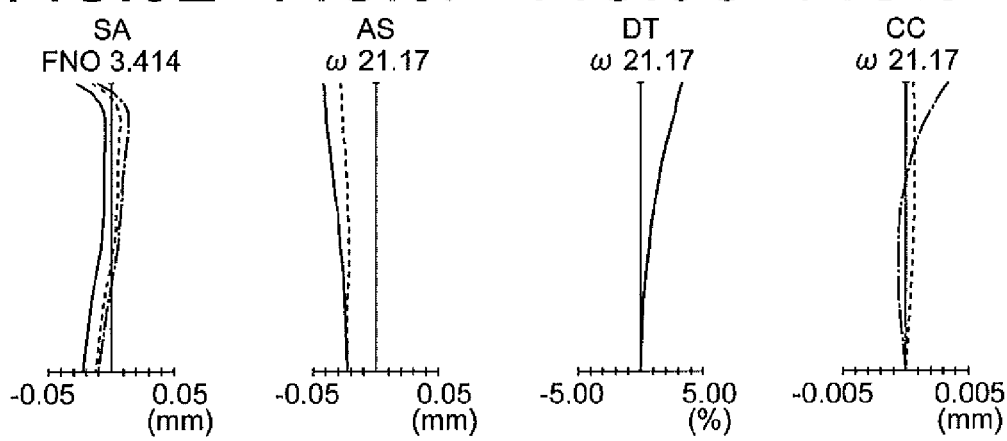
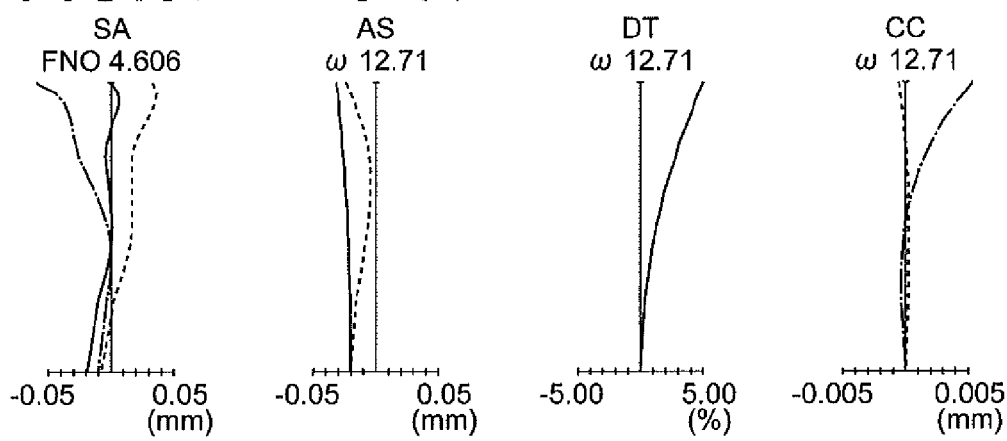

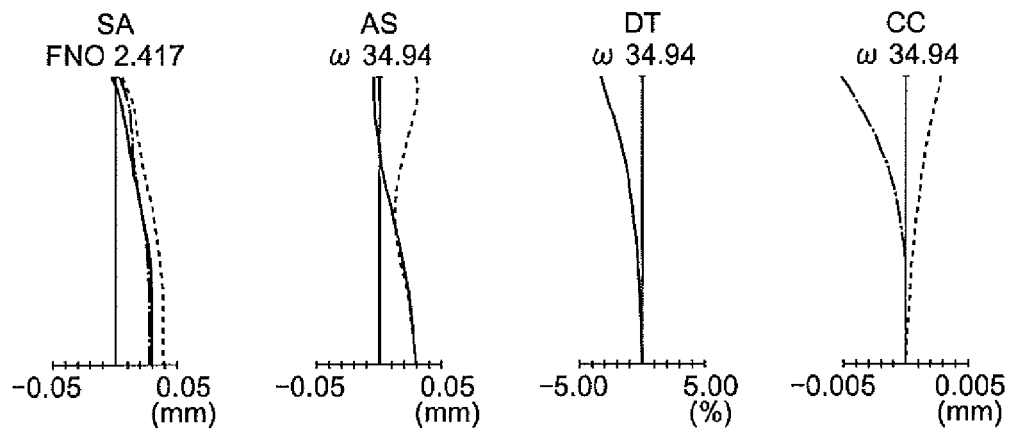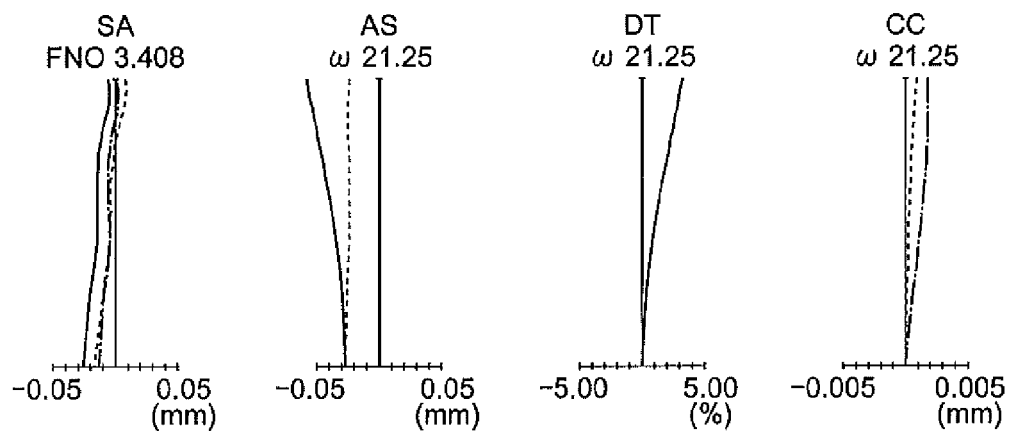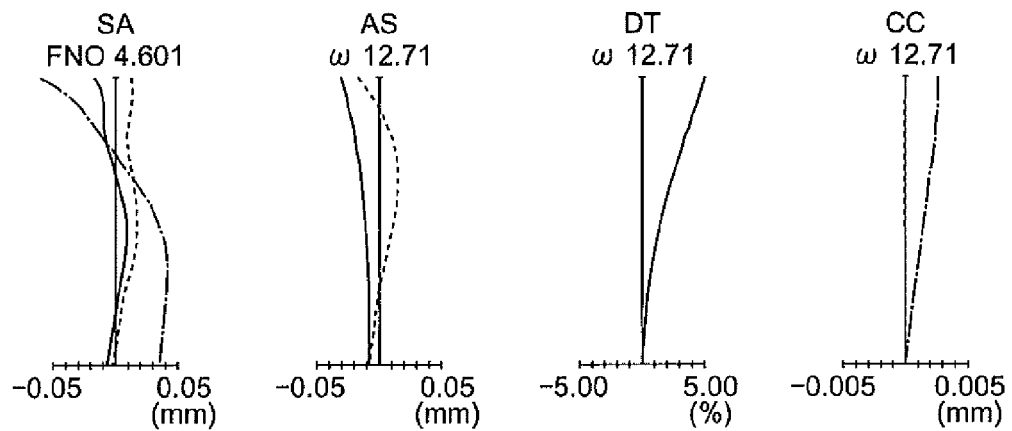

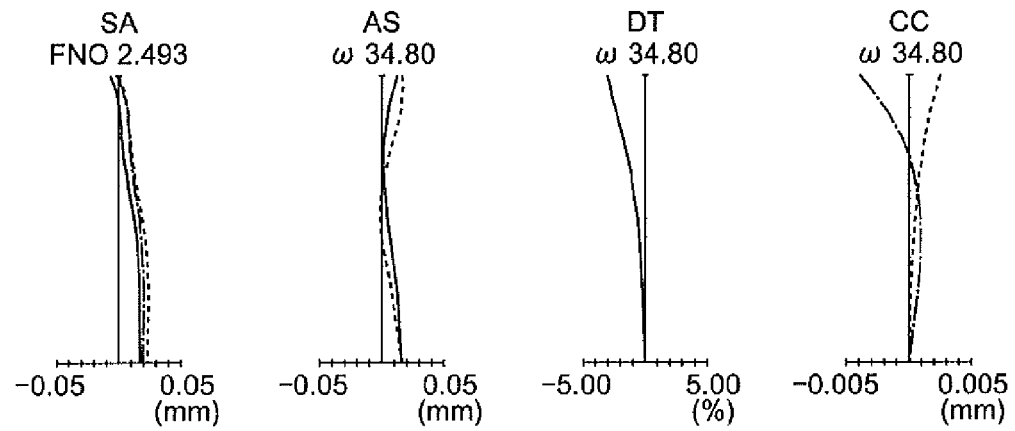
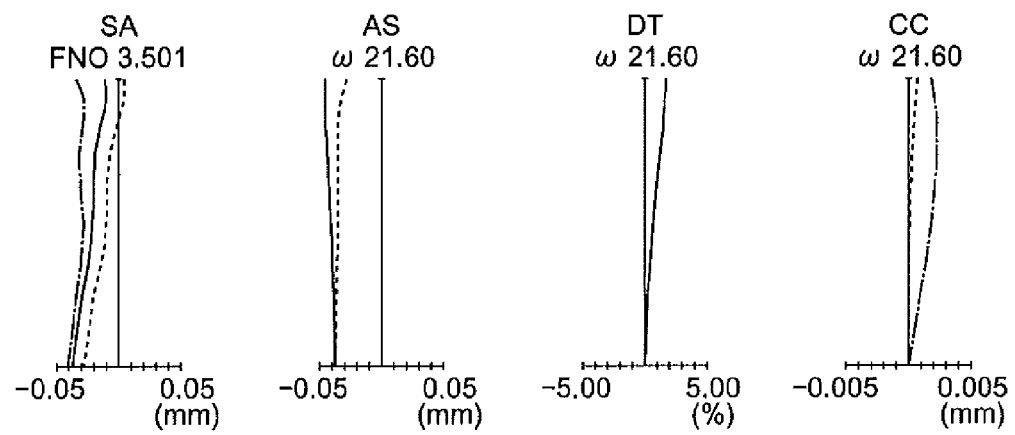
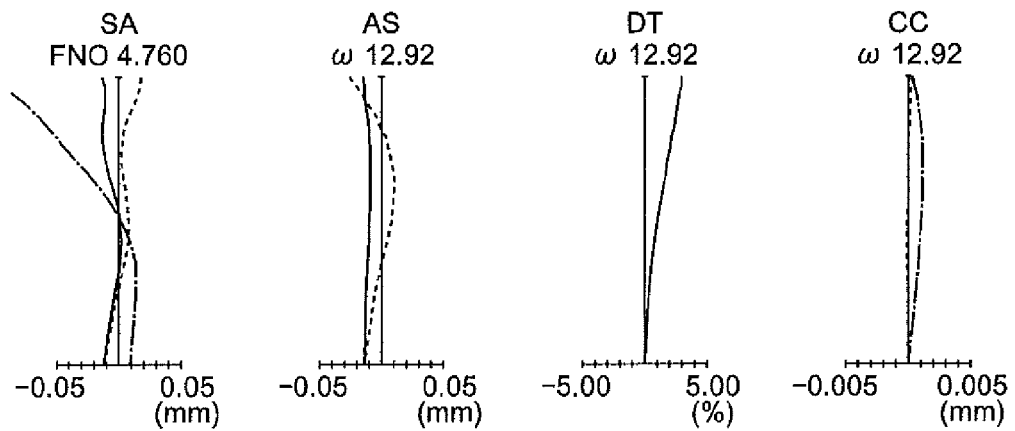

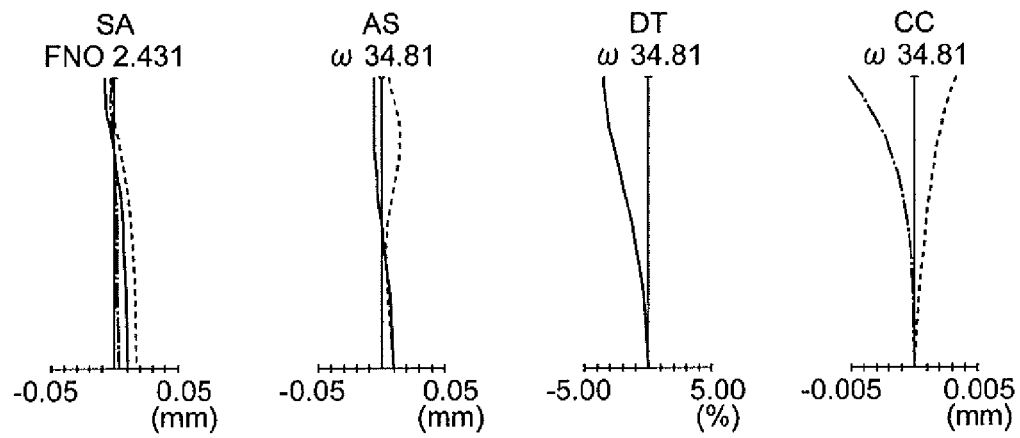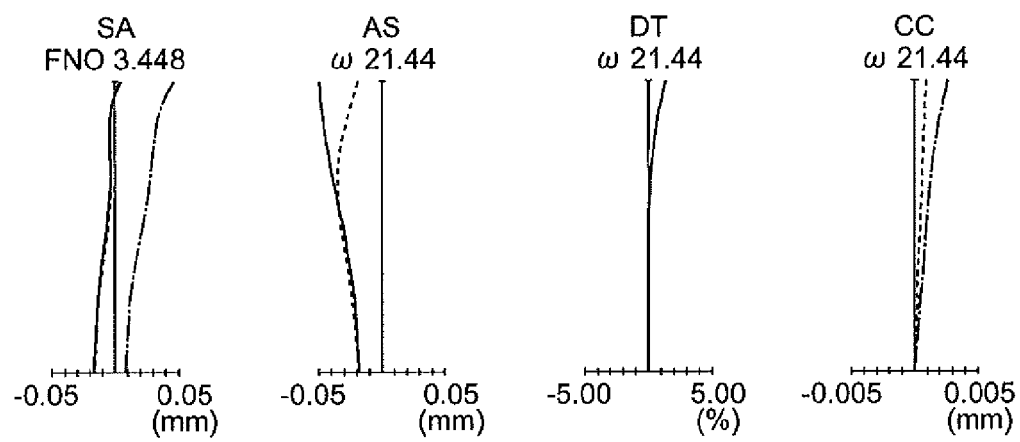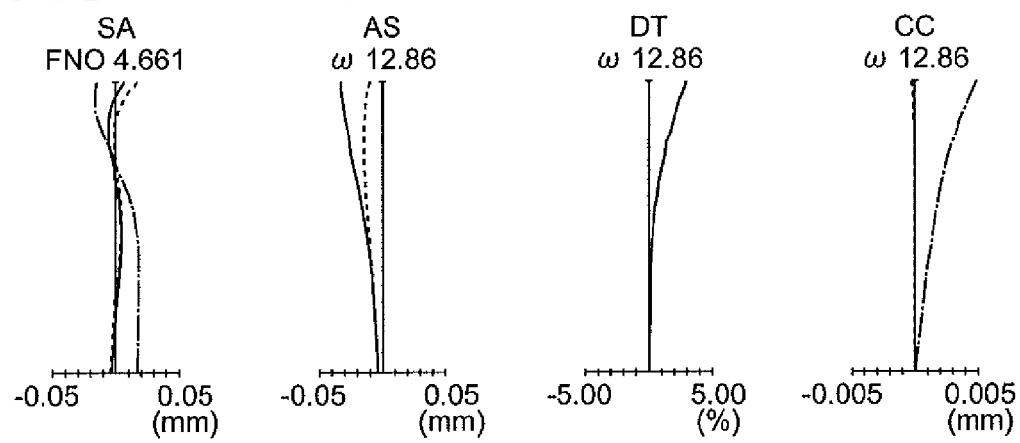

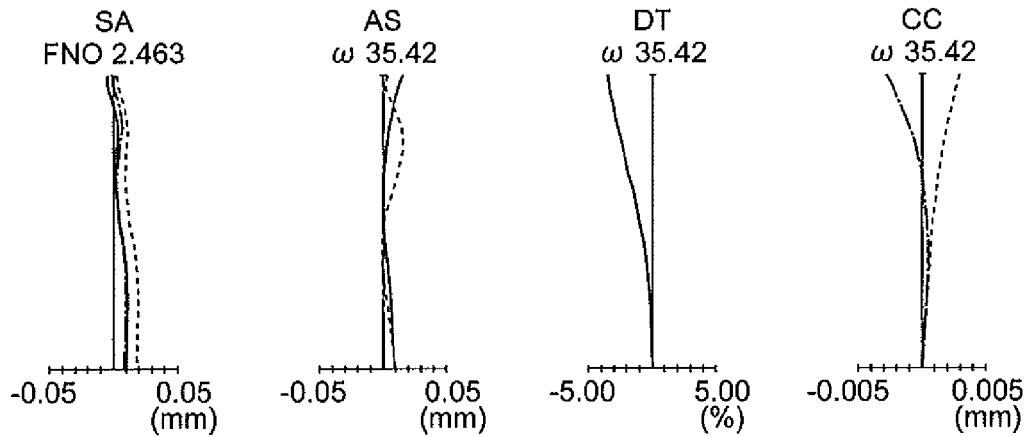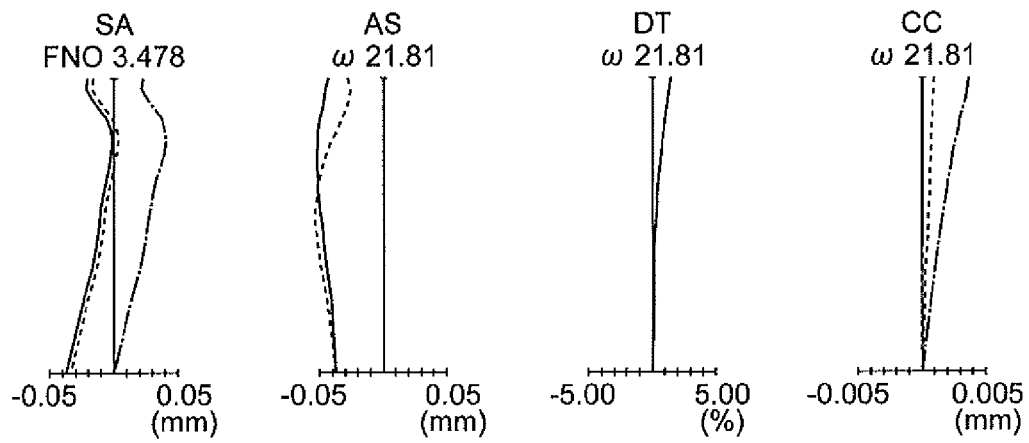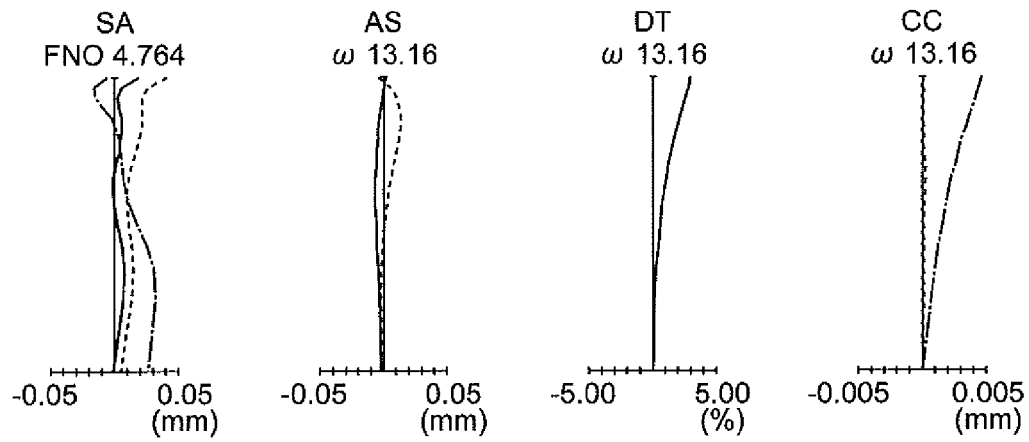

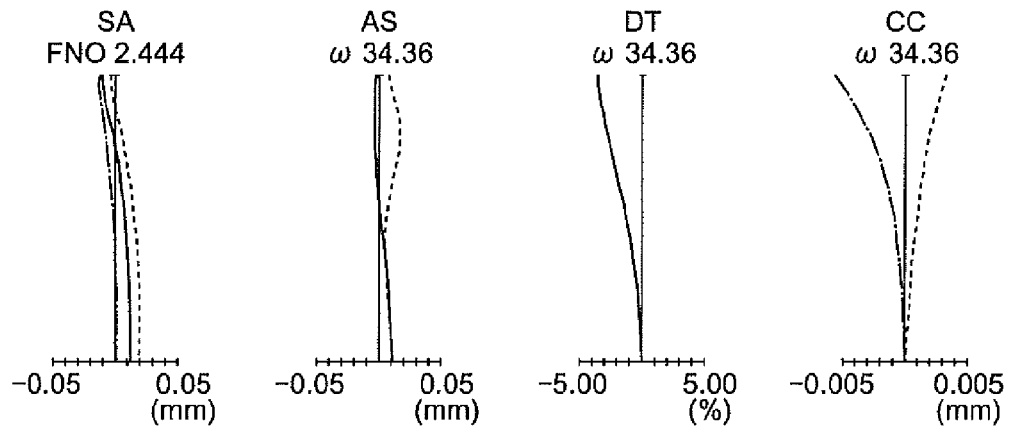
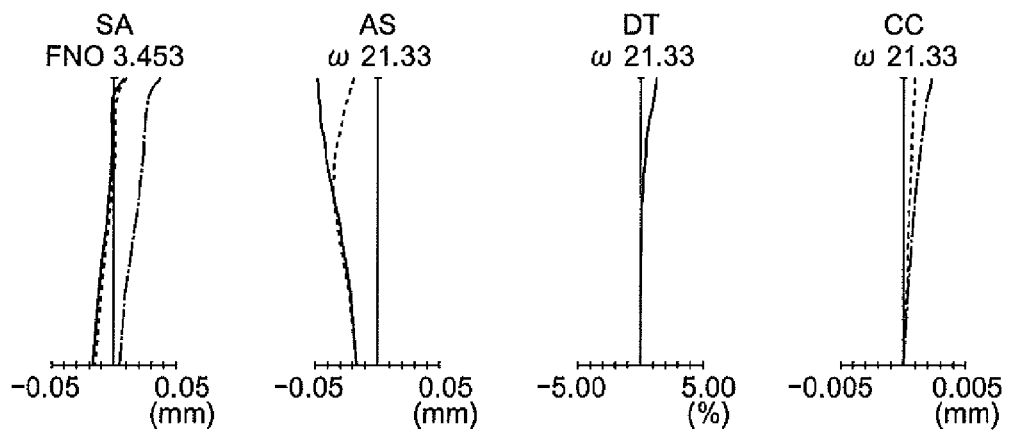
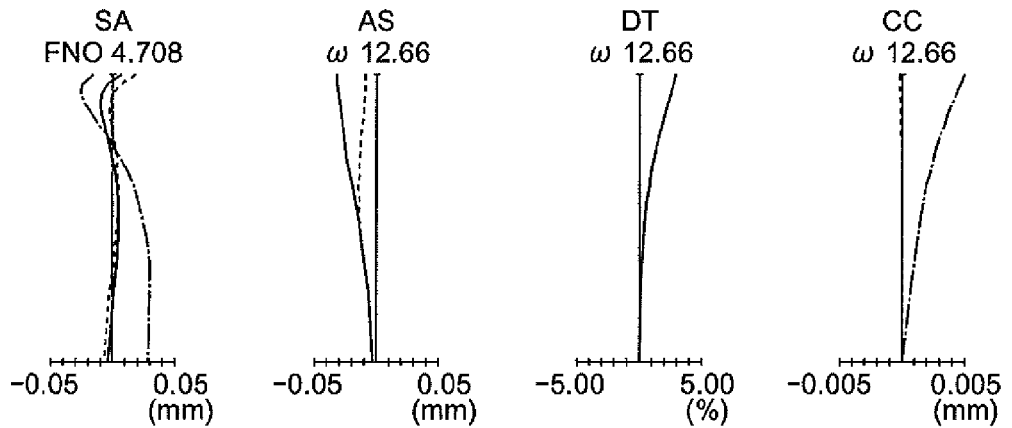

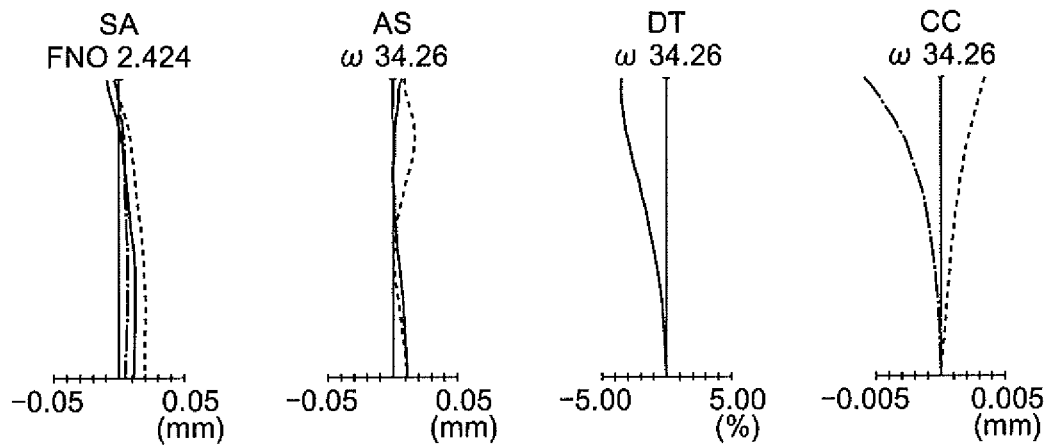
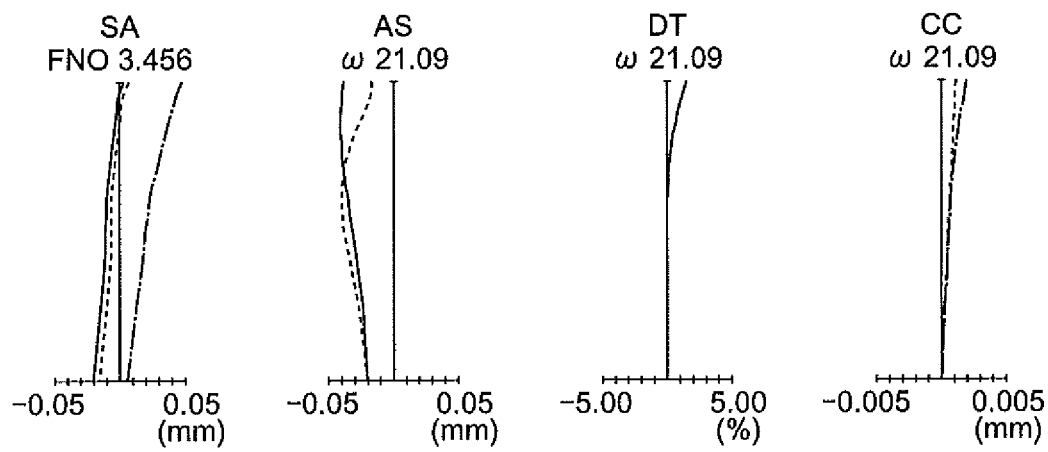
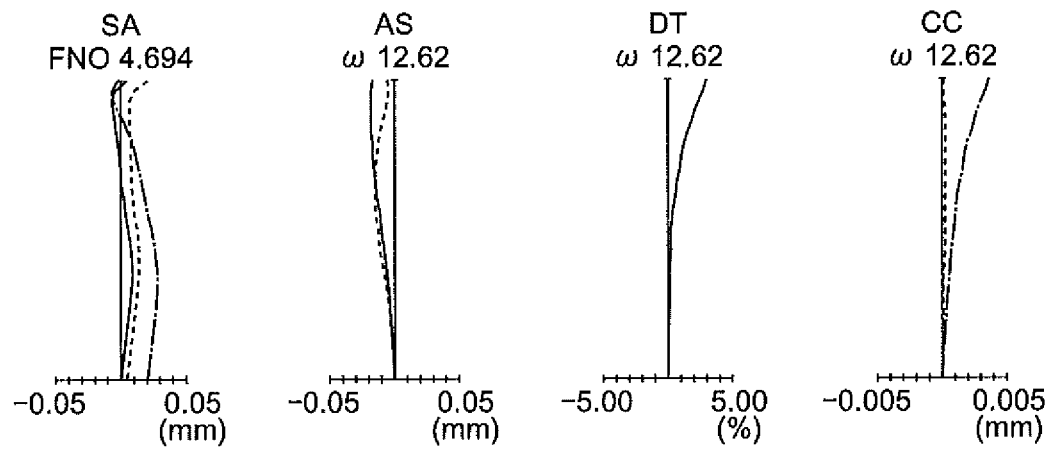

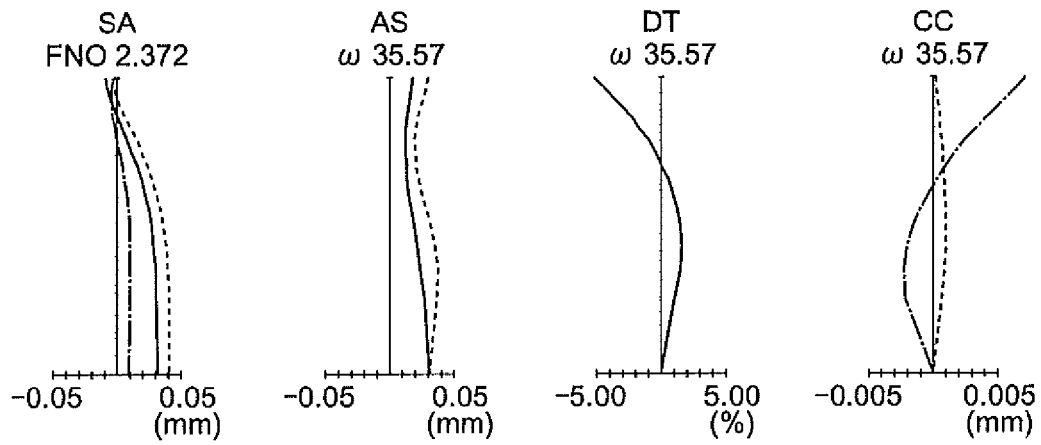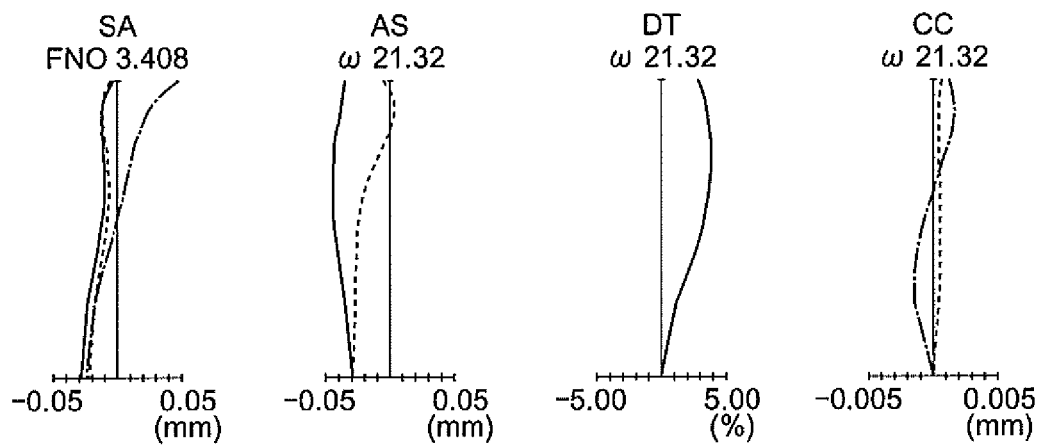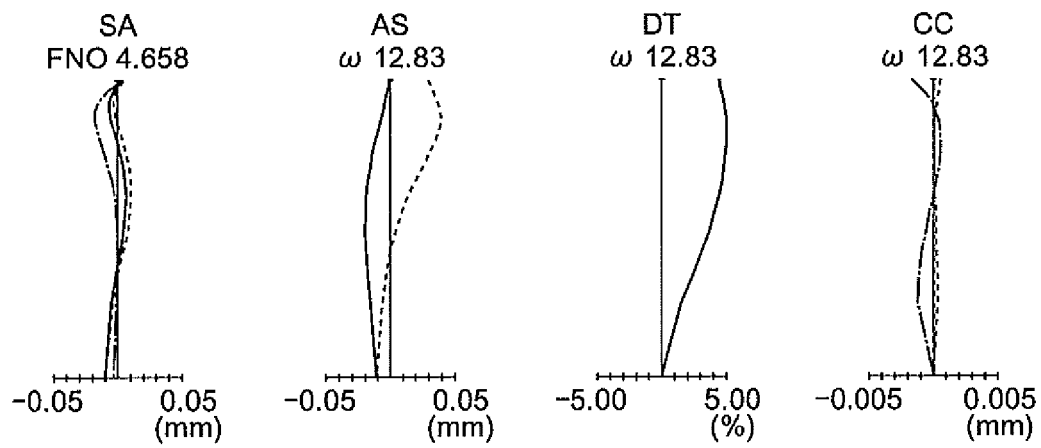

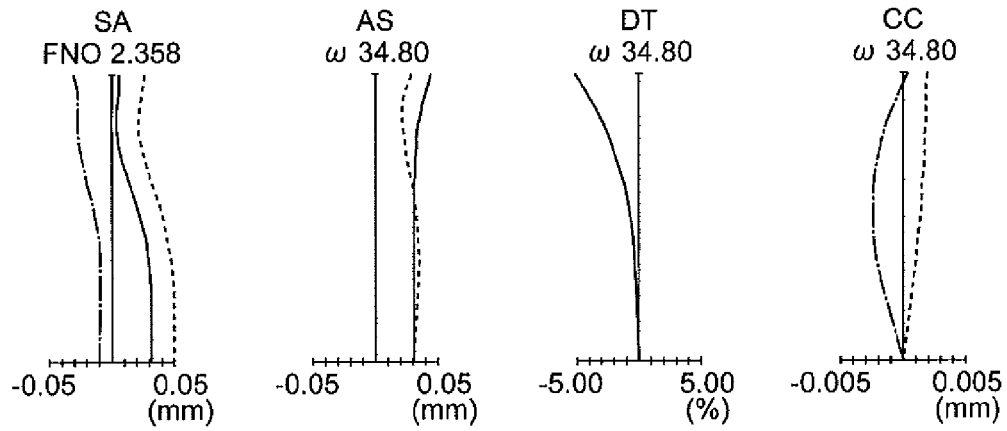
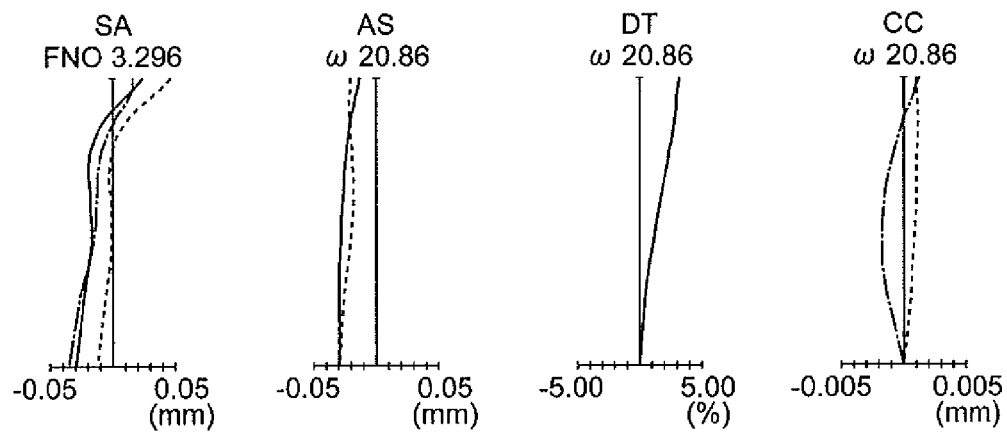
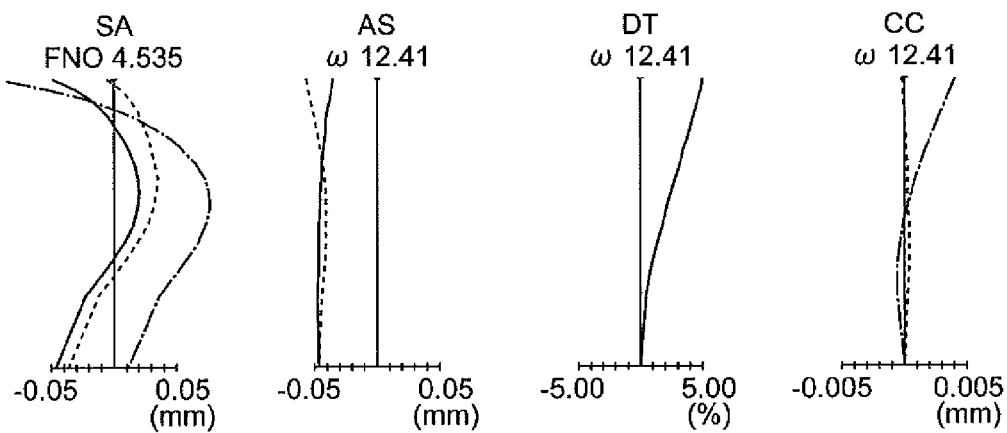

FIG. 32A
FIG. 32B
FIG. 32C
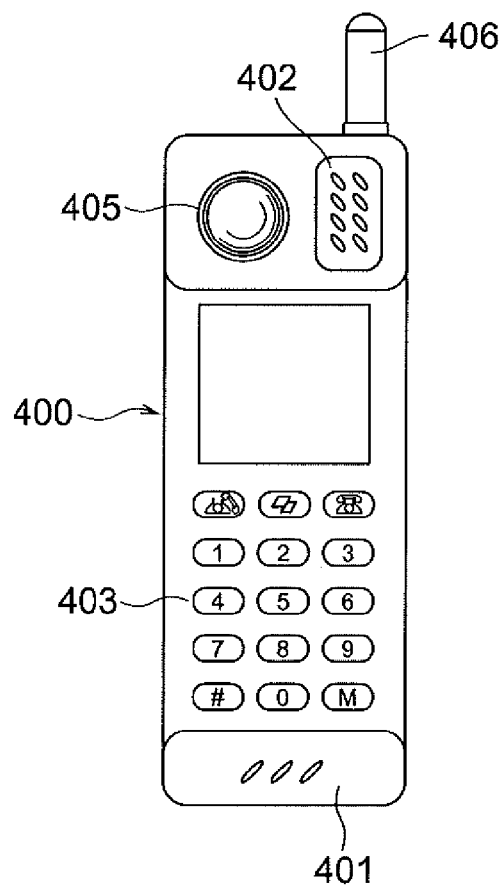
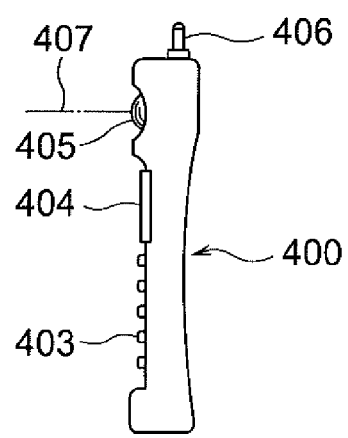
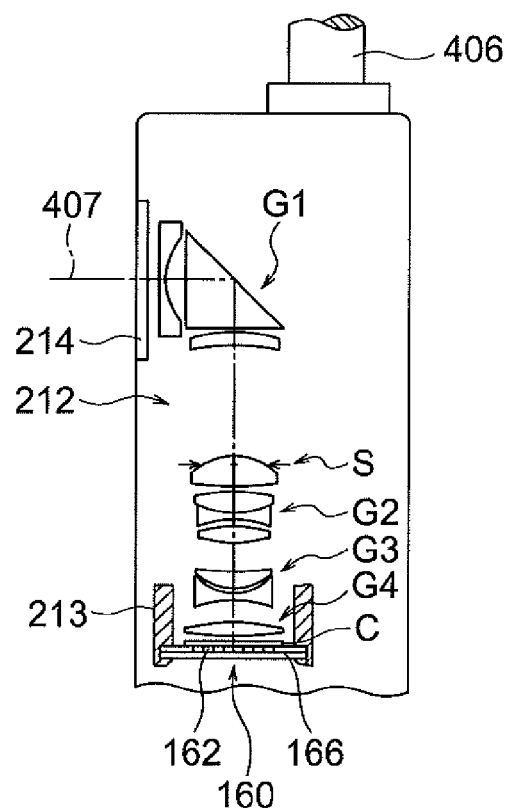

ZOOM LENS, IMAGE PICKUP APPARATUS USING THE SAME, AND INFORMATION PROCESSING APPARATUS

CROSS-REFERENCE TO RELATED APPLICATION

The present invention is based upon and claims the benefit of priority from the prior Japanese Patent Applications Nos. 2012-060438 filed on Mar. 16, 2012; 2012-060439 filed on Mar. 16, 2012; 2012-060440 filed on Mar. 16, 2012; 2012-060441 filed on Mar. 16, 2012; 2012-154402 filed on Jul. 10, 2012; 2012-154806 filed on Jul. 10, 2012; and 2012-154809 filed on Jul. 10, 2012; the entire contents of which are incorporated herein by reference.

BACKGROUND OF THE INVENTION

1. Field of the Invention

The present invention relates to a zoom lens, an image pickup apparatus using the same, and an information processing apparatus.

2. Description of the Related Art

In compact cameras, with narrowing of image pixels of an image pickup element, there has been increase in the number of pixels. When an attempt is made to improve a performance of an optical system to cope with narrowing of the pixel pitch, an effect of a diffraction limit becomes unignorable. In other words, a size of a light spot becomes larger than a size of a pixel. To eliminate such state, it is necessary to make an aperture of the optical system large, or in other words, to make an F-number small. While it is sought that the aperture of the optical system becomes large, it is sought that the optical system is small-size and then with a high imaging performance.

As an optical system having a comparatively large aperture, a bending variable power optical system (zoom lens system) which includes four lens groups has been disclosed in Japanese Patent Application Laid-open Publication No. 2009-216941 and Japanese Patent Application Laid-open Publication No. 2010-152143. The abovementioned bending variable power optical system includes in order from an object side, a first lens group having a negative refractive power, a second lens group having a positive refractive power, a third lens group having a negative refractive power, and a fourth lens group having a positive refractive power. Moreover, an optical element (prism) which bends an optical path has been disposed in the first lens group.

Here, the F-number of the optical system at a wide angle end is approximately 3.0 in the bending variable power optical system disclosed in the Japanese Patent Application Laid-open Publication No. 2009-216941, and approximately 3.4 in the bending variable power optical system disclosed in the Japanese Patent Application Laid-open Publication No. 2010-152143.

SUMMARY OF THE INVENTION

A zoom lens according to an aspect of the present invention comprises in order from an object side,
a first lens group having a negative refractive power,
a second lens group having a positive refractive power,
a third lens group having a negative refractive power, and
a fourth lens group having a positive refractive power, and
at the time of zooming, the first lens group is fixed, the second lens group moves, the third lens group moves, and the fourth lens group is fixed, and
the first lens group comprises in order from the object side, a negative lens, a reflecting optical element, and a positive lens.

A zoom lens according to another aspect of the present invention comprises in order from an object side,
a first lens group having a negative refractive power,
a second lens group having a positive refractive power,
a third lens group having a negative refractive power, and
a fourth lens group having a positive refractive power, and
at the time of zooming, the first lens group is fixed, the second lens group moves, the third lens group moves, and the fourth lens group is fixed, and
the first lens group comprises a reflecting optical element, and
one of the lens group which constitute the zoom lens includes a plurality of lens components, and
at least one of the plurality of lens components is an integrated lens in which, a light transmission portion and a holding portion are integrated, and
the holding portion is provided to an outer periphery of the light transmission portion, and has a protruding portion which is formed in a direction along a central axis of the light transmission portion, and
at least one of the plurality of lens components other than the integrated lens is held via the protruding portion.

An image pickup apparatus according to an aspect of the present invention includes a zoom lens, and an image pickup element which has an image pickup surface.

BRIEF DESCRIPTION OF THE DRAWINGS

FIG. 1A is a cross-sectional view at a wide angle end, FIG. 1B is a cross-sectional view of an intermediate state, and FIG. 1C is a cross-sectional view at a telephoto end;

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L (hereinafter, 'FIG. 2A to FIG. 2L') are diagrams showing spherical aberration (SA), astigmatism (AS), distortion (DT), and chromatic aberration of magnification (CC) at the time of infinite object point focusing of the zoom lens according to the first example, where, FIG. 2A, FIG. 2B, FIG. 2C, and FIG. 2D show a state at the wide angle end, FIG. 2E, FIG. 2F, FIG. 2G, and FIG. 2H show an intermediate state, and FIG. 2I, FIG. 2J, FIG. 2K, and FIG. 2L show a state at the telephoto end;

FIG. 3A is a cross-sectional view at a wide angle end, FIG. 3B is a cross-sectional view of an intermediate state, and FIG. 3C is a cross-sectional view at a telephoto end;

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L (hereinafter, 'FIG. 4A to FIG. 4L') are diagrams showing spherical aberration (SA), astigmatism (AS), distortion (DT), and chromatic aberration of magnification (CC) at the time of infinite object point focusing of the zoom lens according to the second example, where, FIG. 4A, FIG. 4B, FIG. 4C, and FIG. 4D show a state at the wide angle end, FIG. 4E, FIG. 4F, FIG. 4G, and FIG. 4H show an intermediate state, and FIG. 4I, FIG. 4J, FIG. 4K, and FIG. 4L show a state at the telephoto end;

FIG. 5A is a cross-sectional view at a wide angle end, FIG. 5B is a cross-sectional view of an intermediate state, and FIG. 5C is a cross-sectional view at a telephoto end;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L (hereinafter, 'FIG. 6A to FIG. 6L') are diagrams showing spherical aberration (SA), astigmatism (AS), distortion (DT), and chromatic aberration of magnification (CC) at the time of infinite object point focusing of the zoom lens according to the third example, where, FIG. 6A, FIG. 6B, FIG. 6C, and FIG. 6D show a state at the wide angle end, FIG. 6E, FIG. 6F, FIG. 6G, and FIG. 6H show an intermediate state, and FIG. 6I, FIG. 6J, FIG. 6K, and FIG. 6L show a state at the telephoto end;

FIG. 7A is a cross-sectional view at a wide angle end, FIG. 7B is a cross-sectional view of an intermediate state, and FIG. 7C is a cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L (hereinafter, 'FIG. 8A to FIG. 8L') are diagrams showing spherical aberration (SA), astigmatism (AS), distortion (DT), and chromatic aberration of magnification (CC) at the time of infinite object point focusing of the zoom lens according to the fourth example, where, FIG. 8A, FIG. 8B, FIG. 8C, and FIG. 8D show a state at the wide angle end, FIG. 8E, FIG. 8F, FIG. 8G, and FIG. 8H show an intermediate state, and FIG. 8I, FIG. 8J, FIG. 8K, and FIG. 8L show a state at the telephoto end;

FIG. 9A is a cross-sectional view at a wide angle end, FIG. 9B is a cross-sectional view of an intermediate state, and FIG. 9C is a cross-sectional view at a telephoto end;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L (hereinafter, 'FIG. 10A to FIG. 10L') are diagrams showing spherical aberration (SA), astigmatism (AS), distortion (DT), and chromatic aberration of magnification (CC) at the time of infinite object point focusing of the zoom lens according to the fifth example, where, FIG. 10A, FIG. 10B, FIG. 10C, and FIG. 10D show a state at the wide angle end, FIG. 10E, FIG. 10F, FIG. 10G, and FIG. 10H show an intermediate state, and FIG. 10I, FIG. 10J, FIG. 10K, and FIG. 10L show a state at the telephoto end;

FIG. 11A is a cross-sectional view at a wide angle end, FIG. 11B is a cross-sectional view of an intermediate state, and FIG. 11C is a cross-sectional view at a telephoto end;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L') are diagrams showing spherical aberration (SA), astigmatism (AS), distortion (DT), and chromatic aberration of magnification (CC) at the time of infinite object point focusing of the zoom lens according to the sixth example, where, FIG. 12A, FIG. 12B, FIG. 12C, and FIG. 12D show a state at the wide angle end, FIG. 12E, FIG. 12F, FIG. 12G, and FIG. 12H show an intermediate state, and FIG. 12I, FIG. 12J, FIG. 12K, and FIG. 12L show a state at the telephoto end;

FIG. 13A is a cross-sectional view at a wide angle end, FIG. 13B is a cross-sectional view of an intermediate state, and FIG. 13C is a cross-sectional view at a telephoto end;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L (hereinafter, 'FIG. 14A to FIG. 14L') are diagrams showing spherical aberration (SA), astigmatism (AS), distortion (DT), and chromatic aberration of magnification (CC) at the time of infinite object point focusing of the zoom lens according to the seventh example, where, FIG. 14A, FIG. 14B, FIG. 14C, and FIG. 14D show a state at the wide angle end, FIG. 14E, FIG. 14F, FIG. 14G, and FIG. 14H show an intermediate state, and FIG. 14I, FIG. 14J, FIG. 14K, and FIG. 14L show a state at the telephoto end;

FIG. 15A is a cross-sectional view at a wide angle end, FIG. 15B is a cross-sectional view of an intermediate state, and FIG. 15C is a cross-sectional view at a telephoto end;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L (hereinafter, 'FIG. 16A to FIG. 16L') are diagrams showing spherical aberration (SA), astigmatism (AS), distortion (DT), and chromatic aberration of magnification (CC) at the time of infinite object point focusing of the zoom lens according to the eighth example, where, FIG. 16A, FIG. 16B, FIG. 16C, and FIG. 16D show a state at the wide angle end, FIG. 16E, FIG. 16F, FIG. 16G, and FIG. 16H show an intermediate state, and FIG. 16I, FIG. 16J, FIG. 16K, and FIG. 16L show a state at the telephoto end;

FIG. 17A is a cross-sectional view at a wide angle end, FIG. 17B is a cross-sectional view of an intermediate state, and FIG. 17C is a cross-sectional view at a telephoto end;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L (hereinafter, 'FIG. 18A to FIG. 18L') are diagrams showing spherical aberration (SA), astigmatism (AS), distortion (DT), and chromatic aberration of magnification (CC) at the time of infinite object point focusing of the zoom lens according to the ninth example, where, FIG. 18A, FIG. 18B, FIG. 18C, and FIG. 18D show a state at the wide angle end, FIG. 18E, FIG. 18F, FIG. 18G, and FIG. 18H show an intermediate state, and FIG. 18I, FIG. 18J, FIG. 18K, and FIG. 18L show a state at the telephoto end;

FIG. 19A is a cross-sectional view at a wide angle end, FIG. 19B is a cross-sectional view of an intermediate state, and FIG. 19C is a cross-sectional view at a telephoto end;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L (hereinafter, 'FIG. 20A to FIG. 20L') are diagrams showing spherical aberration (SA), astigmatism (AS), distortion (DT), and chromatic aberration of magnification (CC) at the time of infinite object point focusing of the zoom lens according to the tenth example, where, FIG. 20A, FIG. 20B, FIG. 20C, and FIG. 20D show a state at the wide angle end, FIG. 20E, FIG. 20F, FIG. 20G, and FIG. 20H show an intermediate state, and FIG. 20I, FIG. 20J, FIG. 20K, and FIG. 20L show a state at the telephoto end;

FIG. 21A is a cross-sectional view at a wide angle end, FIG. 21B is a cross-sectional view of an intermediate state, and FIG. 21C is a cross-sectional view at a telephoto end;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L (hereinafter, 'FIG. 22A to FIG. 22L') are diagrams showing spherical aberration (SA), astigmatism (AS), distortion (DT), and chromatic aberration of magnification (CC) at the time of infinite object point focusing of the zoom lens according to the eleventh example, where, FIG. 22A, FIG. 22B, FIG. 22C, and FIG. 22D show a state at the wide angle end, FIG. 22E, FIG. 22F, FIG. 22G, and FIG. 22H show an intermediate state, and FIG. 22I, FIG. 22J, FIG. 22K, and FIG. 22L show a state at the telephoto end;

FIG. 25A is a diagram showing a structure of the integrated lens, and FIG. 25B, FIG. 25C, and FIG. 25D are diagrams showing an arrangement of lens groups including the integrated lens;

FIG. 32A, FIG. 32B, and FIG. 32C are diagrams showing a portable telephone which is an example of the information processing apparatus in which, the zoom lens according to the present invention has been built-in as a photographic optical system, where, FIG. 32A is a front view of a portable telephone 400, FIG. 32B is a side view of the portable telephone 400, and FIG. 32C is a cross-sectional view of the photographic optical system 405;

DETAILED DESCRIPTION OF THE INVENTION

Figure 1A:
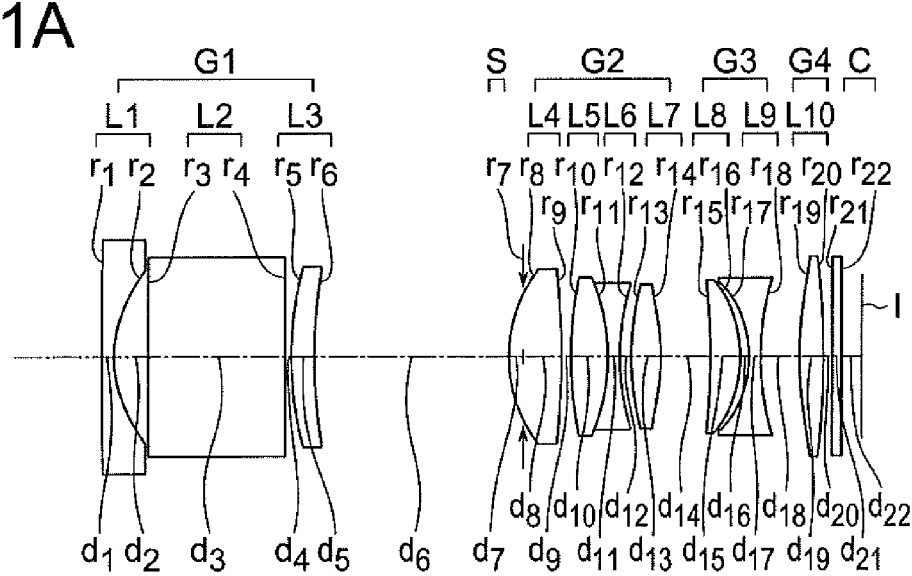
FIG. 1A, FIG. 1B, and FIG. 1C are cross-sectional views along an optical axis showing an optical arrangement of a zoom lens according to a first example of the present invention, at the time of infinite object point focusing, where.

Exemplary embodiments of a zoom lens, an image pickup apparatus, and an information processing apparatus according to the present invention will be described below in detail while referring to the accompanying diagrams. However, the present invention is not restricted to the embodiments described below. A lens for which, a paraxial focal length is a positive value will be let to be a positive lens and a lens for which, the paraxial focal length is a negative value will be let to be a negative lens. Moreover, in the following description, an optical system means a zoom lens.

A zoom lens according to a first aspect of the present embodiment comprises in order from an object side, a first lens group having a negative refractive power, a second lens group having a positive refractive power, a third lens group having a negative refractive power, and a fourth lens group having a positive refractive power, and at the time of zooming, the first lens group is fixed, the second lens group moves, the third lens group moves, and the fourth lens group is fixed, and the first lens comprises in order from the object side, a negative lens, a reflecting optical element, and a positive lens.

In the zoom lens according to the first aspect of the present embodiment, a negative-lead type arrangement, or in other words, an arrangement in which, a refractive power of the first lens group is let to be negative has been adopted as an arrangement of lens groups. Moreover, at the time of zooming, the second lens group and the third lens group are moved, and the first lens group and the fourth lens group are fixed (let to be stationary). Here, it is preferable to move the second lens group and the third lens group in the same direction. For instance, when both the second lens group and the third lens group are moved toward the object side, it is possible to position the third lens group in a space after the second lens group has moved. In such manner, since it is possible to share the same space by a plurality of lens groups, shortening of an overall length of the optical system becomes possible.

Moreover, the first lens group includes in order from the object side, the negative lens, the reflecting optical element, and the positive lens. When such an arrangement is made, since it is possible to bring a position of an entrance pupil closer to the object side, it is possible to make an outer diameter of the first lens group small. As a result, it is possible to achieve both of maintaining of a favorable imaging performance and slimming of the optical system. The reflecting optical element is either a prism or a mirror, and is used for bending an optical path. Moreover, in the first lens group, it is preferable that only one positive lens is disposed on the image side of the prism. However, the number of lenses, which is disposed on the image side of the prism, is not restricted to one. If an image-side lens of the prism is divided, since a space for disposing the lenses is necessary, a principal plane of whole lenses after divided becomes distant from the negative lens which is positioned on the object side of the prism. By making the arrangement as mentioned in the first embodiment, since a distance between the principal planes (of the negative lens positioned on front side of the prism and the positive lens positioned on rear side of the prism), becomes close, it is possible to correct a longitudinal chromatic aberration and a chromatic aberration of magnification in a balanced manner.

Moreover, the second lens group includes in order from the object side, an aperture stop, a positive lens, a cemented lens having a negative refractive power, and a positive lens, and the cemented lens includes a positive lens and a negative lens.

A spherical aberration and a coma are susceptible to occur near the aperture stop. Therefore, by arranging the second lens group which is positioned near the aperture stop, as described above, it is possible to suppress an occurrence of the spherical aberration and the coma. As a result, it is possible to achieve a large aperture of the optical system while maintaining the favorable imaging performance.

Moreover, since the aperture stop moves together with the second lens group at the time of zooming, an F-number of the optical system fluctuates with zooming. Since the third lens group also moves at the time of zooming, the third lens group also has an effect on the fluctuation of the F-number. Here, when a refractive power of the second lens group is large, the fluctuation of the F-number depends mainly on the second lens group. Therefore, by making the refractive power of the second lens group large, it is possible to make small the effect on the fluctuation of the F-number due to moving of the third lens group.

In the zoom lens according to the first aspect of the present embodiment, since the second lens group is arranged as described above, it is possible to make the refractive power of the second lens group large while suppressing the occurrence of the spherical aberration and the coma. Accordingly, since it becomes possible to reduce a fluctuation of a combined focal length of the lens groups on the image side of the aperture stop (the lens groups from the second lens group onward), it is possible to make small the fluctuation of the F-number with zooming, which is a drawback of the negative-lead type.

Moreover, in the zoom lens according to the first aspect of the present embodiment, it is preferable that the following conditional expression (1) is satisfied.

$$1.1 \leq \phi_{1o}/\phi_{2o} \leq 1.8 \tag{1}$$

where, $\phi_{1o}$ denotes half of an effective aperture at a lens surface nearest to the object side in the first lens group, and $\phi_{2o}$ denotes half of an effective aperture at a lens surface nearest to the object side in the second lens group.

When an aperture of the optical system is made large, since a radius of the second lens group including the aperture stop becomes large, a thickness of the overall optical system increases. When an angle of view is widened to avoid the thickening of the overall optical system, it is possible to make the aperture stop small provided that the F-number is same. However, on the other hand, since the first lens group becomes large with the widening of the angle of view, the thickness of the overall optical system becomes large. Therefore, for achieving both of the increase in the size of the aperture of the optical system and small-sizing of the optical system, it is desirable that the conditional expression (1) is satisfied. It is desirable that the conditional expression (1) is satisfied in a bending optical system in particular. An effective aperture means the maximum diameter of a bundle of rays which passes through a lens surface.

When an upper limit value of conditional expression (1) is surpassed, a thickness of the second lens group becomes large. Whereas, when a lower limit value of conditional expression (1) is not reached, a thickness of the first lens group becomes large. Therefore, in both the cases, the size of the overall the optical system becomes large.

It is more preferable that the following conditional expression (1') is satisfied instead of conditional expression (1).

$$1.3 \leq \phi_{1o}/\phi_{2o} \leq 1.6 \tag{1'}$$

Furthermore, it is even more preferable that the following conditional expression (1'') is satisfied instead of conditional expression (1).

$$1.4 \leq \phi_{1o}/\phi_{2o} \leq 1.5 \tag{1''}$$

Moreover, in the zoom lens according to the first embodiment, it is preferable that the third lens group includes a positive lens and a negative lens, and the following conditional expression (2) is satisfied.

$$0 \leq n_{3p} - n_{3n} \leq 0.20 \tag{2}$$

where, $n_{3p}$ denotes a refractive index for a d-line of the positive lens in the third lens group, and $n_{3n}$ denotes a refractive index for a d-line of the negative lens in the third lens group.

Figure 23:
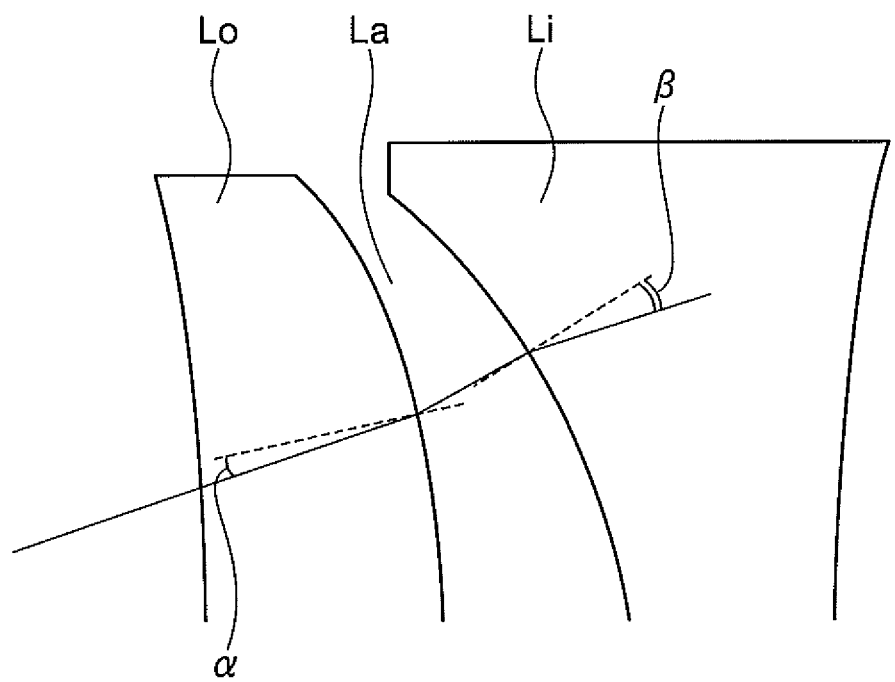
FIG. 23 is a diagram showing how an off-axis ray passes through an air lens, and showing angles α and β.

The third lens group includes the positive lens and the negative lens. Therefore, when the two lenses are disposed to be separated, an air lens La is formed between the two lenses as shown in FIG. 23. In FIG. 23, a lens Lo on the object side is a positive lens and a lens Li on an image side is a negative lens. Moreover, α and β are angles made with an off-axis ray and a normal of a lens surface respectively. Here, α is an angle on an image-side lens surface of the lens Lo on the object side, and β is an angle on the object-side lens surface of the lens Li on the image side. The lens Lo on the object side may be a negative lens and the lens Li on the image side may be a positive lens.

Here, when an amount of minute change in the angle α is let to be Δα and an amount of minute change in the angle β is let to be Δβ, and a difference in the amount of minute change in the angles α and β is let to be |Δα−Δβ|, smaller α difference in refractive indices of the two lenses, smaller is |Δα−Δβ|. Consequently, when the difference in the refractive indices of the two lenses is kept to be small, even when there is a decentering of the two lenses, it is possible to suppress |Δα−Δβ| to a small value. As a result, it is possible to reduce a degradation of the imaging performance of the optical system.

Particularly, since a depth of focus becomes small in an optical system having a large aperture, the imaging performance is degraded when there is a decentering. Therefore, as to how the sensitivity with respect to a decentering error is to be made small becomes important. By satisfying conditional expression (2), it becomes possible to make the sensitivity with respect to the decentering error small.

When an upper limit value of conditional expression (2) is surpassed, since a difference in the refractive indices of the positive lens and the negative lens becomes excessively large, the sensitivity with respect to the decentering error becomes large. As a result, an astigmatism and a curvature of field become large. Whereas, when a lower limit value of conditional expression (2) is not reached, since Petzval's sum becomes large, the curvature of field becomes large. As a result, the imaging performance of the optical system is degraded.

It is more preferable that the following conditional expression (2') is satisfied instead of conditional expression (2).

$$0 \leq n_{3p} - n_{3n} \leq 0.15 \tag{2'}$$

Furthermore, it is even more preferable that the following conditional expression (2'') is satisfied instead of conditional expression (2).

$$0 \leq n_{3p} - n_{3n} \leq 0.12 \tag{2''}$$

Moreover, in the zoom lens according to the first aspect of the present embodiment, it is preferable that the following conditional expression (3) is satisfied.

$$1.8 \leq \Delta_{2G}/\phi_{1o} \leq 2.6 \tag{3}$$

where, $\Delta_{2G}$ denotes an amount of movement of the second lens group when moved from a wide angle end to a telephoto end, and φ₁ₒ denotes half of an effective aperture at a lens surface nearest to the object side in the first lens group.

As it has been mentioned above, the F-number fluctuates with zooming. When the fluctuation of the F-number is large, since the F-number at a telephoto end becomes large, a resolution is degraded at the telephoto end. Therefore, it is desirable to make the amount of movement of the second lens group appropriate, or in other words, to satisfy conditional expression (3).

When an upper limit value of conditional expression (3) is surpassed, the amount of movement of the second lens group becomes excessively large with respect to the effective aperture of the first lens group. In such a case, since the fluctuation in the F-number becomes large, a high resolution cannot be achieved at the telephoto end. Whereas, when a lower limit value of conditional expression (3) is not reached, the amount of movement of the second lens group becomes small, but the refractive power of the second lens group becomes large. Therefore, an amount of occurrence of the spherical aberration and the coma increases. As a result, the imaging performance of the optical system is degraded. Moreover, since the first lens group becomes excessively large, the size of the overall optical system becomes large.

It is more preferable that the following conditional expression (3') is satisfied instead of conditional expression (3).

$$1.9 \leq \Delta_{2G}/\phi_{1o} \leq 2.4 \quad (3')$$

Furthermore, it is even more preferable that the following conditional expression (3") is satisfied instead of conditional expression (3).

$$2.0 \leq \Delta_{2G}/\phi_{1o} \leq 2.2 \quad (3'')$$

Moreover, in the zoom lens according to the first aspect of the present embodiment, it is preferable that the third lens group includes a lens on the object side and a lens on an image side, and the following conditional expression (4) is satisfied.

$$-0.4 \leq (r_{3oi} - r_{3io})/(r_{3oi} + r_{3io}) \leq 0.4 \quad (4)$$

where, $r_{3oi}$ denotes a paraxial radius of curvature of an image-side surface of a lens on the object side in the third lens group, and $r_{3io}$ denotes a paraxial radius of curvature of an object-side surface of a lens on an image side in the third lens group.

As it has been mentioned while describing conditional expression (2), for making the sensitivity with respect to the decentering error small, it is preferable to make the difference $|\Delta\alpha - \Delta\beta|$ in the amount of minute change small. Here, smaller a difference in the paraxial radii of curvature of the lens on the object side and the lens on the image side, it is possible to make $|\Delta\alpha - \Delta\beta|$ small. Consequently, when the difference between the paraxial radii of curvature of the two lenses is kept small, even when there is a decentering between the two lenses, it is possible to suppress $|\Delta\alpha - \Delta\beta|$ to a small value. As a result, it is possible to reduce the degradation of the imaging performance of the optical system.

When an upper limit value of conditional expression (4) is surpassed, or when a lower limit value of conditional expression (4) is not reached, since the difference in the paraxial radii of curvature of the two lens surfaces becomes excessively large, it becomes difficult to make the sensitivity with respect to the decentering error small. As a result, the imaging performance of the optical system is degraded.

It is more preferable that the following conditional expression (4') is satisfied instead of conditional expression (4).

$$-0.3 \leq (r_{3oi} - r_{3io})/(r_{3oi} + r_{3io}) \leq 0.3 \quad (4')$$

Furthermore, it is even more preferable that the following conditional expression (4") is satisfied instead of conditional expression (4).

$$-0.2 \leq (r_{3oi} - r_{3io})/(r_{3oi} + r_{3io}) \leq 0.25 \quad (4'')$$

Moreover, in the zoom lens according to the first aspect of the present embodiment, it is preferable that the following conditional expression (5) is satisfied.

$$n_{ave} \leq 1.75 \quad (5)$$

where, $n_{ave}$ denotes an average value of a refractive index calculated from all lenses positioned on an image side of the first lens group.

As it has been mentioned above, since the depth of focus becomes small in the optical system having a large aperture, the sensitivity may be said to be higher even with respect to a manufacturing error. Here, the manufacturing error is an error in a shape (radius of curvature, waviness) of a lens surface at the time of manufacturing. When there is an error in the shape of the lens surface, the imaging performance is degraded, and the higher refractive index of the lens is, the larger degradation of the imaging performance due to the error becomes. Therefore, it is preferable to satisfy conditional expression (5).

By satisfying conditional expression (5), an overall refractive index of the lens which is on the image side of the aperture stop becomes small. Accordingly, since the number of lenses for which the sensitivity with respect to the error in the shape of the lens surface is small becomes large, it is possible to reduce the degradation of the imaging performance of the optical system.

It is more preferable that the following conditional expression (5') is satisfied instead of conditional expression (5).

$$n_{ave} \leq 1.70 \quad (5')$$

Furthermore, it is even more preferable that the following conditional expression (5") is satisfied instead of conditional expression (5).

$$n_{ave} \leq 1.65 \quad (5'')$$

Moreover, in the zoom lens according to the first aspect of the present embodiment, it is preferable that the following conditional expression (6) is satisfied.

$$0.7 \leq \Delta_{3G}/\Delta_{2G} \leq 1.2 \quad (6)$$

where, $\Delta_{2G}$ denotes an amount of movement of the second lens group when moved from a wide angle end to a telephoto end, and $\Delta_{3G}$ denotes an amount of movement of the third lens group when moved from the wide angle end to the telephoto end.

By satisfying conditional expression (6), it is possible to make small the fluctuation of the F-number with zooming.

When an upper limit value of conditional expression (6) is surpassed, the amount of movement of the third lens group at the time of zooming becomes excessively large. Whereas, when a lower limit value of conditional expression (6) is not reached, the amount of movement of the second lens group at the time of zooming becomes excessively large. When the amount of movement of the second lens group or the amount of movement of the third lens group becomes excessively large, since the fluctuation in a combined focal length of the lens groups on the image side of the aperture stop becomes large, the fluctuation in the F-number becomes large.

It is more preferable that the following conditional expression (6') is satisfied instead of conditional expression (6).

$$0.8 \leq \Delta_{3G}/\Delta_{2G} \leq 1.1 \quad (6')$$

Furthermore, it is even more preferable that the following conditional expression (6″) is satisfied instead of conditional expression (6).

$$0.85 \leq \Delta_{3G}/\Delta_{2G} \leq 1.0 \quad (6'')$$

Moreover, in the zoom lens according to the first aspect of the present embodiment, it is preferable that the following conditional expression (7) is satisfied.

$$-10 \leq f_{1i}/f_{1o} \leq -2 \quad (7)$$

where, $f_{1o}$ denotes a focal length of a lens on the object side in the first lens group, and $f_{1i}$ denotes a focal length of a lens on an image side in the first lens group.

Conditional expression (7) is an expression which is preferable to achieve both, the size of the first lens group and aberration correction in a balanced manner while being an optical system with a large aperture.

When an upper limit value of conditional expression (7) is surpassed, since a focal length of the lens nearest to the image side becomes excessively short, an occurrence of the chromatic aberration of magnification at the wide angle end becomes large. As a result, it leads to a degradation of resolution even at the wide angle end. Whereas, when a lower limit value of conditional expression (7) is not reached, since the focal length of the lens nearest to the image side becomes excessively long, the size of the first lens group becomes large.

It is more preferable that the following conditional expression (7′) is satisfied instead of conditional expression (7).

$$-8 \leq f_{1i}/f_{1o} \leq -4 \quad (7')$$

Furthermore, it is even more preferable that the following conditional expression (7″) is satisfied instead of conditional expression (7).

$$-7 \leq f_{1i}/f_{1o} \leq 5 \quad (7'')$$

Moreover, in the zoom lens according to the first aspect of the present embodiment, it is preferable that the following conditional expression (8) is satisfied.

$$-1.5 \leq f_1/(f_w \times f_t)^{1/2} \leq -0.7 \quad (8)$$

where, $f_1$ denotes a focal length of the first lens group, $f_w$ denotes a focal length of an overall zoom lens system at a wide angle end, and $f_t$ denotes a focal length of the overall zoom lens system at a telephoto end.

Conditional expression (8) is a conditional expression which is preferable for suppressing the occurrence of the spherical aberration, the coma, and the chromatic aberration of magnification while being the optical system with a large aperture.

When an upper limit value of conditional expression (8) is surpassed, the focal length of the first lens group with respect to a zoom ratio becomes excessively short (the refractive power becomes excessively large). As a result, since a height of light rays which are incident on the lens groups on the image side of the aperture stop becomes high, the spherical aberration and the coma are susceptible to occur. Moreover, it is disadvantageous also for slimming. Furthermore, the F-number at the telephoto end becomes large. Whereas, when a lower limit value of conditional expression (8) is not reached, the focal length of the first lens group with respect to the zoom ratio becomes excessively long (the refractive power becomes excessively small). As a result, correction of the coma and the chromatic aberration of magnification which occur in the lens group on the image side of the aperture stop cannot be carried out sufficiently.

It is more preferable that the following conditional expression (8′) is satisfied instead of conditional expression (8).

$$-1.3 \leq f_1/(f_w \times f_t)^{1/2} \leq -0.9 \quad (8')$$

Furthermore, it is even more preferable that the following conditional expression (8″) is satisfied instead of conditional expression (8).

$$-1.2 \leq f_1/(f_w \times f_t)^{1/2} \leq -1.0 \quad (8'')$$

Moreover, in the zoom lens according to the first aspect of the present embodiment, it is preferable that the following conditional expression (9) is satisfied.

$$0.5 \leq f_2/(f_w \times f_t)^{1/2} \leq 1.5 \quad (9)$$

where, $f_2$ denotes a focal length of the second lens group, $f_w$ denotes a focal length of an overall zoom lens system at a wide angle end, and $f_t$ denotes a focal length of the overall zoom lens system at a telephoto end.

Conditional expression (9) is a conditional expression which is preferable for suppressing the fluctuation in the F-number with zooming, and for suppressing an occurrence of the spherical aberration and the coma.

When an upper limit value of conditional expression (9) is surpassed, the focal length of the second lens group becomes excessively long (the refractive power becomes excessively small) with respect to the zoom ratio. As a result, since the amount of movement of the second lens group at the time of zooming increases, the fluctuation in the F-number with zooming becomes large. Moreover, apart from the small-sizing of the optical system becoming difficult, the F-number at the telephoto end becomes large. Whereas, when a lower limit value of conditional expression (9) is not reached, since the focal length of the second lens group becomes excessively short (the refractive power becomes excessively large) with respect to the zoom ratio, the spherical aberration and the coma occur.

It is more preferable that the following conditional expression (9′) is satisfied instead of conditional expression (9).

$$0.6 \leq f_2/(f_w \times f_t)^{1/2} \leq 1.4 \quad (9')$$

Furthermore, it is even more preferable that the following conditional expression (9″) is satisfied instead of conditional expression (9).

$$0.7 \leq f_2/(f_w \times f_t)^{1/2} \leq 1.3 \quad (9'')$$

Moreover, in the zoom lens according to the first aspect of the present embodiment, it is preferable that the following conditional expression (10) is satisfied.

$$0.53 \leq (Fno_w \times Fno_t)^{1/2}/(f_w \times f_t)^{1/2} \leq 0.65 \quad (10)$$

where, $Fno_w$ denotes an F-number of the zoom lens at a wide angle end, $Fno_t$ denotes an F-number of the zoom lens at a telephoto end, $f_w$ denotes a focal length of an overall zoom lens system at the wide angle end, and $f_t$ denotes a focal length of the overall zoom lens system at the telephoto end.

When the fluctuation of the F-number with zooming is large, since the F-number at the telephoto end becomes large, it leads to a degradation of resolution at the telephoto end. Consequently, it is desirable that the conditional expression (10) is satisfied.

When an upper limit value of conditional expression (10) is surpassed, since the F-number at the telephoto end becomes excessively large, it leads to the degradation of resolution at the telephoto end. Whereas, when a lower limit value of conditional expression (10) is not reached, since the F-number at the wide angle end becomes excessively small, the depth of focus becomes excessively small. As a result, it leads to a degradation of resolution due to a manufacturing error as it has been described in the description of conditional expression (5).

It is more preferable that the following conditional expression (10') is satisfied instead of conditional expression (10).

$$0.54 \leq (Fno_w \times Fno_t)^{1/2}/(f_w \times f_t)^{1/2} \leq 0.63 \quad (10')$$

Furthermore, it is even more preferable that the following conditional expression (10") is satisfied instead of conditional expression (10).

$$0.55 \leq (Fno_w \times Fno_t)^{1/2}/(f_w \times f_t)^{1/2} \leq 0.62 \quad (10'')$$

Moreover, in the zoom lens according to the first aspect of the present embodiment, it is preferable that the following conditional expression (11) is satisfied.

$$-20 < (r_{1po} + r_{1pi})/(r_{1po} - r_{1pi}) < -1.5 \quad (11)$$

where, $r_{1po}$ denotes a paraxial radius of curvature of an object-side surface of the positive lens in the first lens group, and $r_{1pi}$ denotes a paraxial radius of curvature of an image-side surface of the positive lens in the first lens group.

With the aperture of the optical system becoming large, occurrence of the spherical aberration and the coma becomes remarkable. Conditional expression (11) is a conditional expression which is preferable for suppressing the occurrence of the spherical aberration and the coma.

When an upper limit value of conditional expression (11) is surpassed, since the paraxial radius of curvature of the object-side surface of the positive lens and the paraxial radius of the image-side surface of the positive lens become large, occurrence of the spherical aberration becomes substantial. Whereas, when a lower limit value of conditional expression (11) is not reached, since the paraxial radius of curvature of the object-side surface of the positive lens and the paraxial radius of curvature of the image-side surface of the positive lens becomes small, occurrence of the coma becomes large.

It is more preferable that the following conditional expression (11') is satisfied instead of conditional expression (11)

$$-16 < (r_{1po} + r_{1pi})/(r_{1po} - r_{1pi}) < -2 \quad (11')$$

Furthermore, it is even more preferable that the following conditional expression (11") is satisfied instead of conditional expression (11).

$$-12 < (r_{1po} + r_{1pi})/(r_{1po} - r_{1pi}) < -4 \quad (11'')$$

Moreover, in the zoom lens according to the first aspect of the present embodiment, it is preferable that the following conditional expressions (12) is satisfied.

$$20 < vd_{1n} - vd_{1p} < 50 \quad (12)$$

where, $vd_{1n}$ denotes Abbe's number for the negative lens in the first lens group, and $vd_{1p}$ denotes Abbe's number for the positive lens in the first lens group.

Abbe's number vd is expressed by vd=(nd−1)/(nF−nC), where nd, nF, and nC are refractive indices for a d-line, an F-line, and a C-line respectively.

Due to a lens group moving at the time of zooming, a height of a light ray with a large angle of view, changes remarkably.

As a result, an amount of occurrence of the chromatic aberration of magnification, changes. Therefore, by satisfying conditional expression (12), it is possible to correct the chromatic aberration of magnification at the wide angle end, and a longitudinal chromatic aberration at the telephoto end, in a balanced manner.

It is more preferable that the following conditional expression (12') is satisfied instead of conditional expression (12).

$$25 < vd_{1n} - vd_{1p} < 45 \quad (12')$$

Furthermore, it is even more preferable that the following conditional expression (12") is satisfied instead of conditional expression (12).

$$30 < vd_{1n} - vd_{1p} < 40 \quad (12'')$$

Moreover, in the zoom lens according to the first aspect of the present embodiment, it is preferable that the following conditional expression (13) is satisfied.

$$1.0 < ((\phi_{1F}/2) - D_{rR})/(D_{pri}/2) < 1.3 \quad (13)$$

where, $\phi_{1F}$ denotes an effective aperture of a lens nearest to a surface of incidence of the reflecting optical element, $D_{rR}$ denotes a distance from a lens nearest to an exit surface of the reflecting optical element up to the exit surface, which is a distance when measured parallel to an optical axis from a position of an effective aperture of the lens, and $D_{pri}$ denotes an optical axial distance from the surface of incidence of the reflecting optical element up to the exit surface of the reflecting optical element.

Figure 24:
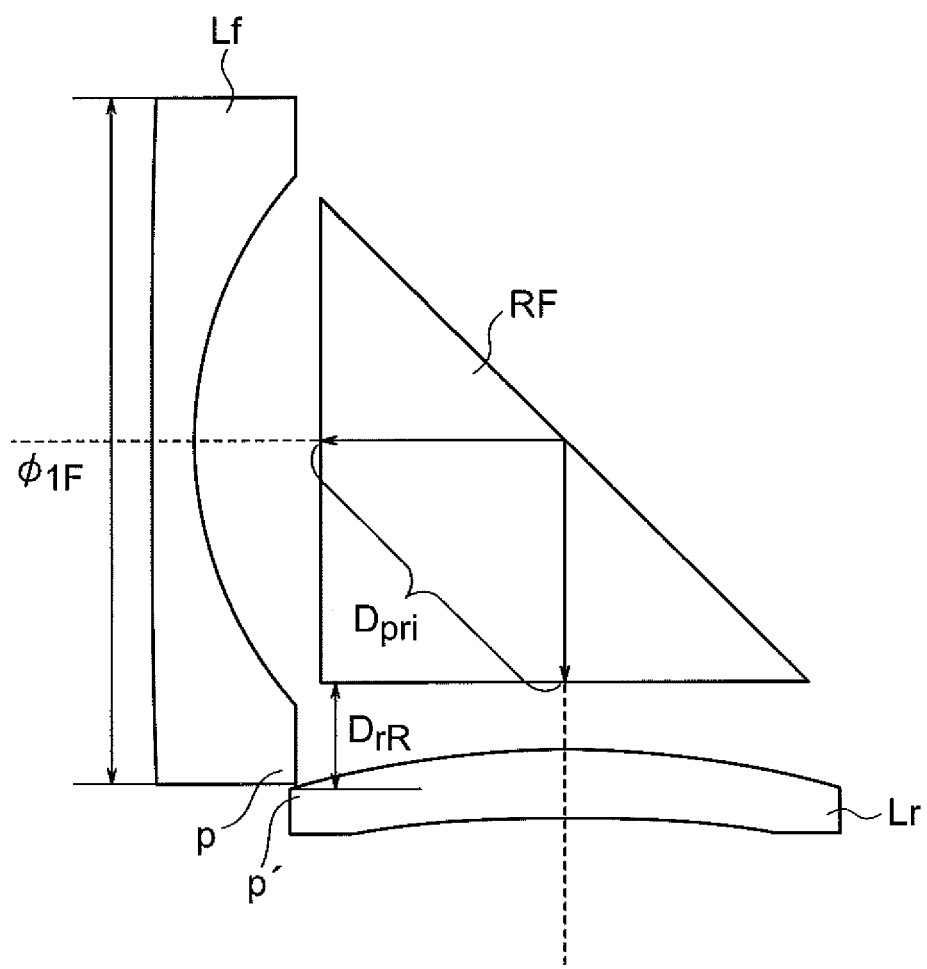
FIG. 24 is a diagram showing $\phi_{1F}$, $D_{rR}$, and $D_{pri}$.

FIG. 24 shows an arrangement for bending an optical path of the optical system. Here, a lens Lf is the lens nearest to a surface of incidence of a reflecting optical element RF, and lens Lr is the lens nearest to an exit surface of the reflecting optical element RF. Moreover, in FIG. 24, the lens Lf is a negative lens and the lens Lr is a positive lens.

Furthermore, in FIG. 24, $\phi_{1F}$ is an effective aperture of the lens Lf, $D_{rR}$ is a distance from the lens Lr up to the exit surface of the reflecting optical element RF, and is a distance which is measured parallel to an optical axis AX, from an effective aperture of the lens Lr, $D_{pri}$ is an optical axial distance from the surface of incidence of the reflecting optical element RF up to the exit surface of the reflecting optical element RF. The effective aperture means the maximum diameter of a bundle of rays which passes through a lens surface. In FIG. 24, an outer diameter of the lens Lf and an outer diameter of the lens Lr coincide with the effective aperture, but there are cases in which, the effective aperture is smaller than the outer diameter of the lens. Moreover, $D_{rR}$ is a distance measured from an object-side surface (surface toward the reflecting optical element RF) of the lens Lr.

In the arrangement for bending the optical path, when one of or both of the lens Lf and the lens Lr is or are excessively near to the reflecting optical element RF, sometimes the lens Lf and the lens Lr interfere. More concretely, sometimes a peripheral portion P of the lens Lf and a peripheral portion P' of the lens Lr come in contact. Such interference occurs due to a size of an effective aperture of the lens Lf and the lens Lr.

In such a case, by cutting off the peripheral portion of one of the lenses, it is possible to prevent the interference. Incidentally, when a lens is cut, since a load is exerted to the lens at the time of cutting, a figure tolerance of the lens is degraded. Conditional expression (13) is a conditional expression which prevents the interference of a lens nearest to the surface of incidence of the reflecting optical element and a lens nearest to the exit surface of the reflecting optical element, and enables to shorten the overall length.

When an upper limit value of conditional expression (13) is surpassed, the negative lens and the positive lens interfere. Whereas, when a lower limit value of conditional expression (13) is not reached, a distance between the positive lens and the reflecting optical element becomes excessive. Therefore, it becomes difficult to shorten the overall length of the optical system.

It is more preferable that the following conditional expression (13') is satisfied instead of conditional expression (13).

$$1.05 < ((\phi_{1F}/2) - D_{rR})/(D_{prt}/2) < 1.28 \quad (13')$$

Furthermore, it is even more preferable that the following conditional expression (13") is satisfied instead of conditional expression (13).

$$1.1 < ((\phi_{1F}/2) - D_{rR})/(D_{prt}/2) < 1.25 \quad (13")$$

When focusing is carried out by moving the third lens group, a space after the second lens group has moved, can be used for moving the third lens group, or in other words, can be used for focusing. In such manner, it is possible to use a same space effectively not only at the time of zooming but also at the time of focusing. Particularly, at the telephoto end, since an amount of movement at the time of focusing becomes large, it is preferable to make the abovementioned arrangement.

Moreover, in the zoom lens according to the first aspect of the present embodiment, it is preferable that the following conditional expression (14) is satisfied.

$$-5.0 \le f_3/(f_w \times f_t)^{1/2} \le -0.5 \quad (14)$$

where,
$f_3$ denotes a focal length of the third lens group,
$f_w$ denotes a focal length of the overall zoom lens system at a wide angle end, and
$f_t$ denotes a focal length of the overall zoom lens system at a telephoto end.

Conditional expression (14) is a conditional expression which is preferable for correction of the astigmatism and the coma, for shortening the overall length of the optical system, and improving an accuracy of focusing.

When an upper limit value of conditional expression (14) is surpassed, since the focal length of the third lens group becomes short (the refractive power becomes large) with respect to a zoom ratio, correction of the astigmatism and the coma becomes difficult. Furthermore, since the depth of focus becomes small in an optical system having a large aperture, in a case of carrying out focusing by the third lens group for instance, achieving an accuracy which is necessary at the time of focusing becomes difficult. Whereas, when a lower limit value of conditional expression (14) is not reached, the focal length of the third lens group becomes long (the refractive power becomes small) with respect to the zoom ratio. In this case, when an attempt is made to carry out focusing by moving the third lens group, since an amount of movement at the time of focusing increases, the overall length becomes long.

It is more preferable that the following conditional expression (14') is satisfied instead of conditional expression (14).

$$-4.0 \le f_3/(f_w \times f_t)^{1/2} \le 0.7 \quad (14')$$

Furthermore, it is even more preferable that the following conditional expression (14") is satisfied instead of conditional expression (14).

$$-3.0 \le f_3/(f_w \times f_t)^{1/2} \le -1.0 \quad (14")$$

Moreover, in the zoom lens according to the first aspect of the present embodiment, it is preferable that the second lens group includes in order from the object side, an aperture stop, a positive lens, a positive lens, a negative lens, and a positive lens.

The spherical aberration and the coma are susceptible to occur near the aperture stop. Therefore, by arranging the second lens group which is positioned near the aperture stop, as mentioned above, it is possible to suppress the occurrence of the spherical aberration and the coma. As a result, it is possible to achieve a large aperture of the optical system while maintaining the favorable imaging performance.

Moreover, since the aperture stop moves together with the second lens group at the time of zooming, the F-number of the optical system fluctuates with zooming. Since the third lens group also moves at the time of zooming, the third lens group also has an effect on the F-number. Here, when a refractive power of the second lens group is large, the fluctuation of the F-number depends mainly on the second lens group. Therefore, by making the refractive power of the second lens group large, it is possible to make small the effect on the fluctuation of the F-number by the third lens group being moved.

In the zoom lens according to the first aspect of the present embodiment, since the second lens group is arranged as described above, it is possible to make the refractive power of the second lens group large while suppressing the occurrence of the spherical aberration and the coma. Accordingly, since it becomes possible to reduce the fluctuation of the combined focal length of the lens groups on the image side of the aperture stop (lens groups from the second lens group onward), it is possible to make small the fluctuation of the F-number with zooming, which is a drawback of a negative-lead type. The positive lens and the negative lens may be let to be a cemented lens as mentioned above.

Moreover, in the zoom lens according to the first aspect of the present embodiment, it is preferable that the following conditional expression (8-1) is satisfied.

$$-1.5 \le f_1/(f_w \times f_t)^{1/2} \le -0.5 \quad (8-1)$$

where,
$f_1$ denotes a focal length of the first lens group,
$f_w$ denotes a focal length of the overall zoom lens system at a wide angle end, and
$f_t$ denotes a focal length of the overall zoom lens system at a telephoto end.

Conditional expression (8-1) is a conditional expression which is preferable for suppressing the occurrence of the spherical aberration, the coma, and the chromatic aberration of magnification while being the optical system with a large aperture. A technical significance of conditional expression (8-1) is same as a technical significance of conditional expression (8).

It is more preferable that the following conditional expression (8-1') is satisfied instead of conditional expression (8-1).

$$-1.3 \le f_1/(f_w \times f_t)^{1/2} \le -0.6 \quad (8-1')$$

Furthermore, it is even more preferable that the following conditional expression (8-1") is satisfied instead of conditional expression (8-1).

$$-1.2 \le f_1/(f_w \times f_t)^{1/2} \le -0.7 \quad (8-1")$$

Moreover, in the zoom lens according to the first aspect of the present embodiment, it is preferable that the following conditional expression (15) is satisfied.

$$-1.0 \le f_{1o}/f_1 \le -0.2 \quad (15)$$

where,
$f_{1o}$ denotes a focal length of a lens on the object side in the first lens group, and $f_t$ denotes a focal length of the overall zoom lens system at a telephoto end.

Conditional expression (15) is a conditional expression which is preferable for suppressing the occurrence of the spherical aberration and the chromatic aberration of magnification, while being the optical system with a large aperture.

When an upper limit value of conditional expression (15) is surpassed, since the focal length of the lens on the object side in the first lens group becomes excessively short (the refractive power becomes excessively large) with respect to the focal length at the telephoto end, the chromatic aberration of magnification occurs. Whereas, when a lower limit value of conditional expression (15) is not reached, the focal length of the lens on the object side in the first lens group becomes excessively long (the refractive power becomes excessively small) with respect to the focal length at the telephoto end. In this case, since a height of a light ray which is incident on a lens group on the image side of the aperture stop becomes high, the spherical aberration occurs.

It is more preferable that the following conditional expression (15') is satisfied instead of conditional expression (15).

$$-0.9 \leq f_{1o}/f_t \leq -0.3 \quad (15')$$

Furthermore, it is even more preferable that the following conditional expression (15") is satisfied instead of conditional expression (15).

$$-0.8 \leq f_{1o}/f_t \leq -0.4 \quad (15'')$$

Moreover, in the zoom lens according to the first aspect of the present embodiment, it is preferable that the following conditional expression (16) is satisfied.

$$-2.0 \leq f_3/f_4 \leq -0.5 \quad (16)$$

where, $f_3$ denotes a focal length of the third lens group, and
$f_4$ denotes a focal length of the fourth lens group.

Conditional expression (16) is a conditional expression which is preferable for making appropriate an angle of incidence of an off-axis ray which is incident on an image plane (image pickup surface).

When an upper limit value of conditional expression (16) is surpassed, the focal length of the fourth lens group becomes excessively long (the refractive power becomes excessively small) with respect to the focal length of the third lens group. In this case, it becomes difficult to bend a light ray which is emerged from the fourth lens group toward the optical axis. As a result, since an angle of a light ray which is incident with respect to a normal of the image plane (an image pickup surface of the image pickup element) becomes large, an amount of light at periphery is decreased. Whereas, when a lower limit value of conditional expression (16) is not reached, since the focal length of the fourth lens group becomes excessively short (the refractive power becomes excessively large) with respect to the focal length of the third lens group, the astigmatism occurs.

It is more preferable that the following conditional expression (16') is satisfied instead of conditional expression (16).

$$-1.8 \leq f_3/f_4 \leq -0.6 \quad (16')$$

Furthermore, it is even more preferable that the following conditional expression (16") is satisfied instead of conditional expression (16).

$$-1.6 \leq f_3/f_4 \leq -0.7 \quad (16'')$$

A zoom lens according to a second aspect of the present embodiment comprises in order from an object side, a first lens group having a negative refractive power, a second lens group having a positive refractive power, a third lens group having a negative refractive power, and a fourth lens group having a positive refractive power, and at the time of zooming, the first lens group is fixed, the second lens group moves, the third lens group moves, and the fourth lens group is fixed, and the first lens group comprises a reflecting optical element, and one of the lens group which constitute the zoom lens includes a plurality of lens components, and at least one of the plurality of lens components is an integrated lens in which, a light transmission portion and a holding portion are integrated, and the holding portion is provided to an outer periphery of the light transmission portion, and has a protruding portion which is formed in a direction along a central axis of the light transmission portion, and at least one of the plurality of lens components other than the integrated lens is held via the protruding portion.

In the zoom lens according to the second aspect of the present embodiment, a negative-lead type arrangement, or in other words, an arrangement in which, a refractive power of the first lens group is let to be negative, has been adopted as an arrangement of lens groups. Moreover, at the time of zooming, the second lens group and the third lens group are moved, and the first lens group and the fourth lens group are fixed (let to be stationary). Here, it is preferable to move the second lens group and the third lens group in the same direction. For instance, when both the second lens group and the third lens group are moved toward the object side, it is possible to position the third lens group in a space after the second lens group has moved. In such manner, since it is possible to share the same space by a plurality of lens groups, shortening of the overall length of the optical system becomes possible.

Moreover, the first lens group comprises the reflecting optical element. By providing the reflecting optical element, it is possible to achieve slimming of the optical system. The reflecting optical system is either a prism or a mirror, and is used for bending an optical path.

Moreover, in the zoom lens according to the second aspect of the present embodiment, one of the lens group which constitute the zoom lens includes the plurality of lens components, and at least one of the plurality of lens components is an integrated lens in which, the light transmission portion and the holding portion are integrated, and the holding portion is provided to the outer periphery of the light transmission portion, and has the protruding portion which is formed in the direction along the central axis of the light transmission portion, and at least one of the plurality of lens components is other than the integrated lens held via the protruding portion. Also, the lens component may be a single lens or a cemented lens.

Figure 25A:
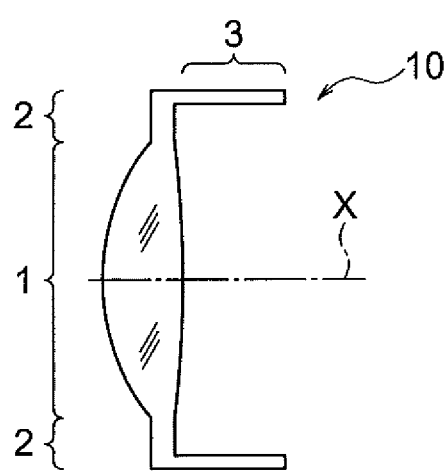
FIG. 25A, FIG. 25B, FIG. 25C, and FIG. 25D (hereinafter, 'FIG. 25A to FIG. 25D') are diagrams showing an integrated lens and lens groups, where.
Figure 25B:
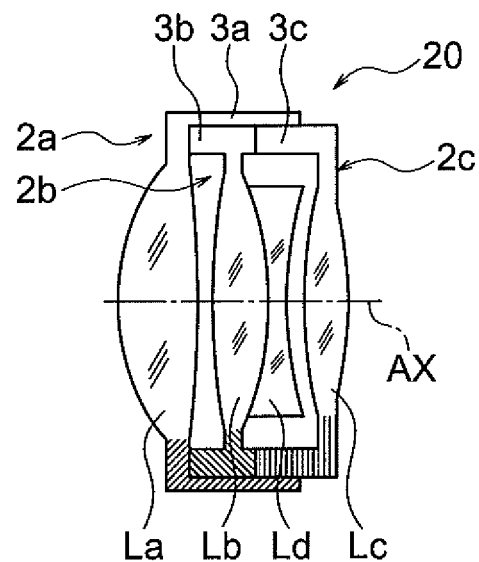
Figure 25C:
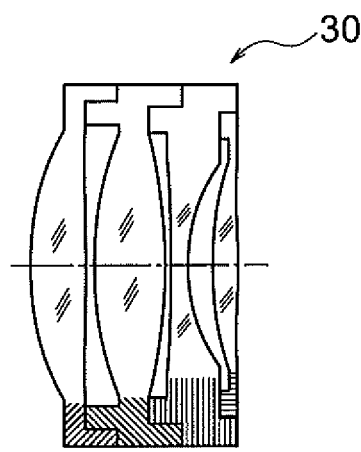
Figure 25D:
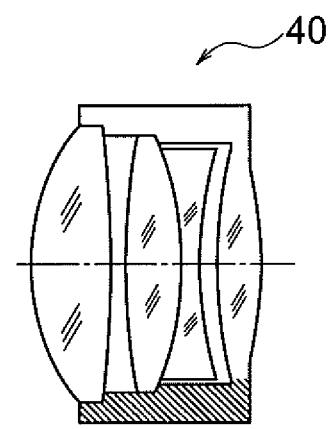

FIG. 25A to FIG. 25D are diagrams showing an integrated lens and lens groups which include the integrated lens. FIG. 25A show an arrangement of the integrated lens, FIG. 25B shows an arrangement when the lens group includes a cemented lens, FIG. 25C shows an arrangement when the lens group does not include a cemented lens, and FIG. 25D shows an arrangement when there is one integrated lens.

As shown in FIG. 25A, an integrated lens 10 includes a light transmission portion 1 and a holding portion 2. Moreover, the light transmission portion 1 and the holding portion 2 are formed integrally. The holding portion 2 is provided at an outer periphery of the light transmission portion 1, and a protruding portion 3 is formed in a direction along a central axis X of the light transmission portion 1. In the zoom lens according to the second aspect, the lens group is formed by using one or a plurality of such integrated lenses 10.

FIG. 25B is an example of a lens group which includes the integrated lens. A lens group 20 includes four lenses La, Lb, Lc, and Ld. Out of the four lenses, the lenses La, Lb, and Lc are integrated lenses. The lenses La, Lb, and Lc have holding portions 2a, 2b, and 2c, and protruding portions 3a, 3b, and 3c respectively. A pattern has been assigned to the holding portions and the protruding portions at a lower half of lens cross-sectional views, to make these portions easily recognizable.

The protruding portion 3a of the lens La is extended toward the lens Lb. The lens Lb is disposed at an inner side of the protruding portion 3a (toward the optical axis AX). Here, an inner diameter of an inner-side surface of the protruding portion 3a and an outer diameter of the protruding portion 3b are almost same. Therefore, by inserting the lens Lb into an inner side of the protruding portion 3a, the inner-side surface of the protruding portion 3a and an outer-side surface of the protruding portion 3b come in contact. Accordingly, the lens Lb is held. Moreover, positioning of the lens Lb with respect to the lens La as well, is carried out in a direction perpendicular to the optical axis.

On the other hand, a length of the protruding portion 3b (length toward the lens La) is set to a length such that a distance on the optical axis AX between the lens La and the lens Lb is as per a design value. Therefore, the positioning of the lens Lb with respect to the lens La in the direction along the optical axis is carried out by inserting the lens Lb into the inner side of the protruding portion 3a till a front end of the protruding portion 3b has abut against the protruding portion 3a. The lens Lc is also held and positioned in a similar manner as the lens Lb.

In the lens group 20, the lens Lb and the lens Ld are cemented. Here, since it is preferable to position the lens Ld with respect to the lens Lb at the time of cementing, a holding portion is not provided to the lens Ld. On the other hand, in a lens group 30 in FIG. 25C, since there is no cemented lens, each lens is an integrated lens. Moreover, in a lens group 40 in FIG. 25D, there is only one integrated lens, and the other lenses are held by this integrated lens. For holding each lens via the protruding portion, it is preferable to use a method such as fitting or screwing.

As it has been described above, in the zoom lens according to the second aspect of the present embodiment, the adjacent lenses are held via the protruding portion by providing the integrated lens. Moreover, since the positioning is carried out in addition to holding, it is possible to make the lenses coaxiality with high accuracy. In other words, even when the F-number of the optical system is made small, it is possible to make small the manufacturing error. Therefore, it is possible to reduce an image-plane fluctuation due to the manufacturing error.

Moreover, in the zoom lens according to the second aspect of the present embodiment, it is preferable that all of the plurality of lens components, are integrated lenses.

By making such an arrangement, even when the F-number of the optical system is small, it is possible to make the manufacturing error small. Therefore, it is possible to reduce the image-plane fluctuation which is due to the manufacturing error.

Moreover, in the zoom lens according to the second aspect of the present embodiment, it is preferable that the first lens group includes in order from the object side, a negative lens, the reflecting optical element, and a positive lens.

When such an arrangement is made, since it is possible to bring a position of an entrance pupil closer to the object side, it is possible to make an outer diameter of the first lens group small. As a result, it is possible to achieve both of maintaining a favorable imaging performance and slimming of the optical system.

Moreover, in the zoom lens according to the second aspect of the present embodiment, it is preferable that the second lens group includes in order from the object side, an aperture stop, a positive lens, a positive lens, a negative lens, and a positive lens.

The spherical aberration and the coma are susceptible to occur near the aperture stop. Therefore, by arranging the second lens group which is positioned near the aperture stop, as described above, it is possible to suppress the occurrence of the spherical aberration and the coma. As a result, it is possible to achieve a large aperture of the optical system while maintaining a favorable imaging performance.

Moreover, since the aperture stop moves together with the second lens group at the time of zooming, the F-number of the optical system fluctuates with zooming. Since the third lens group also moves at the time of zooming, the third lens group also has an effect on the fluctuation of the F-number. Here, when the refractive power of the second lens group is large, the fluctuation of the F-number depends mainly on the second lens group. Therefore, by making the refractive power of the second lens group large, it is possible to make small an effect on the fluctuation of the F-number due to moving of the third lens group.

In the zoom lens according to the second aspect of the present embodiment, since the second lens group is arranged as described above, it is possible to make the refractive power of the second lens group large while suppressing the occurrence of the spherical aberration and the coma. Accordingly, since it becomes possible to reduce the fluctuation of the combined focal length of the lens groups on the image side of the aperture stop (the lens groups from the second lens group onward), it is possible to make small the fluctuation of the F-number with zooming, which is a drawback of the negative-lead type.

Moreover, in the zoom lens according to the second aspect of the present embodiment, it is preferable that the plurality of lens components is a lens in the second lens group.

In the zoom lens according to the second aspect of the present embodiment, at the time of zooming, the second lens group moves. In an optical system with a small F-number and in which a high resolution is maintained, a highly accurate coaxiality is sought for a lens group which moves. Therefore, by including an integrated lens in the second lens group, it is possible to realize a highly accurate concentricity.

Moreover, in the zoom lens according to the second aspect of the present embodiment, it is preferable that the plurality of lens elements is lenses in the second lens group.

As it has been mentioned above, in an optical system with a small F-number and in which a high resolution is maintained, a highly accurate coaxiality is sought for a lens group which moves. Therefore, by including an integrated lens in the third lens group, it is possible to realize a highly accurate concentricity.

Moreover, in the zoom lens according to the second aspect of the present embodiment, it is preferable that all the lenses in the second lens group are fitted to an adjacent lens by a flange. Moreover, it is preferable that all the lenses in the third lens group are fitted to an adjacent lens by a flange.

Moreover, in the zoom lens according to the second aspect of the present embodiment, it is preferable that the following conditional expression (17) is satisfied.

$$|f_{1o}/f_w| < 1.8 \tag{17}$$

where, $f_{1o}$ denotes a focal length of a lens on the object side in the first lens group, and $f_w$ denotes a focal length of the overall zoom lens system at a wide angle end.

For making the F-number of the optical system small as well as for slimming the optical system, it is necessary to make a thickness of the reflecting optical element thin. When the zoom lens satisfies conditional expression (17), it is possible to reduce an amount of vignetting in a state of the thickness of the reflecting element made thin. Therefore, it is possible to maintain resolution and an amount of light in a peripheral portion of an image plane.

It is more preferable that the following conditional expression (17') is satisfied instead of conditional expression (17).

$$|f_{1d}/f_w|<1.6 \quad (17')$$

Furthermore, it is even more preferable that the following conditional expression (17") is satisfied instead of conditional expression (17).

$$f_{1d}/f_w|<1.4 \quad (17'')$$

Moreover, in the zoom lens according to the second aspect of the present embodiment, it is preferable that the positive lens disposed in the first lens group is a meniscus lens having a convex surface directed toward the object side.

Moreover, in the zoom lens according to the second aspect of the present embodiment, it is preferable that the following conditional expression (11-1) is satisfied.

$$-20<(r_{1po}+r_{1pi})/(r_{1po}-r_{1pi})<-1.2 \quad (11\text{-}1)$$

where, $r_{1po}$ denotes a paraxial radius of curvature of an object-side surface of the positive lens in the first lens group, and $r_{1pi}$ denotes a paraxial radius of curvature of an image-side surface of the positive lens in the first lens group.

With the aperture of the optical system becoming large, occurrence of the spherical aberration and the coma becomes remarkable. Conditional expression (11-1) is a conditional expression which is preferable for suppressing the spherical aberration and the coma. Technical significance of conditional expression (11-1) is same as technical significance of conditional expression (11).

It is more preferable that the following conditional expression (11-1') is satisfied instead of conditional expression (11-1).

$$-16<(r_{1po}+r_{1pi})/(r_{1po}-r_{1pi})<-2 \quad (11\text{-}1')$$

Furthermore, it is even more preferable that the following conditional expression (11-1") is satisfied instead of conditional expression (11-1).

$$-12<(r_{1po}+r_{1pi})/(r_{1po}-r_{1pi})<-4 \quad (11\text{-}1)$$

Moreover, in the zoom lens according to the second aspect of the present embodiment, it is preferable that the fourth lens group includes one resin lens.

Furthermore, in the zoom lens according to the second aspect of the present embodiment, it is preferable that a diameter of the aperture stop is constant at the time of zooming.

Moreover, an image pickup apparatus according to an aspect of the present embodiment includes the zoom lens described above, and an image pickup element which has an image pickup surface.

The zoom lens may include only four lens groups (a first lens group, a second lens group, a third lens group, and a fourth lens group (hereinafter, 'first lens group to fourth lens group')). Moreover, the first lens group may include in order from the object side, one negative lens, one reflecting optical element, and one positive lens only. The second lens group may include in order from the object side, an aperture stop, one positive lens, one positive lens, one negative lens, and one positive lens only. The one positive lens and the one negative lens may be cemented and let to be a cemented lens. Moreover, the third lens group may include one positive lens and one negative lens only.

Examples of the zoom lens according to the present invention will be described below in detail while referring to the accompanying diagrams. However, the present invention is not restricted to the examples described below.

Figure 1B:
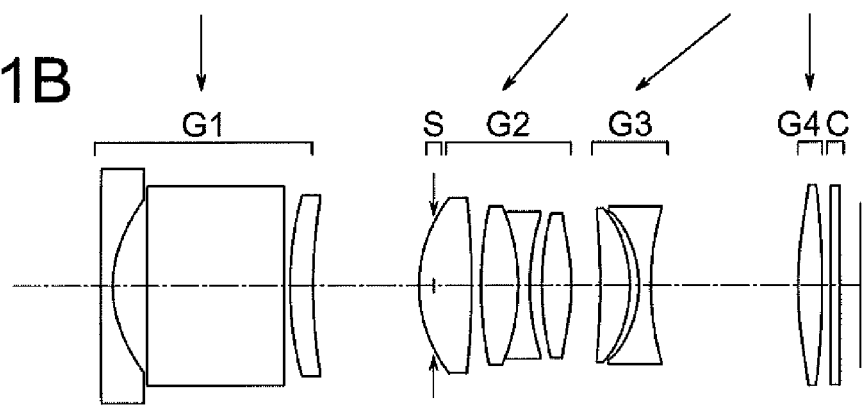
Figure 1C:
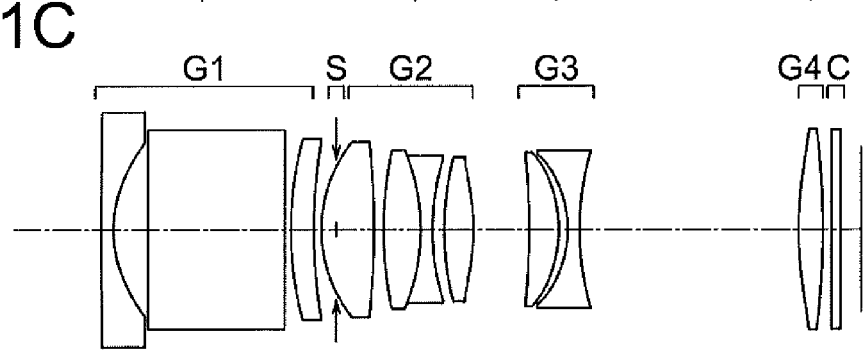

A zoom lens according to a first example of the present invention will be described below. FIG. 1A, FIG. 1B, and FIG. 1C are cross-sectional views along an optical axis showing an optical arrangement at the time of infinite object point focusing of the zoom lens according to the first example of the present invention, where, FIG. 1A is a cross-sectional view at a wide angle end, FIG. 1B is a cross-sectional view of an intermediate focal length state, and FIG. 1C is a cross-sectional view at a telephoto end. In all the examples which follow, in lens cross-sectional views, C denotes a cover glass, and I denotes an image pickup surface of an image pickup element.

FIG. 2A to FIG. 2L are aberration diagrams at the time of infinite object point focusing of the zoom lens according to the first example, and 'ω' denotes a half angle of field. Symbols in the aberration diagrams are same for all the examples which will be described later.

Moreover, in the aberration diagrams, FIG. 2A, FIG. 2B, FIG. 2C, and FIG. 2D show spherical aberration (SA), astigmatism (AS), distortion (DT), and chromatic aberration of magnification (CC) respectively, at the wide angle end.

FIG. 2E, FIG. 2F, FIG. 2G, and FIG. 2H show spherical aberration (SA), astigmatism (AS), distortion (DT), and chromatic aberration of magnification (CC) respectively, in the intermediate focal length state.

FIG. 2I, FIG. 2J, FIG. 2K, and FIG. 2L show spherical aberration (SA), astigmatism (AS), distortion (DT), and chromatic aberration of magnification respectively, at the telephoto end.

The zoom lens according to the first example, as shown in FIG. 1A, FIG. 1B, and FIG. 1C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a negative meniscus lens L1 having a convex surface directed toward the object side, a reflecting optical element L2, and a positive meniscus lens L3 having a convex surface directed toward the object side.

The second lens group G2 includes in order from the object side, a biconvex positive lens L4, a biconvex positive lens L5, a biconcave negative lens L6, and a biconvex positive lens L7. Here, the biconvex positive lens L5 and the biconcave negative lens L6 are cemented.

The aperture stop S is positioned between an object-side surface of the biconvex positive lens L4 and an image-side surface of the biconvex positive lens L4. Even when the aperture stop S is at such position, it is assumed that the aperture stop S is positioned on the object side than the second lens group.

The third lens group G3 includes a positive meniscus lens L8 having a convex surface directed toward an image side, and a biconcave negative lens L9.

The fourth lens group G4 includes a biconvex positive lens L10.

At the time of zooming from the wide angle end to the telephoto end, the first lens group G1 is fixed (stationary), the second lens group G2 moves toward the object side, the third lens group G3 moves toward the object side, and the fourth lens group G4 is fixed (stationary).

An aspheric surface is provided to a total of eight surfaces namely, an image-side surface of the negative meniscus lens L1, both surfaces of the biconvex positive lens L4, an image-side surface of the biconvex positive lens L7, an image-side surface of the positive meniscus lens L8, an object-side surface of the biconcave negative lens L9, and both surfaces of the biconvex positive lens L10.

Figure 3A:
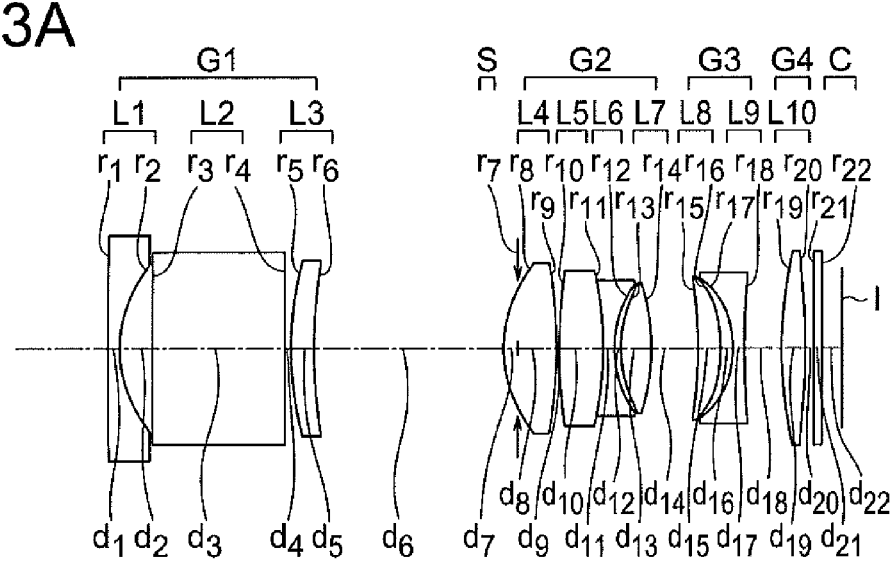
FIG. 3A, FIG. 3B, and FIG. 3C are cross-sectional views along an optical axis showing an optical arrangement of a zoom lens according to a second example of the present invention, at the time of infinite object point focusing, where.
Figure 3B:
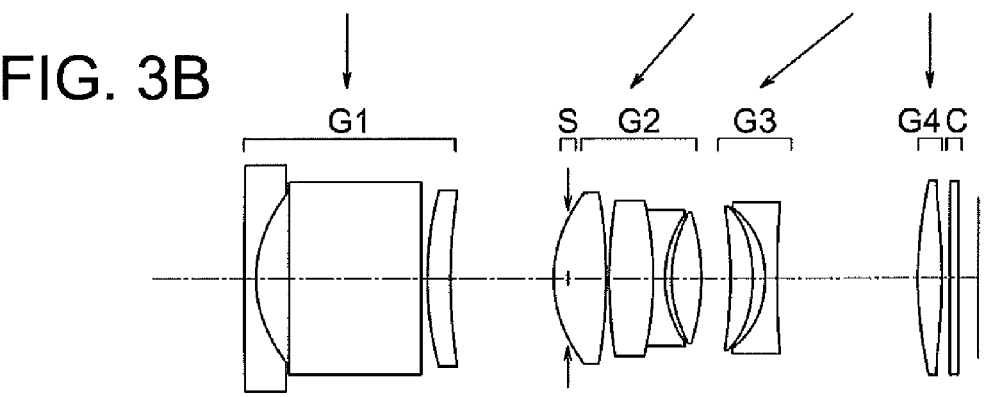
Figure 3C:
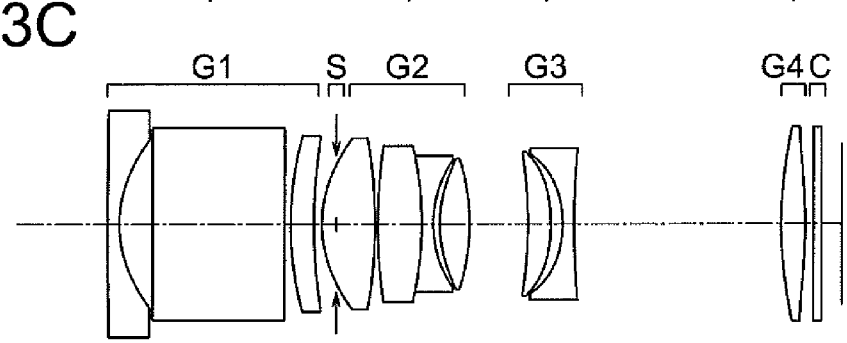

Next, a zoom lens according to a second example will be described below. FIG. 3A, FIG. 3B, and FIG. 3C are cross-sectional views along an optical axis showing an optical arrangement at the time of infinite object point focusing of an image pickup optical system according to the second example, and FIG. 4A to FIG. 4L are aberration diagrams at the time of infinite object point focusing of the image pickup optical system according to the second example.

The zoom lens according to the second example, as shown in FIG. 3A, FIG. 3B, and FIG. 3C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a negative meniscus lens L1 having a convex surface directed toward the object side, a reflecting optical element L2, and a positive meniscus lens L3 having a convex surface directed toward the object side.

The second lens group G2 includes in order from the object side, a biconvex positive lens L4, a biconvex positive lens L5, a biconcave negative lens L6, and a biconvex positive lens L7. Here, the biconvex positive lens L5 and the biconcave negative lens L6 are cemented.

The third lens group G3 includes a positive meniscus lens L8 having a convex surface directed toward an image side, and a biconcave negative lens L9.

The fourth lens group G4 includes a biconvex positive lens L10.

At the time of zooming from a wide angle end to a telephoto end, the first lens group G1 is fixed (stationary), the second lens group G2 moves toward the object side, the third lens group G3 moves toward the object side, and the fourth lens group G4 is fixed (stationary).

An aspheric surface is provided to a total of nine surfaces namely, an image-side surface of the negative meniscus lens L1, both surfaces of the biconvex positive lens L4, both surfaces of the biconvex positive lens L7, an image-side surface of the positive meniscus lens L8, an object-side surface of the biconcave negative lens L9, and both surfaces of the biconvex positive lens L10.

Figure 5A:
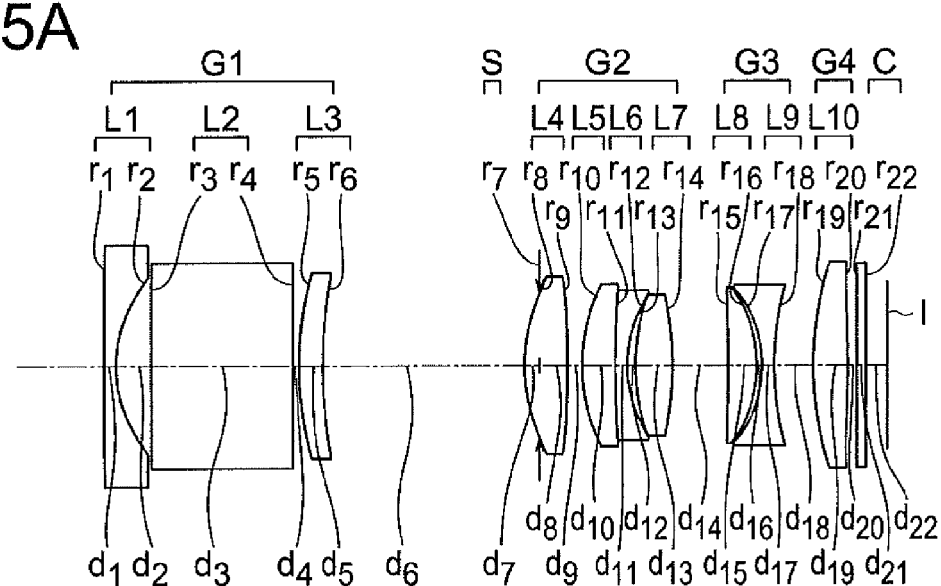
FIG. 5A, FIG. 5B, and FIG. 5C are cross-sectional views along an optical axis showing an optical arrangement of a zoom lens according to a third example of the present invention, at the time of infinite object point focusing, where.
Figure 5B:
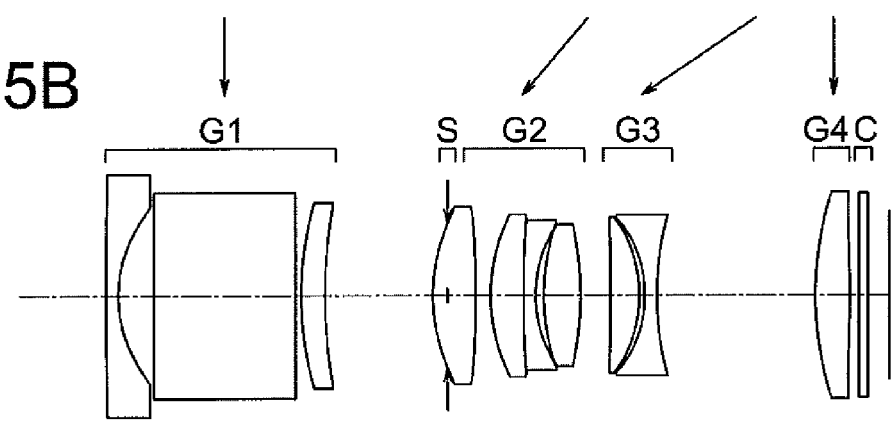
Figure 5C:
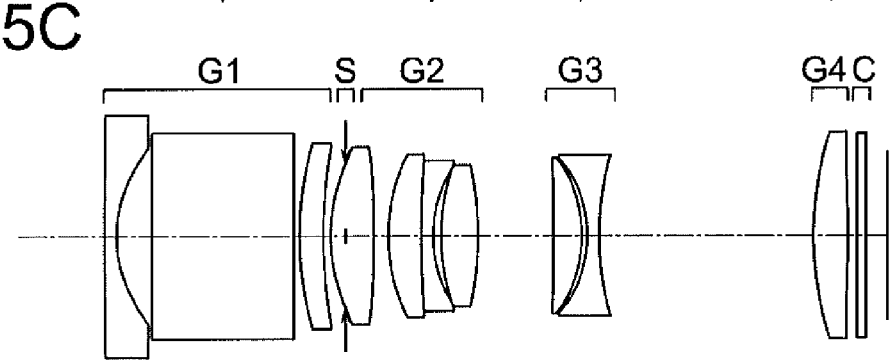

Next, a zoom lens according to a third example will be described below. FIG. 5A, FIG. 5B, and FIG. 5C are cross-sectional views along an optical axis showing an optical arrangement at the time of infinite object point focusing of an image pickup optical system according to the third example, and FIG. 6A to FIG. 6L are aberration diagrams at the time of infinite object point focusing of the image pickup optical system according to the third example.

The zoom lens according to the third example, as shown in FIG. 5A, FIG. 5B, and FIG. 5C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a negative meniscus lens L1 having a convex surface directed toward the object side, a reflecting optical element L2, and a positive meniscus lens L3 having a convex surface directed toward the object side.

The second lens group G2 includes in order from the object side, a biconvex positive lens L4, a positive meniscus lens L5 having a convex surface directed toward the object side, a negative meniscus lens L6 having a convex surface directed toward the object side, and a biconvex positive lens L7. Here, the positive meniscus lens L5 and the negative meniscus lens L6 are cemented.

The third lens group G3 includes a positive meniscus lens L8 having a convex surface directed toward an image side, and a biconcave negative lens L9.

The fourth lens group G4 includes a biconvex positive lens L10.

At the time of zooming from a wide angle end to a telephoto end, the first lens group G1 is fixed (stationary), the second lens group G2 moves toward the object side, the third lens group G3 moves toward the object side, and the fourth lens group G4 is fixed (stationary).

An aspheric surface is provided to a total of nine surfaces namely, an image-side surface of the negative meniscus lens L1, both surfaces of the biconvex positive lens L4, both surfaces of the biconvex positive lens L7, an image-side surface of the positive meniscus lens L8, an object-side surface of the biconcave negative lens L9, and both surfaces of the biconvex positive lens L10.

Figure 7A:
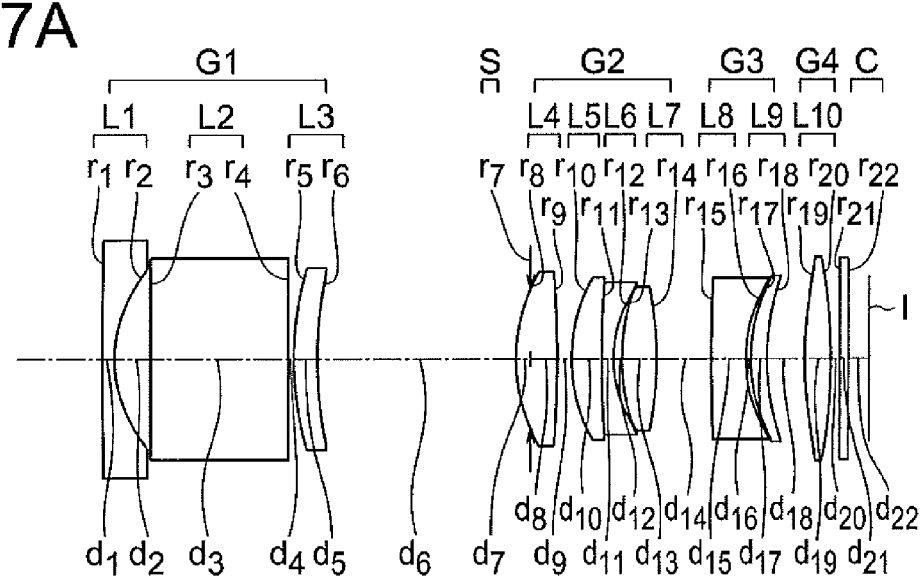
FIG. 7A, FIG. 7B, and FIG. 7C are cross-sectional views along an optical axis showing an optical arrangement of a zoom lens according to a fourth example of the present invention, at the time of infinite object point focusing, where.
Figure 7B:
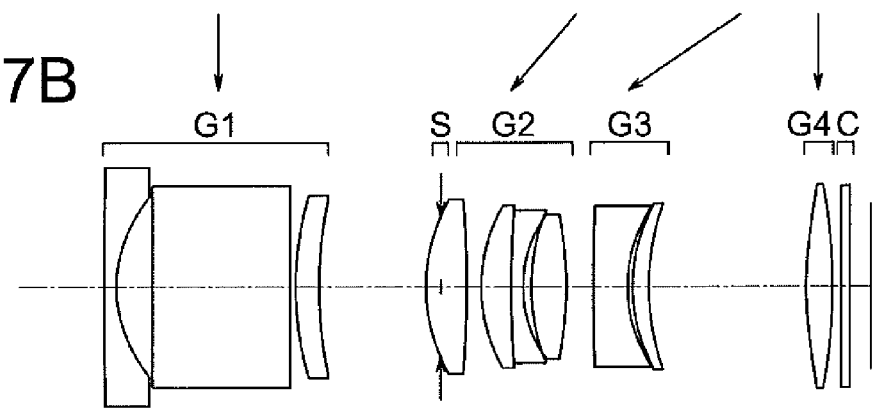
Figure 7C:
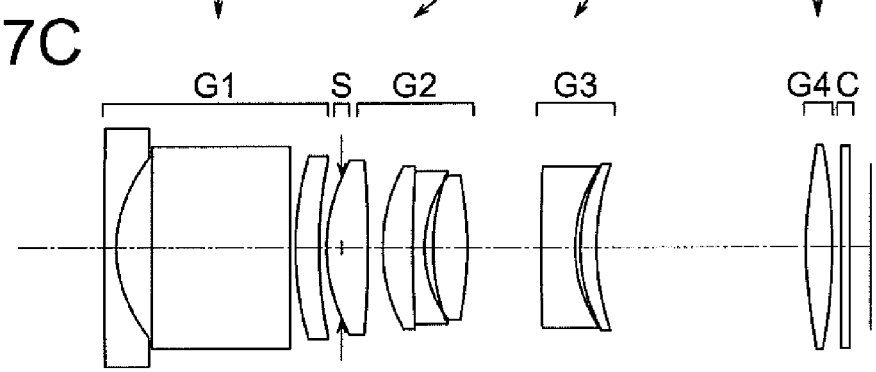

Next, a zoom lens according to a fourth example will be described below. FIG. 7A, FIG. 7B, and FIG. 7C are cross-sectional views along an optical axis showing an optical arrangement at the time of infinite object point focusing of an image pickup optical system according to the fourth example, and FIG. 8A to FIG. 8L are aberration diagrams at the time of infinite object point focusing of the image pickup optical system according to the fourth example.

The zoom lens according to the fourth example, as shown in FIG. 7A, FIG. 7B, and FIG. 7C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a negative meniscus lens L1 having a convex surface directed toward the object side, a reflecting optical element L2, and a positive meniscus lens L3 having a convex surface directed toward the object side.

The second lens group G2 includes in order from the object side, a biconvex positive lens L4, a positive meniscus lens L5 having a convex surface directed toward the object side, a negative meniscus lens L6 having a convex surface directed toward the object side, and a biconvex positive lens L7. Here, the positive meniscus lens L5 and the negative meniscus lens L6 are cemented.

The third lens group G3 includes a negative meniscus lens L8 having a convex surface directed toward the object side, and a positive meniscus lens L9 having a convex surface directed toward the object side.

The fourth lens group G4 includes a biconvex positive lens L10.

At the time of zooming from a wide angle end to a telephoto end, the first lens group G1 is fixed (stationary), the second lens group G2 moves toward the object side, the third lens group G3 moves toward the object side, and the fourth lens group G4 is fixed (stationary).

An aspheric surface is provided to a total of nine surfaces namely, an image-side surface of the negative meniscus lens L1, both surfaces of the biconvex positive lens L4, both surfaces of the biconvex positive lens L7, an image-side surface of the negative meniscus lens L8, an object-side surface of the positive meniscus lens L9, and both surfaces of the biconvex positive lens L10.

Figure 9A:
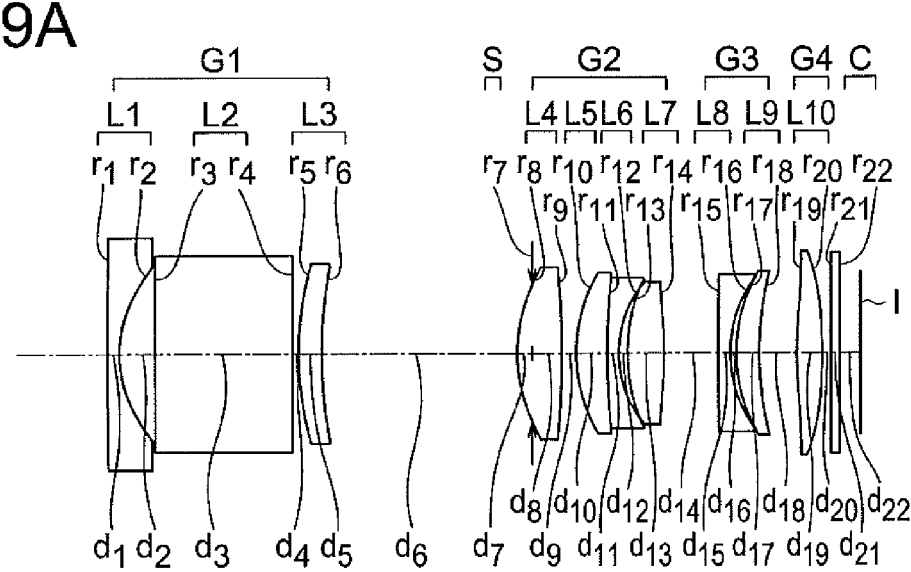
FIG. 9A, FIG. 9B, and FIG. 9C are cross-sectional views along an optical axis showing an optical arrangement of a zoom lens according to a fifth example of the present invention, at the time of infinite object point focusing, where.
Figure 9B:
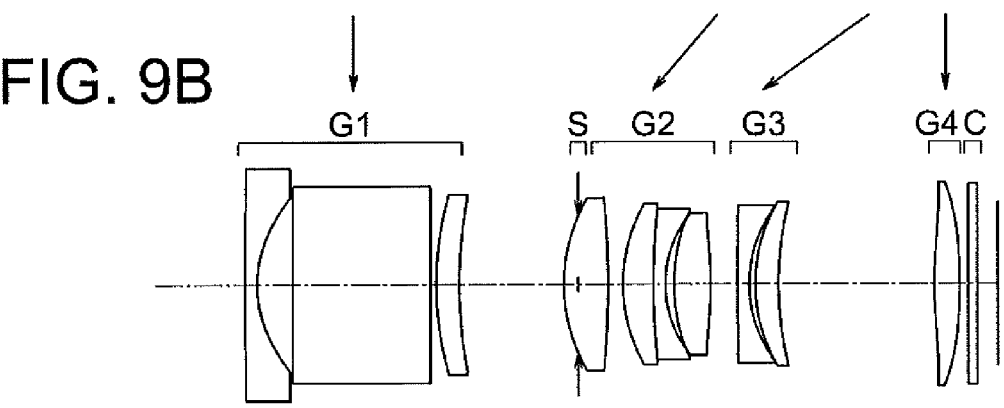
Figure 9C:
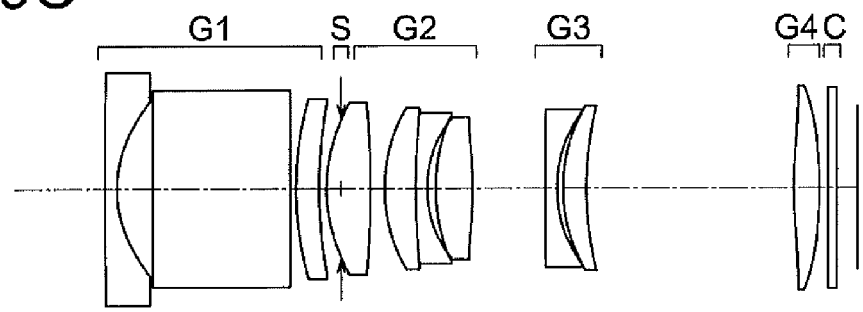

Next, a zoom lens according to a fifth example will be described below. FIG. 9A, FIG. 9B, FIG. 9C are cross-sectional views along an optical axis showing an optical arrangement at the time of infinite object point focusing of an image pickup optical system according to the fifth example, and FIG. 10A to FIG. 10L are aberration diagrams at the time of infinite object point focusing of the image pickup optical system according to the fifth example.

The zoom lens according to the fifth example, as shown in FIG. 9A, FIG. 9B, and FIG. 9C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a negative meniscus lens L1 having a convex surface directed toward the object side, a reflecting optical element L2, and a positive meniscus lens L3 having a convex surface directed toward the object side.

The second lens group G2 includes in order from the object side, a biconvex positive lens L4, a positive meniscus lens L5 having a convex surface directed toward the object side, a negative meniscus lens L6 having a convex surface directed toward the object side, and a biconvex positive lens L7. Here, the positive meniscus lens L5 and the negative meniscus lens L6 are cemented.

The third lens group G3 includes a negative meniscus lens L8 having a convex surface directed toward the object side, and a positive meniscus lens L9 having a convex surface directed toward the object side.

The fourth lens group G4 includes a biconvex positive lens L10.

At the time of zooming from a wide angle end to a telephoto end, the first lens group G1 is fixed (stationary), the second lens group G2 moves toward the object side, the third lens group G3 moves toward the object side, and the fourth lens group G4 is fixed (stationary).

An aspheric surface is provided to a total of nine surfaces namely, an image-side surface of the negative meniscus lens L1, both surfaces of the biconvex positive lens L4, both surfaces of the biconvex positive lens L7, an image-side surface of the negative meniscus lens L8, an object-side surface of the positive meniscus lens L9, and both surfaces of the biconvex positive lens L10.

Figure 11A:
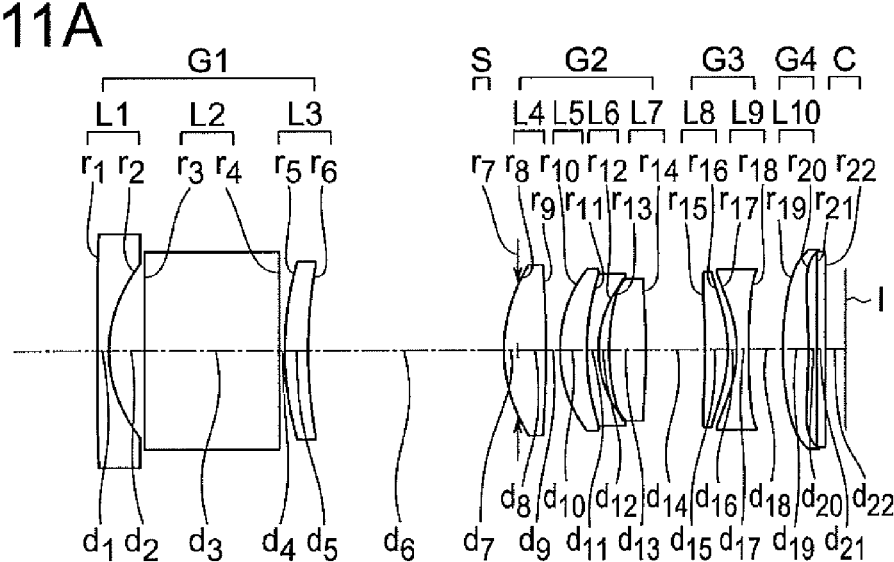
FIG. 11A, FIG. 11B, and FIG. 11C are cross-sectional views along an optical axis showing an optical arrangement of a zoom lens according to a sixth example of the present invention, at the time of infinite object point focusing, where.
Figure 11B:
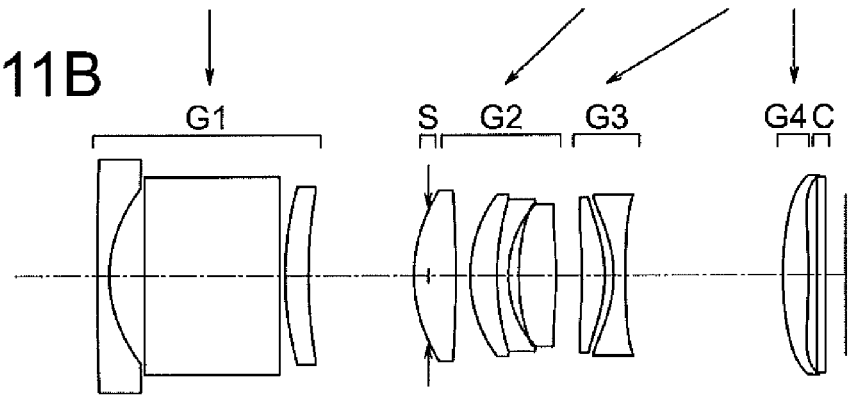
Figure 11C:
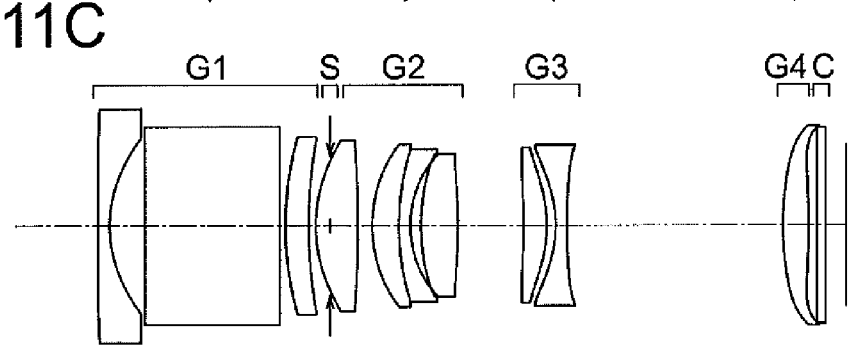

Next, a zoom lens according to a sixth example will be described below. FIG. 11A, FIG. 11B, and FIG. 11C are cross-sectional views along an optical axis showing an optical arrangement at the time of infinite object point focusing of an image pickup optical system according to the sixth example, and FIG. 12A to FIG. 12L are aberration diagrams at the time of infinite object point focusing of the image pickup optical system according to the sixth example.

The zoom lens according to the sixth example, as shown in FIGS. 11A, 11B, and 11C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a biconcave negative lens L1, a reflecting optical element L2, and a positive meniscus lens L3 having a convex surface directed toward the object side.

The second lens group G2 includes in order from the object side, a biconvex positive lens L4, a positive meniscus lens L5 having a convex surface directed toward the object side, a negative meniscus lens L6 having a convex surface directed toward the object side, and a biconvex positive lens L7. Here, the positive meniscus lens L5 and the negative meniscus lens L6 are cemented.

The third lens group G3 includes a positive meniscus lens L8 having a convex surface directed toward an image side, and a biconcave negative lens L9.

The fourth lens group G4 includes a biconvex positive lens L10.

At the time of zooming from a wide angle end to a telephoto end, the first lens group G1 is fixed (stationary), the second lens group G2 moves toward the object side, the third lens group G3 moves toward the object side, and the fourth lens group G4 is fixed (stationary).

An aspheric surface is provided to a total of twelve surfaces namely, both surfaces of the biconcave negative lens L1, both surfaces of the biconvex positive lens L4, both surfaces of the biconvex positive lens L7, both surfaces of the positive meniscus lens L8, both surfaces of the biconcave negative lens L9, and both surfaces of the biconvex positive lens L10.

Figure 13A:
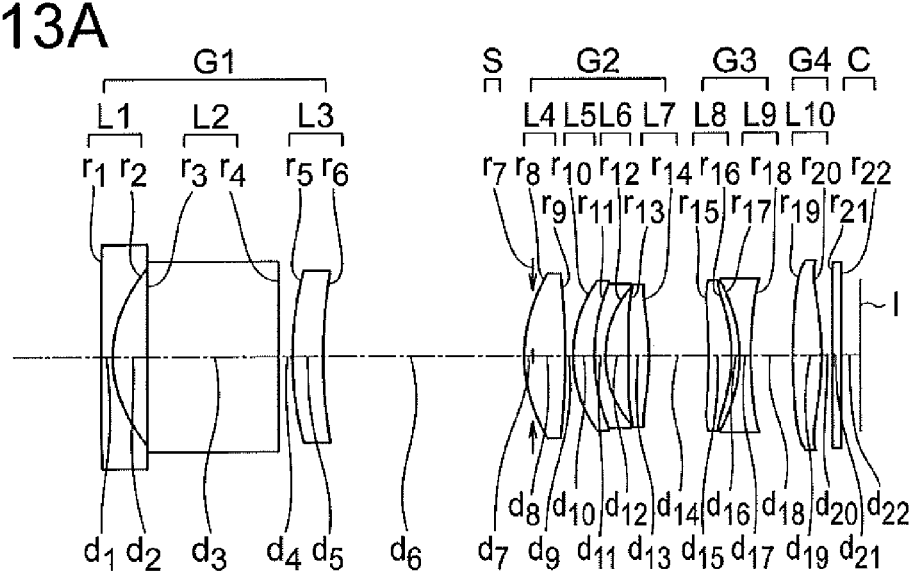
FIG. 13A, FIG. 13B, and FIG. 13C are cross-sectional views along an optical axis showing an optical arrangement of a zoom lens according to a seventh example of the present invention, at the time of infinite object point focusing, where.
Figure 13B:
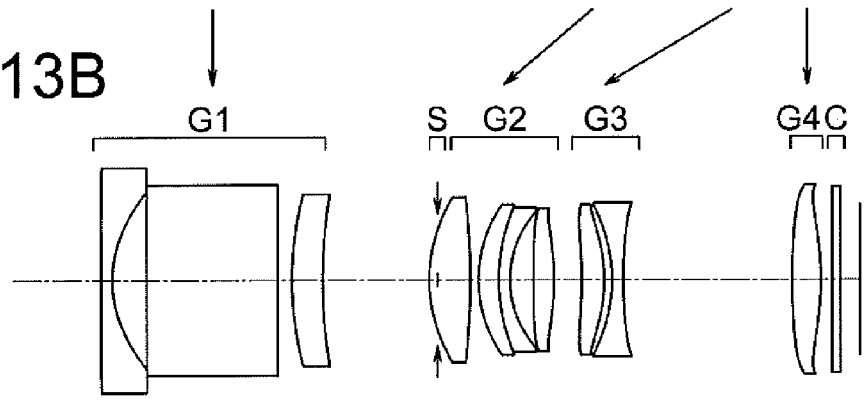
Figure 13C:
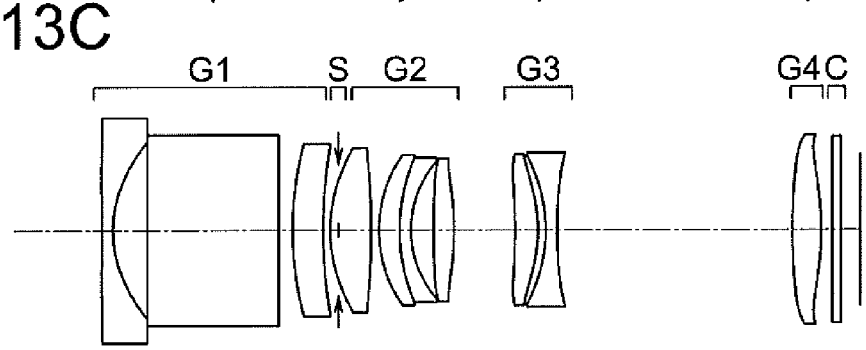

Next, a zoom lens according to a seventh example will be described below. FIG. 13A, FIG. 13B, and FIG. 13C are cross-sectional views along an optical axis showing an optical arrangement at the time of infinite object point focusing of an image pickup optical system according to the seventh example, and FIG. 14A to FIG. 14L are aberration diagrams at the time of infinite object point focusing of the image pickup optical system according to the seventh example.

The zoom lens according to the seventh example, as shown in FIG. 13A, FIG. 13B, and FIG. 13C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a biconcave negative lens L1, a reflecting optical element L2, and a positive meniscus lens L3 having a convex surface directed toward the object side.

The second lens group G2 includes in order from the object side, a biconvex positive lens L4, a positive meniscus lens L5 having a convex surface directed toward the object side, a negative meniscus lens L6 having a convex surface directed toward the object side, and a biconvex positive lens L7. Here, the positive meniscus lens L5 and the negative meniscus lens L6 are cemented.

The third lens group G3 includes a positive meniscus lens L8 having a convex surface directed toward an image side, and a biconcave negative lens L9.

The fourth lens group G4 includes a biconvex positive lens L10.

At the time of zooming from a wide angle end to a telephoto end, the first lens group G1 is fixed (stationary), the second lens group G2 moves toward the object side, the third lens group G3 moves toward the object side, and the fourth lens group G4 is fixed.

An aspheric surface is provided to a total of twelve surfaces namely, both surfaces of the biconcave negative lens L1, both surfaces of the biconvex positive lens L4, both surfaces of the biconvex positive lens L7, both surfaces of the positive meniscus lens L8, both surfaces of the biconcave negative lens L9, and both surfaces of the biconvex positive lens L10.

Figure 15A:
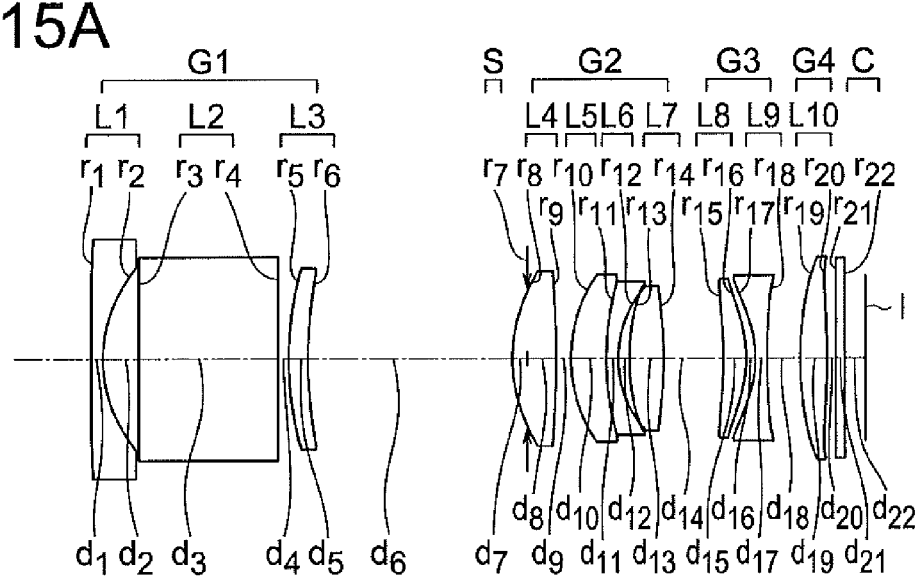
FIG. 15A, FIG. 15B, and FIG. 15C are cross-sectional views along an optical axis showing an optical arrangement of a zoom lens according to an eighth example of the present invention, at the time of infinite object point focusing, where.
Figure 15B:
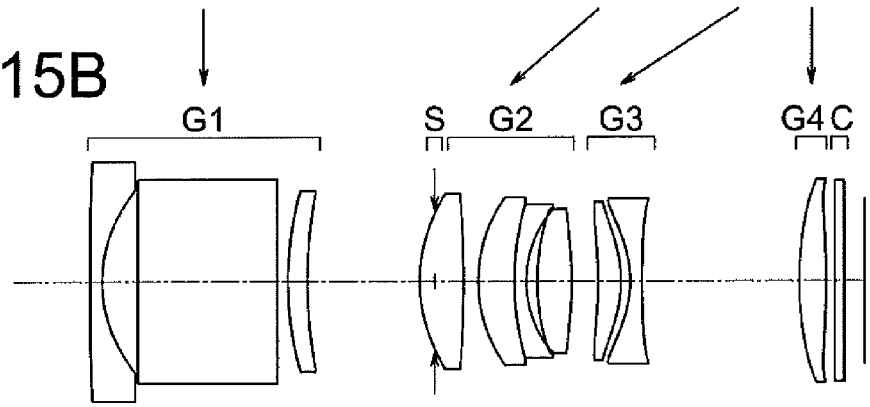
Figure 15C:
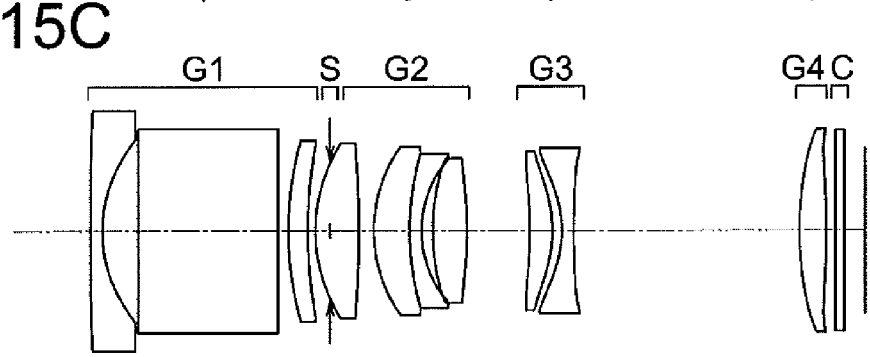

Next, a zoom lens according to an eighth example will be described below. FIG. 15A, FIG. 15B, and FIG. 15C are cross-sectional views along an optical axis showing an optical arrangement at the time of infinite object point focusing of an image pickup optical system according to the eighth example, and FIG. 16A to FIG. 16L are aberration diagrams at the time of infinite object point focusing of the image pickup optical system according to the eighth example.

The zoom lens according to the eighth example, as shown in FIG. 15A, FIG. 15B, and FIG. 15C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a biconcave negative lens L1, a reflecting optical element L2, and a positive meniscus lens L3 having a convex surface directed toward the object side.

The second lens group G2 includes in order from the object side, a biconvex positive lens L4, a positive meniscus lens L5 having a convex surface directed toward the object side, a negative meniscus lens L6 having a convex surface directed toward the object side, and a biconvex positive lens L7. Here, the positive meniscus lens L5 and the negative meniscus lens L6 are cemented.

The third lens group G3 includes a positive meniscus lens L8 having a convex surface directed toward an image side, and a biconcave negative lens L9.

The fourth lens group G4 includes a biconvex positive lens L10.

At the time of zooming from a wide angle end to a telephoto end, the first lens group G1 is fixed (stationary), the second lens group G2 moves toward the object side, the third lens group G3 moves toward the object side, and the fourth lens group G4 is fixed (stationary).

An aspheric surface is provided to a total of twelve surfaces namely, both surfaces of the biconcave negative lens L1, both surfaces of the biconvex positive lens L4, both surfaces of the biconvex positive lens L7, both surfaces of the positive meniscus lens L8, both surfaces of the biconcave negative lens L9, and both surfaces of the biconvex positive lens L10.

Figure 17A:
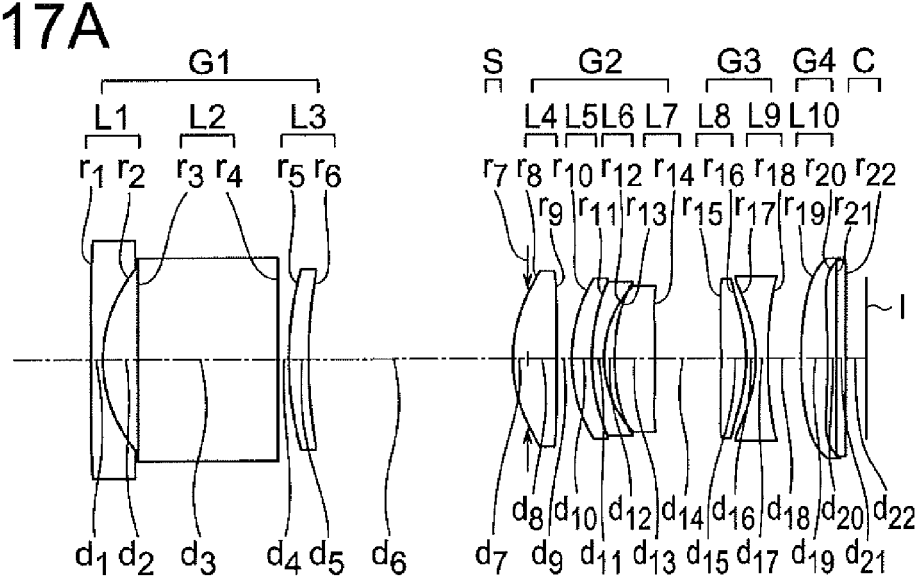
FIG. 17A, FIG. 17B, and FIG. 17C are cross-sectional views along an optical axis showing an optical arrangement of a zoom lens according to a ninth example of the present invention, at the time of infinite object point focusing, where.
Figure 17B:
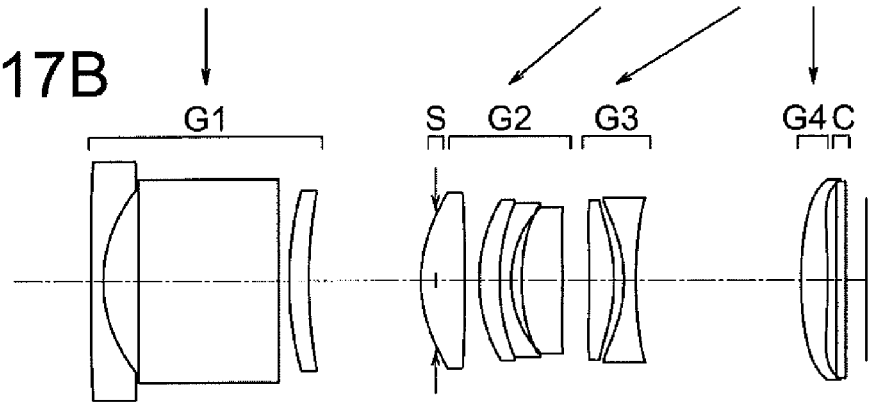
Figure 17C:
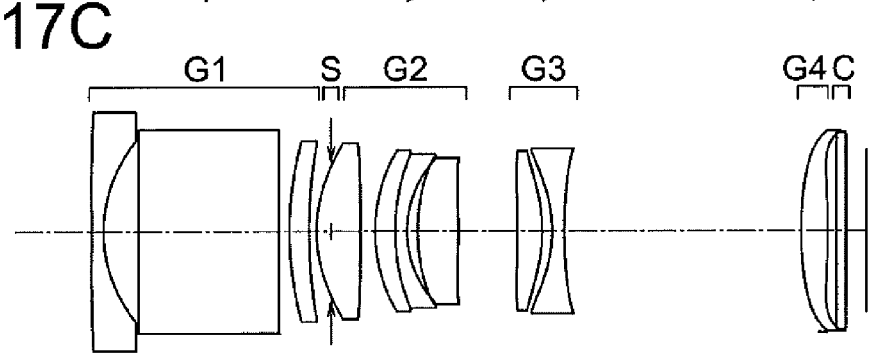

Next, a zoom lens according to a ninth example will be described below. FIG. 17A, FIG. 17B, and FIG. 17C are cross-sectional views along an optical axis showing an optical arrangement at the time of infinite object point focusing of an image pickup optical system according to the ninth example, and FIG. 18A to FIG. 18L are aberration diagrams at the time of infinite object point focusing of the image pickup optical system according to the ninth example.

The zoom lens according to the ninth example, as shown in FIG. 17A, FIG. 17B, and FIG. 17C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a biconcave negative lens L1, a reflecting optical element L2, and a positive meniscus lens L3 having a convex surface directed toward the object side.

The second lens group G2 includes in order from the object side, a biconvex positive lens L4, a positive meniscus lens L5 having a convex surface directed toward the object side, a negative meniscus lens L6 having a convex surface directed toward the object side, and a biconvex positive lens L7. Here, the positive meniscus lens L5 and the negative meniscus lens L6 are cemented.

The third lens group G3 includes a positive meniscus lens L8 having a convex surface directed toward an image side, and a biconcave negative lens L9.

The fourth lens group G4 includes a biconvex positive lens L10.

At the time of zooming from a wide angle end to a telephoto end, the first lens group G1 is fixed (stationary), the second lens group G2 moves toward the object side, the third lens group G3 moves toward the object side, and the fourth lens group G4 is fixed (stationary).

An aspheric surface is provided to a total of twelve surfaces namely, both surfaces of the biconcave negative lens L1, both surfaces of the biconvex positive lens L4, both surfaces of the biconvex positive lens L7, both surfaces of the positive meniscus lens L8, both surfaces of the biconcave negative lens L9, and both surfaces of the biconvex positive lens L10.

Figure 19A:
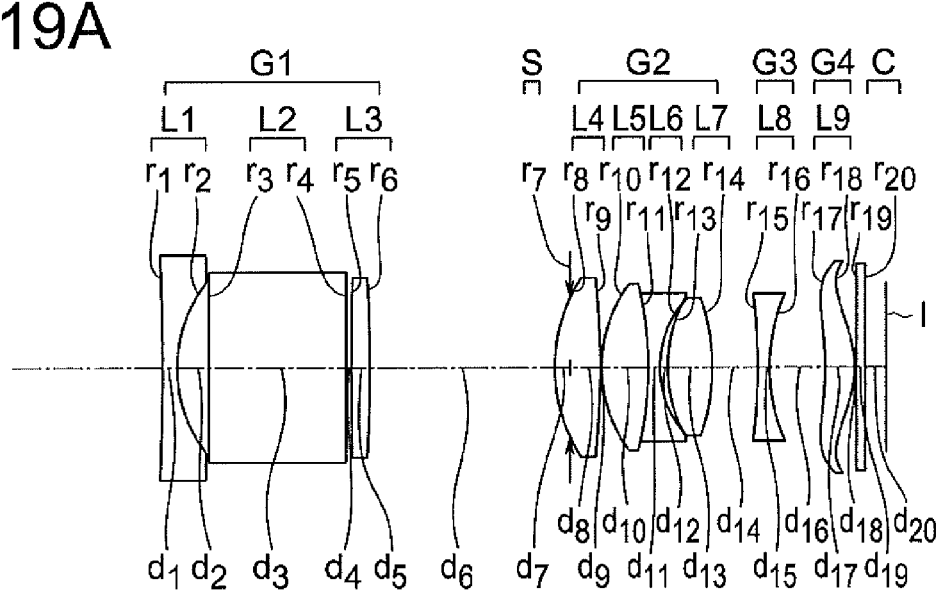
FIG. 19A, FIG. 19B, and FIG. 19C are cross-sectional views along an optical axis showing an optical arrangement of a zoom lens according to a tenth example of the present invention, at the time of infinite object point focusing, where.
Figure 19B:
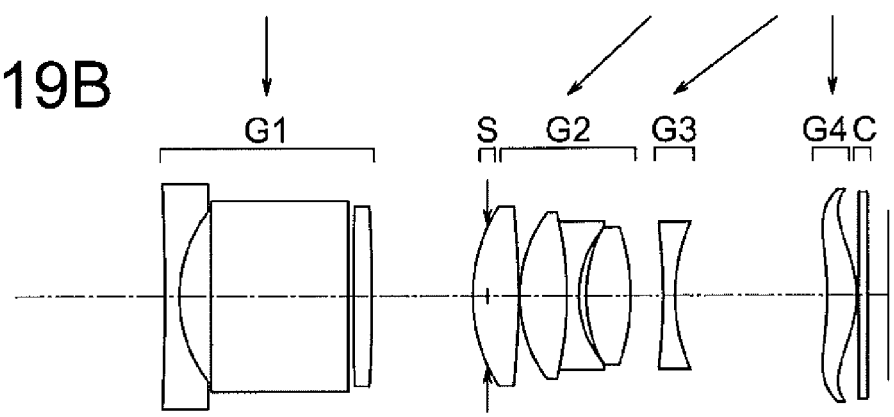
Figure 19C:
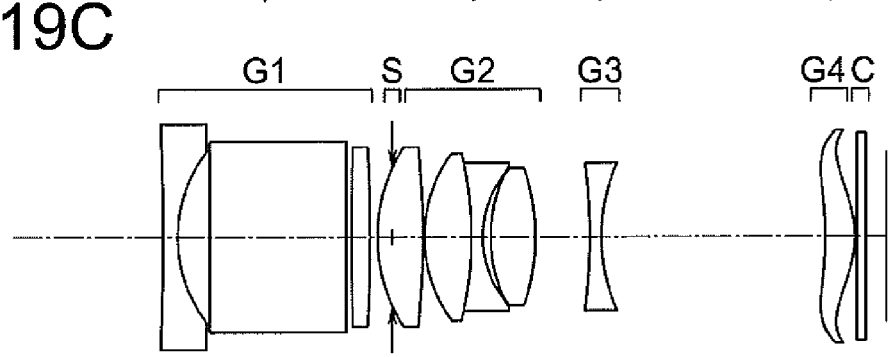

Next, a zoom lens according to a tenth example will be described below. FIG. 19A, FIG. 19B, and FIG. 19C are cross-sectional views along an optical axis showing an optical arrangement at the time of infinite object point focusing of an image pickup optical system according to the tenth example, and FIG. 20A to FIG. 20L are aberration diagrams at the time of infinite object point focusing of the image pickup optical system according to the tenth example.

The zoom lens according to the tenth example, as shown in FIG. 19A, FIG. 19B, and FIG. 19C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a biconcave negative lens L1, a reflecting optical element L2, and a biconvex positive lens L3.

The second lens group G2 includes in order from the object side, a biconvex positive lens L4, a biconvex positive lens L5, a biconcave negative lens L6, and a biconvex positive lens L7. Here, the biconvex positive lens L5 and the biconcave negative lens L6 are cemented.

The third lens group G3 includes a biconcave negative lens L8.

The fourth lens group G4 includes a positive meniscus lens L9 having a convex surface directed toward an image side.

At the time of zooming from a wide angle end to a telephoto end, the first lens group G1 is fixed (stationary), the second lens group G2 moves toward the object side, the third lens group G3 moves toward the object side, and the fourth lens group G4 is fixed (stationary).

An aspheric surface is provided to a total of seven surfaces namely, both surfaces of the biconvex positive lens L3, both surfaces of the biconvex positive lens L4, an image-side surface of the biconvex positive lens L7, and both surfaces of the positive meniscus lens L9.

Figure 21A:
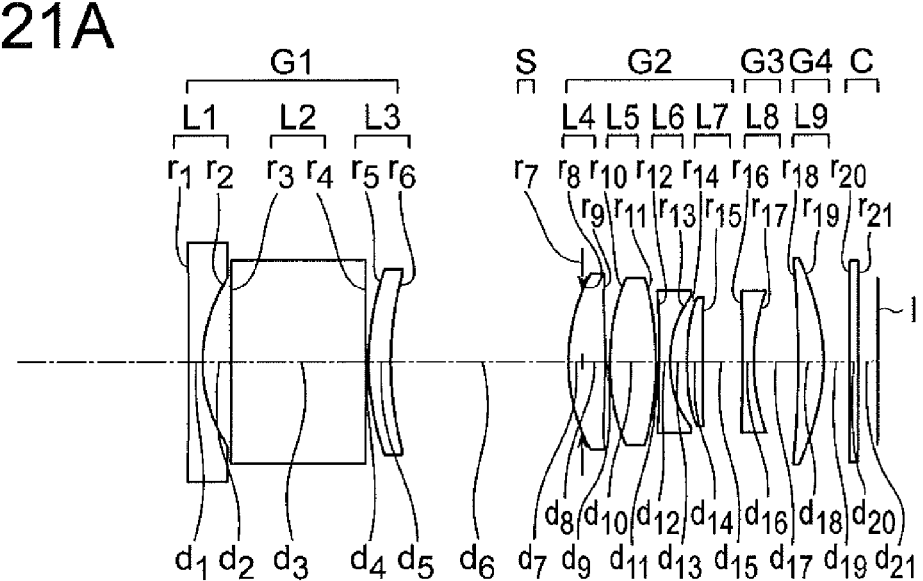
FIG. 21A, FIG. 21B, and FIG. 21C are cross-sectional views along an optical axis showing an optical arrangement of a zoom lens according to an eleventh example of the present invention, at the time of infinite object point focusing, where.
Figure 21B:
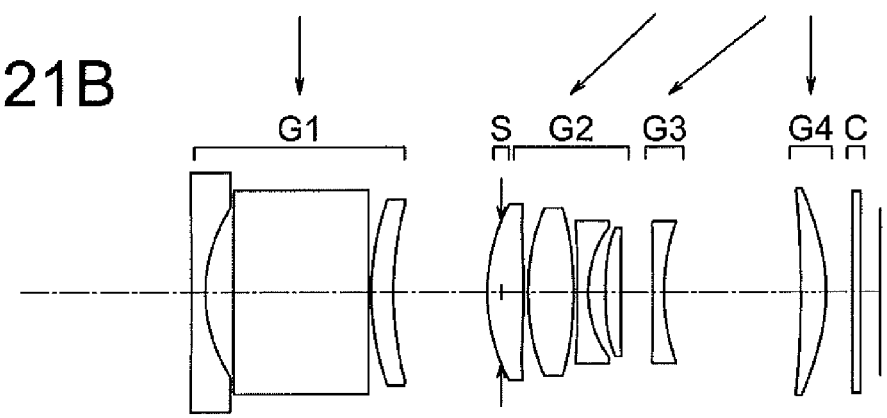
Figure 21C:
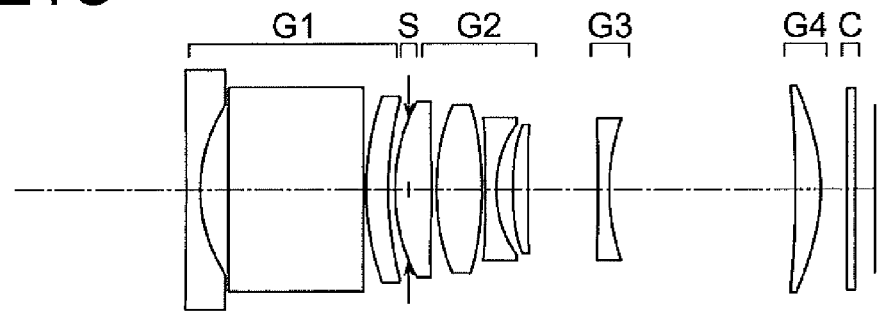

Next, a zoom lens according to an eleventh example will be described below. FIG. 21A, FIG. 21B, and FIG. 21C are cross-sectional views along an optical axis showing an optical arrangement at the time of infinite object point focusing of an image pickup optical system according the eleventh example, and FIG. 22A to FIG. 22L are aberration diagrams at the time of infinite object point focusing of the image pickup optical system according to the eleventh example.

The zoom lens according to the eleventh example, as shown in FIG. 21A, FIG. 21B, and FIG. 21C, includes in order from an object side, a first lens group G1 having a negative refractive power, an aperture stop S, a second lens group G2 having a positive refractive power, a third lens group G3 having a negative refractive power, and a fourth lens group G4 having a positive refractive power.

The first lens group G1 includes in order from the object side, a biconcave negative lens L1, a reflecting optical element L2, and a positive meniscus lens L3 having a convex surface directed toward the object side.

The second lens group G2 includes in order from the object side, a biconvex positive lens L4, a biconvex positive lens L5, a negative meniscus lens L6 having a convex surface directed toward the object side, and a biconvex positive lens L7.

The third lens group G3 includes a biconcave negative lens L8.

The fourth lens group G4 includes a positive meniscus lens L9 having a convex surface directed toward an image side.

At the time of zooming from a wide angle end to a telephoto end, the first lens group G1 is fixed (stationary), the second lens group G2 moves toward the object side, the third lens group G3 moves toward the object side, and the fourth lens group G4 is fixed (stationary).

An aspheric surface is provided to a total of ten surfaces namely, an image-side surface of the biconcave negative lens L1, both surfaces of all the lenses (lenses L4, L5, L6, and L7) in the second lens group G2, and an image-side surface of the positive meniscus lens L9.

Next, numerical data of optical components comprising the zoom lens of each above example are shown. In numerical data of each example, r1, r2, . . . stands for a curvature radius of each lens surface, d1, d2, . . . stands for a thickness of each lens or an air distance between adjacent lens surfaces, nd1, nd2, . . . stands for a refractive index of each lens for d-line, ν1, νd2, . . . stands for an Abbe number of each lens, * stands for an aspheric surface. Furthermore, WE stands for a wide angle end, ST stands for an intermediate focal length state, TE stands for a telephoto end, focal length stands for a focal length of an overall zoom lens system, FNO. stands for an F number, ω denotes a half angle of view, fb stands for a back focus, and each of f1, f2 . . . is a focal length of each lens group. Also, the total length is the distance from the frontmost lens surface to the rearmost lens surface plus back focus. Further, back focus is a unit which is expressed upon air conversion of a distance from the lens backmost surface to a paraxial image surface.

A shape of an aspheric surface is defined by the following expression where the direction of the optical axis is represented by z, the direction orthogonal to the optical axis is represented by y, a conical coefficient is represented by k, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Moreover, in the aspherical surface coefficients, 'e-n' (where, n is an integral number) indicates '$10^{-n}$'. These symbols are commonly used in the following numerical data for each example.

Example 1

Unit mm

Surface data

| Surface no. | r | d | nd | νd |
|---|---|---|---|---|
| Object plane | ∞ | ∞ | | |
| 1 | 200.000 | 0.40 | 1.72903 | 54.04 |
| 2* | 3.273 | 1.18 | | |
| 3 | ∞ | 4.65 | 1.88300 | 40.80 |
| 4 | ∞ | 0.21 | | |
| 5 | 9.122 | 0.80 | 1.94595 | 17.98 |
| 6 | 14.157 | Variable | | |
| 7(stop) | ∞ | -0.50 | | |
| 8* | 3.742 | 1.80 | 1.55332 | 71.68 |
| 9* | -16.985 | 0.32 | | |
| 10 | 10.438 | 1.27 | 1.49700 | 81.54 |
| 11 | -5.421 | 0.40 | 1.91082 | 35.25 |
| 12 | 6.392 | 0.40 | | |
| 13 | 7.697 | 1.00 | 1.53367 | 55.82 |
| 14* | -5.586 | Variable | | |
| 15 | -19.471 | 1.00 | 1.53367 | 55.82 |
| 16* | -3.371 | 0.31 | | |
| 17* | -2.859 | 0.40 | 1.53367 | 55.82 |
| 18 | 7.386 | Variable | | |
| 19* | 9.352 | 0.83 | 1.63493 | 23.90 |
| 20* | -20.773 | 0.30 | | |
| 21 | ∞ | 0.30 | 1.51633 | 64.14 |
| 22 | ∞ | 0.70 | | |
| Image plane | ∞ | | | |

Aspherical surface data

2nd surface k = -0.274
A4 = -1.99537e-03, A6 = -2.58039e-05, A8 = -9.39645e-06

8th surface k = -2.228
A4 = 4.53625e-03, A6 = -8.13280e-05, A8 = 6.82728e-06

9th surface k = 4.423
A4 = 1.67943e-03, A6 = -7.88648e-05, A8 = -2.62814e-06

14th surface k = -4.001
A4 = 1.10666e-03, A6 = 1.80226e-04, A8 = 7.82646e-05

16th surface k = 0.000
A4 = 4.61411e-03, A6 = -1.41368e-04, A8 = -1.27075e-04

17th surface k = 0.000
A4 = 7.23481e-03, A6 = -3.46512e-04, A8 = -1.21948e-04

19th surface k = 0.000
A4 = -1.53947e-03, A6 = -2.06800e-05

20th surface k = 0.000
A4 = 5.00000e-04, A6 = -4.88652e-05

Zoom data

| | WE | ST | TE |
|---|---|---|---|
| Focal length | 3.40 | 5.75 | 9.69 |
| FNO. | 2.40 | 3.44 | 4.65 |
| Angle of field 2ω | 69.28 | 42.20 | 25.47 |
| fb (in air) | 1.22 | 1.19 | 1.20 |
| Lens total length (in air) | 25.80 | 25.77 | 25.78 |
| d6 | 7.11 | 4.11 | 0.76 |
| d14 | 1.71 | 1.00 | 1.90 |
| d18 | 1.30 | 5.01 | 7.46 |

Unit focal length

| f1 = -6.59 | f2 = 6.04 | f3 = -8.33 | f4 = 10.27 |
|---|---|---|---|

Example 2

| Unit mm | | | | |
|---|---|---|---|---|
| Surface data | | | | |
| Surface no. | r | d | nd | vd |
| Object plane | ∞ | ∞ | | |
| 1 | 200.000 | 0.40 | 1.73007 | 51.70 |
| 2* | 3.207 | 1.17 | | |
| 3 | ∞ | 4.65 | 1.88300 | 40.80 |
| 4 | ∞ | 0.22 | | |
| 5 | 9.212 | 0.80 | 1.94595 | 17.98 |
| 6 | 14.649 | Variable | | |
| 7(stop) | ∞ | −0.50 | | |
| 8* | 3.398 | 1.85 | 1.55337 | 70.47 |
| 9* | −13.211 | 0.10 | | |
| 10 | 14.756 | 1.53 | 1.49737 | 81.45 |
| 11 | −9.224 | 0.40 | 1.91070 | 34.62 |
| 12 | 3.150 | 0.22 | | |
| 13* | 3.356 | 1.06 | 1.53367 | 55.82 |
| 14* | −5.762 | Variable | | |
| 15 | −12.426 | 0.79 | 1.53367 | 55.82 |
| 16* | −4.493 | 0.43 | | |
| 17* | −3.051 | 0.40 | 1.53367 | 55.82 |
| 18 | 23.740 | Variable | | |
| 19* | 10.346 | 0.84 | 1.63493 | 23.90 |
| 20* | −14.948 | 0.30 | | |
| 21 | ∞ | 0.30 | 1.51633 | 64.14 |
| 22 | ∞ | 0.70 | | |
| Image plane | ∞ | | | |

Aspherical surface data

2nd surface $k = -0.179$
$A4 = -2.62914e-03, A6 = -4.45919e-05, A8 = -1.63156e-05$ 8th surface $k = -2.205$
$A4 = 4.87045e-03, A6 = -1.82169e-04$ 9th surface $k = -3.559$
$A4 = 6.08844e-04, A6 = -1.12952e-04$ 13th surface $k = 0.000$
$A4 = -4.24897e-03, A6 = -3.38158e-04$ 14th surface $k = -5.000$
$A4 = -2.77515e-03, A6 = 1.10596e-04$ 16th surface $k = 0.000$
$A4 = -7.19754e-03, A6 = -9.93372e-04$ 17th surface $k = 0.000$
$A4 = -7.64145e-03, A6 = -9.48260e-04$ 19th surface $k = 0.000$
$A4 = -1.18464e-03, A6 = 4.52097e-05$ 20th surface $k = 0.000$
$A4 = 5.00000e-04, A6 = 1.00000e-04$ Zoom data

| | WE | ST | TE |
|---|---|---|---|
| Focal length | 3.45 | 5.81 | 9.82 |
| FNO. | 2.45 | 3.51 | 4.77 |
| Angle of field 2ω | 68.41 | 41.83 | 25.15 |

-continued

| Unit mm | | | |
|---|---|---|---|
| fb (in air) | 1.20 | 1.17 | 1.20 |
| Lens total length (in air) | 25.60 | 25.57 | 25.59 |
| d6 | 7.11 | 4.10 | 0.78 |
| d14 | 1.64 | 1.01 | 2.03 |
| d18 | 1.30 | 4.94 | 7.23 |

| Unit focal length | | | |
|---|---|---|---|
| f1 = −6.51 | f2 = 5.96 | f3 = −8.53 | f4 = 9.76 |

Example 3

| Unit mm | | | | |
|---|---|---|---|---|
| Surface data | | | | |
| Surface no. | r | d | nd | vd |
| Object plane | ∞ | ∞ | | |
| 1 | 200.000 | 0.40 | 1.72903 | 54.04 |
| 2* | 3.324 | 1.15 | | |
| 3 | ∞ | 4.70 | 1.88300 | 40.80 |
| 4 | ∞ | 0.19 | | |
| 5 | 8.808 | 0.80 | 1.94595 | 17.98 |
| 6 | 12.906 | Variable | | |
| 7(stop) | ∞ | −0.50 | | |
| 8* | 4.399 | 1.43 | 1.62263 | 58.16 |
| 9* | −36.406 | 0.50 | | |
| 10 | 4.806 | 1.08 | 1.49700 | 81.54 |
| 11 | 26.975 | 0.40 | 2.00100 | 29.13 |
| 12 | 3.363 | 0.28 | | |
| 13* | 5.478 | 1.23 | 1.53367 | 55.82 |
| 14* | −8.143 | Variable | | |
| 15 | −68.013 | 0.95 | 1.53367 | 55.82 |
| 16* | −3.530 | 0.18 | | |
| 17* | −3.143 | 0.40 | 1.53367 | 55.82 |
| 18 | 7.849 | Variable | | |
| 19* | 8.435 | 1.15 | 1.63493 | 23.90 |
| 20* | −28.648 | 0.30 | | |
| 21 | ∞ | 0.30 | 1.51633 | 64.14 |
| 22 | ∞ | 0.70 | | |
| Image plane | ∞ | | | |

Aspherical surface data

2nd surface $k = -0.357$
$A4 = -1.59618e-03, A6 = -1.37159e-06, A8 = -6.27652e-06$ 8th surface $k = -2.072$
$A4 = 1.33346e-03, A6 = -4.70405e-05, A8 = -1.49100e-05,$
$A10 = -8.27073e-08$ 9th surface $k = -2.838$
$A4 = -7.25052e-04, A6 = -4.80920e-06, A8 = -1.63979e-05,$
$A10 = 9.31676e-08$ 13th surface $k = 0.000$
$A4 = -1.91909e-03, A6 = 2.09010e-04$ 14th surface $k = -0.152$
$A4 = 1.25388e-04, A6 = 1.66254e-04$ 16th surface $k = 0.000$
$A4 = 4.34496e-03, A6 = -9.93946e-04$ -continued Unit mm 17th surface k = 0.000
A4 = 5.26957e−03, A6 = −1.00616e−03

19th surface k = 0.000
A4 = −1.31603e−03, A6 = 1.00000e−04

20th surface k = 0.000
A4 = 5.00000e−04, A6 = 1.00000e−04

Zoom data

|  | WE | ST | TE |
|---|---|---|---|
| Focal length | 3.41 | 5.75 | 9.71 |
| FNO. | 2.41 | 3.41 | 4.61 |
| Angle of field 2ω | 69.79 | 42.34 | 25.43 |
| fb (in air) | 1.22 | 1.17 | 1.18 |
| Lens total length (in air) | 25.92 | 25.87 | 25.88 |
| d6 | 7.22 | 4.09 | 0.75 |
| d14 | 1.84 | 1.00 | 2.50 |
| d18 | 1.30 | 5.27 | 7.11 |

Unit focal length

| f1 = −6.50 | f2 = 6.15 | f3 = −11.23 | f4 = 10.39 |
|---|---|---|---|

Example 4

Unit mm

Surface data

| Surface no. | r | d | nd | νd |
|---|---|---|---|---|
| Object plane | ∞ | ∞ | | |
| 1 | 200.000 | 0.40 | 1.72903 | 54.04 |
| 2* | 3.375 | 1.22 | | |
| 3 | ∞ | 4.70 | 1.88300 | 40.80 |
| 4 | ∞ | 0.18 | | |
| 5 | 8.400 | 0.80 | 1.94595 | 17.98 |
| 6 | 11.572 | Variable | | |
| 7(stop) | ∞ | −0.50 | | |
| 8* | 4.397 | 1.39 | 1.62263 | 58.16 |
| 9* | −31.947 | 0.50 | | |
| 10 | 4.473 | 1.01 | 1.49700 | 81.54 |
| 11 | 29.847 | 0.40 | 2.00100 | 29.13 |
| 12 | 3.310 | 0.29 | | |
| 13* | 5.543 | 1.17 | 1.53367 | 55.82 |
| 14* | −8.711 | Variable | | |
| 15 | 58.308 | 1.16 | 1.53367 | 55.82 |
| 16* | 4.332 | 0.16 | | |
| 17* | 4.986 | 0.54 | 1.63493 | 23.90 |
| 18 | 6.609 | Variable | | |
| 19* | 8.950 | 0.90 | 1.53367 | 55.82 |
| 20* | −14.641 | 0.30 | | |
| 21 | ∞ | 0.30 | 1.51633 | 64.14 |
| 22 | ∞ | 0.70 | | |
| Image plane | ∞ | | | |

Aspherical surface data

2nd surface k = −0.432
A4 = −1.16535e−03, A6 = 3.93914e−05, A8 = −5.88806e−06

8th surface k = −1.875
A4 = 1.60384e−03, A6 = −6.53111e−06, A8 = −1.65869e−05,
A10 = 1.25589e−06

-continued

Unit mm

9th surface k = 4.366
A4 = 1.95308e−04, A6 = −3.13082e−05, A8 = −1.26102e−05,
A10 = 1.20565e−06

13th surface k = 0.000
A4 = −5.37169e−04, A6 = 2.51737e−05

14th surface k = −5.000
A4 = −4.01184e−05, A6 = 1.19704e−04

16th surface k = 0.000
A4 = 8.99287e−03, A6 = −1.28030e−03

17th surface k = 0.000
A4 = 6.93301e−03, A6 = −9.33535e−04

19th surface k = 0.000
A4 = −2.91744e−03, A6 = 1.00000e−04

20th surface k = 0.000
A4 = 9.08723e−05, A6 = −1.68958e−05

Zoom data

|  | WE | ST | TE |
|---|---|---|---|
| Focal length | 3.41 | 5.73 | 9.71 |
| FNO. | 2.42 | 3.41 | 4.60 |
| Angle of field 2ω | 69.88 | 42.50 | 25.42 |
| fb (in air) | 1.23 | 1.17 | 1.19 |
| Lens total length (in air) | 25.91 | 25.85 | 25.87 |
| d6 | 7.21 | 4.09 | 0.75 |
| d14 | 1.86 | 0.92 | 2.50 |
| d18 | 1.27 | 5.33 | 7.09 |

Unit focal length

| f1 = −6.41 | f2 = 6.10 | f3 = −12.34 | f4 = 10.55 |
|---|---|---|---|

Example 5

Unit mm

Surface data

| Surface no. | r | d | nd | νd |
|---|---|---|---|---|
| Object plane | ∞ | ∞ | | |
| 1 | 200.000 | 0.40 | 1.72271 | 55.03 |
| 2* | 3.178 | 1.23 | | |
| 3 | ∞ | 4.70 | 1.88300 | 40.80 |
| 4 | ∞ | 0.20 | | |
| 5 | 8.682 | 0.80 | 1.94595 | 17.98 |
| 6 | 12.664 | Variable | | |
| 7 (stop) | ∞ | −0.50 | | |
| 8* | 4.298 | 1.52 | 1.62851 | 59.17 |
| 9* | −23.894 | 0.50 | | |
| 10 | 4.358 | 1.06 | 1.49739 | 81.45 |
| 11 | 20.224 | 0.40 | 2.00130 | 26.74 |
| 12 | 3.074 | 0.30 | | |
| 13* | 5.260 | 1.25 | 1.53367 | 55.82 |
| 14* | −11.101 | Variable | | |
| 15 | 306.869 | 0.40 | 1.53367 | 55.82 |
| 16* | 3.817 | 0.21 | | |
| 17* | 4.974 | 0.78 | 1.63493 | 23.90 |
| 18 | 9.063 | Variable | | |

-continued

Unit mm

| | | | | |
|---|---|---|---|---|
| 19* | 11.027 | 0.90 | 1.53367 | 55.82 |
| 20* | −14.936 | 0.30 | | |
| 21 | ∞ | 0.30 | 1.51633 | 64.14 |
| 22 | ∞ | 0.70 | | |
| Image plane | ∞ | | | |

Aspherical surface data

2nd surface k = −0.511
A4 = −1.22056e−03, A6 = 5.50708e−05, A8 = −8.77194e−06
8th surface k = −1.873
A4 = 1.62197e−03, A6 = 4.50251e−07, A8 = −1.60647e−05,
A10 = 1.64748e−06
9th surface k = −5.000
A4 = 2.86438e−04, A6 = −1.87756e−05, A8 = −1.15812e−05,
A10 = 1.57748e−06
13th surface k = 0.000
A4 = 5.61945e−04, A6 = 2.88440e−04
14th surface k = −5.000
A4 = 1.37995e−03, A6 = 4.52102e−04
16th surface k = 0.000
A4 = 8.47460e−03, A6 = −1.14980e−03
17th surface k = 0.000
A4 = 6.65787e−03, A6 = −7.04108e−04
19th surface k = 0.000
A4 = −4.18702e−03, A6 = 1.00000e−04
20th surface k = 0.000
A4 = −3.00000e−03, A6 = 4.99570e−05

Zoom data

| | WE | ST | TE |
|---|---|---|---|
| Focal length | 3.42 | 5.71 | 9.73 |
| FNO. | 2.49 | 3.50 | 4.76 |
| Angle of field 2ω | 69.61 | 43.19 | 25.84 |
| fb (in air) | 1.21 | 1.16 | 1.18 |
| Lens total length (in air) | 25.71 | 25.65 | 25.68 |
| d6 | 7.21 | 4.09 | 0.75 |
| d14 | 1.86 | 0.93 | 2.50 |
| d18 | 1.27 | 5.32 | 7.10 |

Unit focal length

| | | | |
|---|---|---|---|
| f1 = −6.25 | f2 = 5.99 | f3 = −12.66 | f4 = 12.03 |

Example 6

Unit mm

Surface data

| Surface no. | r | d | nd | νd |
|---|---|---|---|---|
| Object plane | ∞ | ∞ | | |
| 1* | −293.426 | 0.40 | 1.74320 | 49.29 |

-continued

Unit mm

| | | | | |
|---|---|---|---|---|
| 2* | 3.527 | 1.23 | | |
| 3 | ∞ | 4.70 | 1.88300 | 40.80 |
| 4 | ∞ | 0.19 | | |
| 5 | 8.850 | 0.80 | 1.94595 | 17.98 |
| 6 | 12.934 | Variable | | |
| 7 (stop) | ∞ | −0.50 | | |
| 8* | 3.942 | 1.46 | 1.49710 | 81.56 |
| 9* | −33.818 | 0.50 | | |
| 10 | 3.756 | 0.93 | 1.49700 | 81.54 |
| 11 | 6.927 | 0.40 | 2.00100 | 29.13 |
| 12 | 2.959 | 0.37 | | |
| 13* | 5.936 | 1.28 | 1.53367 | 55.82 |
| 14* | −12.536 | Variable | | |
| 15* | −16.239 | 0.78 | 1.53367 | 55.82 |
| 16* | −3.786 | 0.32 | | |
| 17* | −3.172 | 0.40 | 1.53367 | 55.82 |
| 18* | 20.485 | Variable | | |
| 19* | 8.440 | 0.90 | 1.53367 | 55.82 |
| 20* | −24.546 | 0.30 | | |
| 21 | ∞ | 0.30 | 1.51633 | 64.14 |
| 22 | ∞ | 0.70 | | |
| Image plane | ∞ | | | |

Aspherical surface data

1st surface k = 0.000
A4 = 8.00933e−04, A6 = −2.55067e−05
2nd surface k = −0.352
A4 = −4.77492e−04, A6 = 5.75994e−05, A8 = −1.10487e−05
8th surface k = −2.270
A4 = 2.92448e−03, A6 = −2.02194e−04, A8 = 2.17785e−05,
A10 = −1.32814e−06
9th surface k = 5.000
A4 = 2.68550e−04, A6 = −1.27727e−04, A8 = 2.38530e−05,
A10 = −1.78412e−06
13th surface k = 0.000
A4 = 6.36307e−04, A6 = 4.47535e−04
14th surface k = −1.519
A4 = 2.04355e−03, A6 = 4.78766e−04
15th surface k = 0.000
A4 = 1.61081e−03, A6 = 3.75675e−04
16th surface k = 0.000
A4 = 4.68874e−03, A6 = 6.83603e−04
17th surface k = 0.000
A4 = 5.92913e−03, A6 = 9.28635e−04
18th surface k = 0.000
A4 = 1.24836e−03, A6 = 2.11112e−04, A8 = 2.84280e−05
19th surface k = 0.000
A4 = −1.72135e−04, A6 = −1.00000e−04, A8 = 5.71199e−05
20th surface k = 0.000
A4 = −1.40792e−04, A6 = 1.00000e−04, A8 = 6.54713e−05

-continued

Unit mm

Zoom data

|  | WE | ST | TE |
|---|---|---|---|
| Focal length | 3.43 | 5.78 | 9.78 |
| FNO. | 2.43 | 3.45 | 4.66 |
| Angle of field 2ω | 69.61 | 42.89 | 25.72 |
| fb (in air) | 1.21 | 1.18 | 1.19 |
| Lens total length (in air) | 25.91 | 25.88 | 25.89 |
| d6 | 7.29 | 4.16 | 0.75 |
| d14 | 2.05 | 0.90 | 2.29 |
| d18 | 1.19 | 5.47 | 7.49 |

Unit focal length

| f1 = −6.58 | f2 = 6.21 | f3 = −12.41 | f4 = 11.88 |
|---|---|---|---|

Example 7

Unit mm

Surface data

| Surface no. | r | d | nd | vd |
|---|---|---|---|---|
| Object plane | ∞ | ∞ | | |
| 1* | −149.587 | 0.40 | 1.74320 | 49.29 |
| 2* | 3.518 | 1.23 | | |
| 3 | ∞ | 4.70 | 1.91082 | 35.25 |
| 4 | ∞ | 0.50 | | |
| 5 | 9.528 | 1.10 | 1.94595 | 17.98 |
| 6 | 14.619 | Variable | | |
| 7 (stop) | ∞ | −0.30 | | |
| 8* | 4.199 | 1.47 | 1.49710 | 81.56 |
| 9* | −18.863 | 0.29 | | |
| 10 | 3.792 | 0.75 | 1.49700 | 81.54 |
| 11 | 5.339 | 0.40 | 1.84666 | 23.78 |
| 12 | 3.019 | 0.83 | | |
| 13* | 72.066 | 0.73 | 1.51633 | 64.06 |
| 14* | −7.065 | Variable | | |
| 15* | −17.039 | 0.82 | 1.53071 | 55.69 |
| 16* | −4.356 | 0.28 | | |
| 17* | −4.131 | 0.40 | 1.53071 | 55.69 |
| 18* | 12.080 | Variable | | |
| 19* | 15.748 | 1.04 | 1.53071 | 55.69 |
| 20* | −8.596 | 0.40 | | |
| 21 | ∞ | 0.30 | 1.51633 | 64.14 |
| 22 | ∞ | 0.70 | | |
| Image plane | ∞ | | | |

Aspherical surface data

1st surface k = 0.000
A4 = 7.27861e−04, A6 = −2.63700e−05
2nd surface k = −0.195
A4 = −1.18954e−03, A6 = 6.42509e−05, A8 = −1.77626e−05
8th surface k = −5.000
A4 = 6.48812e−03, A6 = −4.82578e−04, A8 = 2.00255e−06,
A10 = 2.42127e−06
9th surface k = −4.166
A4 = 3.28280e−04, A6 = 2.34135e−04, A8 = −8.13475e−05,
A10 = 7.76079e−06

-continued

Unit mm

13th surface k = 0.000
A4 = 1.56489e−03, A6 = 6.93389e−04
14th surface k = −5.000
A4 = 7.84780e−04, A6 = 8.29918e−04
15th surface k = 0.000
A4 = −1.36831e−03, A6 = 1.03344e−03
16th surface k = 0.000
A4 = 1.25828e−03, A6 = 9.96955e−04
17th surface k = 0.000
A4 = 2.49605e−03, A6 = −1.45660e−06
18th surface k = 0.000
A4 = 5.31750e−04, A6 = −3.33403e−04, A8 = 8.25086e−05
19th surface k = 0.000
A4 = −1.04881e−03, A6 = −4.63631e−05, A8 = 3.84133e−05
20th surface k = 0.000
A4 = 5.00000e−04, A6 = 1.00000e−04, A8 = 3.04143e−05

Zoom data

|  | WE | ST | TE |
|---|---|---|---|
| Focal length | 3.35 | 5.66 | 9.55 |
| FNO. | 2.46 | 3.48 | 4.76 |
| Angle of field 2ω | 70.85 | 43.63 | 26.31 |
| fb (in air) | 1.31 | 1.26 | 1.30 |
| Lens total length (in air) | 27.11 | 27.06 | 27.10 |
| d6 | 7.52 | 4.14 | 0.55 |
| d14 | 2.14 | 0.98 | 2.18 |
| d18 | 1.50 | 6.04 | 8.43 |

Unit focal length

| f1 = −6.60 | f2 = 6.39 | f3 = −12.75 | f4 = 10.64 |
|---|---|---|---|

Example 8

Unit mm

Surface data

| Surface no. | r | d | nd | vd |
|---|---|---|---|---|
| Object plane | ∞ | ∞ | | |
| 1* | −200.000 | 0.40 | 1.74320 | 49.29 |
| 2* | 3.692 | 1.20 | | |
| 3 | ∞ | 4.70 | 1.88300 | 40.80 |
| 4 | ∞ | 0.35 | | |
| 5 | 8.924 | 0.65 | 1.94595 | 17.98 |
| 6 | 12.689 | Variable | | |
| 7 (stop) | ∞ | −0.50 | | |
| 8* | 4.059 | 1.47 | 1.49710 | 81.56 |
| 9* | −28.249 | 0.50 | | |
| 10 | 3.991 | 1.19 | 1.49700 | 81.54 |
| 11 | 7.566 | 0.40 | 2.00100 | 29.13 |
| 12 | 3.000 | 0.37 | | |
| 13* | 5.917 | 1.15 | 1.53367 | 55.82 |
| 14* | −10.389 | Variable | | |

-continued

Unit mm

| | | | | |
|---|---|---|---|---|
| 15* | −10.841 | 0.76 | 1.53367 | 55.82 |
| 16* | −3.448 | 0.31 | | |
| 17* | −2.956 | 0.40 | 1.53367 | 55.82 |
| 18* | 33.329 | Variable | | |
| 19* | 8.884 | 0.90 | 1.53367 | 55.82 |
| 20* | −21.805 | 0.30 | | |
| 21 | ∞ | 0.30 | 1.51633 | 64.14 |
| 22 | ∞ | 0.70 | | |
| Image plane | ∞ | | | |

Aspherical surface data

1st surface k = 0.000
A4 = 9.22684e−04, A6 = −2.52912e−05
2nd surface k = −0.485
A4 = 1.90053e−04, A6 = 7.42670e−05, A8 = −7.20348e−06
8th surface k = −3.162
A4 = 4.04460e−03, A6 = −2.22388e−04, A8 = 7.89689e−06,
A10 = 3.86890e−07
9th surface k = 3.735
A4 = −1.28763e−04, A6 = 7.27635e−05, A8 = −1.62107e−05,
A10 = 1.77773e−06
13th surface k = 0.000
A4 = −8.54796e−04, A6 = 4.44393e−04
14th surface k = −5.000
A4 = 2.27778e−04, A6 = 3.99119e−04
15th surface k = 0.000
A4 = 2.21189e−03, A6 = 3.44190e−04
16th surface k = 0.000
A4 = 6.13826e−03, A6 = 8.04562e−04
17th surface k = 0.000
A4 = 7.60970e−03, A6 = 1.11618e−03
18th surface k = 0.000
A4 = 1.64654e−03, A6 = 1.97227e−04, A8 = 1.54732e−05
19th surface A4 = −1.04944e−05, A6 = −1.00000e−04, A8 = 1.85791e−05
20th surface k = 0.000
A4 = 5.00000e−04, A6 = 1.00000e−04, A8 = 9.70322e−06

Zoom data

| | WE | ST | TE |
|---|---|---|---|
| Focal length | 3.49 | 5.82 | 9.94 |
| FNO. | 2.44 | 3.45 | 4.71 |
| Angle of field 2ω | 68.72 | 42.66 | 25.32 |
| fb (in air) | 1.21 | 1.18 | 1.19 |
| Lens total length (in air) | 25.91 | 25.88 | 25.89 |
| d6 | 7.32 | 4.26 | 0.75 |

-continued

Unit mm

| | | | |
|---|---|---|---|
| d14 | 2.01 | 0.90 | 2.10 |
| d18 | 1.10 | 5.28 | 7.58 |

Unit focal length

| f1 = −6.77 | f2 = 6.18 | f3 = −11.69 | f4 = 11.95 |

Example 9

Unit mm

Surface data

| Surface no. | r | d | nd | vd |
|---|---|---|---|---|
| Object plane | ∞ | ∞ | | |
| 1* | −200.000 | 0.40 | 1.74320 | 49.29 |
| 2* | 3.718 | 1.17 | | |
| 3 | ∞ | 4.70 | 1.88300 | 40.80 |
| 4 | ∞ | 0.36 | | |
| 5 | 9.176 | 0.65 | 1.94595 | 17.98 |
| 6 | 13.521 | Variable | | |
| 7 (stop) | ∞ | −0.50 | | |
| 8* | 3.726 | 1.47 | 1.49710 | 81.56 |
| 9* | −200.000 | 0.50 | | |
| 10 | 4.272 | 0.68 | 1.49700 | 81.54 |
| 11 | 5.404 | 0.40 | 1.84666 | 23.78 |
| 12 | 2.915 | 0.35 | | |
| 13* | 5.541 | 1.36 | 1.53071 | 55.69 |
| 14* | −20.888 | Variable | | |
| 15* | −30.069 | 0.83 | 1.53071 | 55.69 |
| 16* | −4.382 | 0.33 | | |
| 17* | −3.648 | 0.40 | 1.53071 | 55.69 |
| 18* | 11.604 | Variable | | |
| 19* | 9.134 | 0.90 | 1.53071 | 55.69 |
| 20* | −21.902 | 0.30 | | |
| 21 | ∞ | 0.30 | 1.51633 | 64.14 |
| 22 | ∞ | 0.70 | | |
| Image plane | ∞ | | | |

Aspherical surface data

1st surface k = 0.000
A4 = 8.10887e−04, A6 = −1.80526e−05
2nd surface k = −0.045
A4 = −1.05933e−03, A6 = 3.61669e−05, A8 = −1.25850e−05
8th surface k = −3.915
A4 = 7.12568e−03, A6 = −6.95418e−04, A8 = 5.50787e−05,
A10 = −3.59307e−06
9th surface k = −5.000
A4 = −4.19834e−04, A6 = −2.98233e−05, A8 = −1.08480e−05,
A10 = −1.12836e−07
13th surface k = 0.000
A4 = 1.92644e−03, A6 = 3.92004e−04
14th surface k = −5.000
A4 = 3.71789e−03, A6 = 4.37689e−04
15th surface k = 0.000
A4 = 1.26632e−03, A6 = 3.69974e−04

16th surface k = 0.000
A4 = 2.73328e−03, A6 = 6.50183e−04

17th surface k = 0.000
A4 = 1.51907e−03, A6 = 7.73469e−04

18th surface k = 0.000
A4 = −9.06073e−04, A6 = 2.33247e−04, A8 = 1.92356e−05

19th surface k = 0.000
A4 = 5.00000e−04, A6 = −1.00000e−04, A8 = 6.33643e−05

20th surface k = 0.000
A4 = 5.00000e−04, A6 = 1.00000e−04, A8 = 8.08672e−05

Zoom data

|  | WE | ST | TE |
|---|---|---|---|
| Focal length | 3.50 | 5.88 | 9.97 |
| FNO. | 2.42 | 3.46 | 4.69 |
| Angle of field 2ω | 68.52 | 42.17 | 25.24 |
| fb (in air) | 1.21 | 1.18 | 1.20 |
| Lens total length (in air) | 25.91 | 25.88 | 25.90 |
| d6 | 7.37 | 4.26 | 0.75 |
| d14 | 2.21 | 0.89 | 2.00 |
| d18 | 1.11 | 5.53 | 7.94 |

Unit focal length

| f1 = −6.96 | f2 = 6.30 | f3 = −12.17 | f4 = 12.27 |
|---|---|---|---|

Example 10

Unit mm

Surface data

| Surface no. | r | d | nd | vd |
|---|---|---|---|---|
| Object plane | ∞ | ∞ | | |
| 1 | −68.014 | 0.50 | 1.72916 | 54.68 |
| 2 | 3.612 | 1.08 | | |
| 3 | ∞ | 4.60 | 1.88300 | 40.80 |
| 4 | ∞ | 0.18 | | |
| 5* | 116.222 | 0.61 | 2.10205 | 16.77 |
| 6* | −52.235 | Variable | | |
| 7 (stop) | ∞ | −0.50 | | |
| 8* | 4.202 | 1.54 | 1.58313 | 59.38 |
| 9* | −18.780 | 0.05 | | |
| 10 | 3.681 | 1.57 | 1.49700 | 81.54 |
| 11 | −8.996 | 0.40 | 1.91082 | 35.25 |
| 12 | 2.675 | 0.26 | | |
| 13 | 3.864 | 1.49 | 1.53367 | 55.82 |
| 14* | −5.133 | Variable | | |
| 15 | −14.626 | 0.40 | 1.53367 | 55.82 |
| 16 | 4.801 | Variable | | |
| 17* | −7.442 | 1.00 | 1.63493 | 23.90 |
| 18* | −2.252 | 0.05 | | |
| 19 | ∞ | 0.30 | 1.51633 | 64.14 |
| 20 | ∞ | 0.70 | | |
| Image plane | ∞ | | | |

Aspherical surface data

5th surface k = −10.000
A4 = −1.60220e−04, A6 = 3.31764e−05

6th surface k = 0.000
A4 = −6.22842e−04, A6 = 2.77701e−05

8th surface k = −1.410
A4 = 1.70738e−03, A6 = 5.38227e−05

9th surface k = 5.000
A4 = 7.57941e−04, A6 = 7.50268e−06

14th surface k = 3.458
A4 = 6.59706e−03, A6 = −6.28100e−06

17th surface k = 0.000
A4 = 4.69856e−03, A6 = 6.69429e−04

18th surface k = −5.000
A4 = −2.41366e−03, A6 = 1.03144e−03

Zoom data

|  | WE | ST | TE |
|---|---|---|---|
| Focal length | 3.40 | 5.73 | 9.68 |
| FNO. | 2.37 | 3.41 | 4.66 |
| Angle of field 2ω | 71.14 | 42.64 | 25.65 |
| fb (in air) | 0.98 | 0.92 | 0.94 |
| Lens total length (in air) | 24.26 | 24.20 | 24.22 |
| d6 | 6.71 | 3.89 | 0.75 |
| d14 | 1.52 | 1.10 | 1.82 |
| d16 | 1.87 | 5.11 | 7.53 |

Unit focal length

| f1 = −6.36 | f2 = 5.40 | f3 = −6.72 | f4 = 4.73 |
|---|---|---|---|

Example 11

Unit mm

Surface data

| Surface no. | r | d | nd | vd |
|---|---|---|---|---|
| Object plane | ∞ | ∞ | | |
| 1 | −176.066 | 0.50 | 1.72916 | 54.68 |
| 2* | 3.728 | 1.02 | | |
| 3 | ∞ | 4.90 | 1.88300 | 40.80 |
| 4 | ∞ | 0.10 | | |
| 5 | 6.817 | 0.80 | 1.94595 | 17.98 |
| 6 | 8.254 | Variable | | |
| 7 (stop) | ∞ | −0.50 | | |
| 8* | 4.518 | 1.31 | 1.53367 | 55.82 |
| 9* | −19.193 | 0.17 | | |
| 10* | 6.167 | 1.66 | 1.53367 | 55.82 |
| 11* | −9.026 | 0.12 | | |
| 12* | 104.406 | 0.40 | 1.63493 | 23.90 |
| 13* | 3.032 | 0.61 | | |
| 14* | 8.843 | 0.56 | 1.53367 | 55.82 |
| 15* | −29.045 | Variable | | |
| 16 | −62.855 | 0.40 | 1.53367 | 55.82 |

Unit mm

| 17 | 5.104 | Variable | | |
| 18 | −24.926 | 0.91 | 1.63493 | 23.90 |
| 19* | −4.361 | 0.95 | | |
| 20 | ∞ | 0.30 | 1.51633 | 64.14 |
| 21 | ∞ | 0.70 | | |
| Image plane | ∞ | | | |

Aspherical surface data

2nd surface k = −0.880
A4 = 9.35994e−04, A6 = 3.10895e−05, A8 = 2.28289e−06

8th surface k = −3.521
A4 = 3.46267e−03, A6 = −1.47971e−05

9th surface k = 3.630
A4 = 3.11008e−03, A6 = 6.74965e−05

10th surface k = 0.000
A4 = 2.22297e−03, A6 = −6.71249e−05

11th surface k = 0.000
A4 = −1.72406e−03, A6 = 4.12793e−05

12th surface k = 0.000
A4 = −4.64416e−03, A6 = −4.53966e−05

13th surface k = 0.000
A4 = 3.71342e−03, A6 = 1.58295e−05

14th surface k = 0.000
A4 = 1.13143e−02, A6 = −2.00133e−05

15th surface k = −2.075
A4 = 7.54284e−03, A6 = 2.61835e−05

19th surface k = −5.000
A4 = −1.17158e−03, A6 = 9.60978e−06

Zoom data

| | WE | ST | TE |
|---|---|---|---|
| Focal length | 3.49 | 5.85 | 9.95 |
| FNO. | 2.36 | 3.30 | 4.53 |
| Angle of field 2ω | 69.59 | 41.72 | 24.81 |
| fb (in air) | 1.88 | 1.82 | 1.80 |
| Lens total length (in air) | 24.85 | 24.79 | 24.77 |
| d6 | 6.94 | 3.89 | 0.75 |
| d15 | 1.43 | 1.16 | 2.51 |
| d17 | 1.63 | 4.95 | 6.74 |

Unit focal length

| f1 = −6.42 | f2 = 5.52 | f3 = −8.83 | f4 = 8.18 |

Next, the values of conditional expressions (1) to (17) in each example are shown below.

| Conditional expressions | Example 1 | Example 2 | Example 3 |
|---|---|---|---|
| (1) $\phi_{1o}/\phi_{2o}$ | 1.44 | 1.42 | 1.45 |
| (2) $n_{3p} - n_{3n}$ | 0.00 | 0.00 | 0.00 |
| (3) $\Delta_{2G}/\phi_{1o}$ | 2.10 | 2.12 | 2.11 |
| (4) $(r_{3oi} - r_{3io})/(r_{3oi} + r_{3io})$ | 0.08 | 0.19 | 0.06 |
| (5) $n_{ave}$ | 1.60 | 1.60 | 1.62 |
| (6) $\Delta_{3G}/\Delta_{2G}$ | 0.97 | 0.94 | 0.90 |
| (7) $f_{1i}/f_{1o}$ | −5.51 | −5.48 | −5.77 |
| (8), (8-1) $f_1/(f_w \times f_t)^{1/2}$ | −1.15 | −1.12 | −1.13 |
| (9) $f_2/(f_w \times f_t)^{1/2}$ | 1.05 | 1.02 | 1.07 |
| (10) $(Fno_w \times Fno_t)^{1/2}/(f_w \times f_t)^{1/2}$ | 0.58 | 0.59 | 0.58 |
| (11), (11-1) $(r_{1po} + r_{1pi})/(r_{1po} - r_{1pi})$ | −4.62 | −4.39 | −5.3 |
| (12) $vd_{1n} - vd_{1p}$ | 36.06 | 33.72 | 36.06 |
| (13) $((\phi_{1F}/2) - D_{rR})/(D_{pri}/2)$ | 1.14 | 1.07 | 1.15 |
| (14) $f_3/(f_w \times f_t)^{1/2}$ | −1.45 | −1.47 | −1.95 |
| (15) $f_{1o}/f_t$ | −0.47 | −0.46 | −0.48 |
| (16) $f_3/f_4$ | −0.81 | −0.87 | −1.08 |
| (17) $|f_{1o}/f_w|$ | 1.34 | 1.30 | 1.36 |

| Conditional expressions | Example 4 | Example 5 | Example 6 |
|---|---|---|---|
| (1) $\phi_{1o}/\phi_{2o}$ | 1.46 | 1.44 | 1.47 |
| (2) $n_{3p} - n_{3n}$ | 0.10 | 0.10 | 0.00 |
| (3) $\Delta_{2G}/\phi_{1o}$ | 2.10 | 2.13 | 2.12 |
| (4) $(r_{3oi} - r_{3io})/(r_{3oi} + r_{3io})$ | −0.07 | −0.13 | 0.09 |
| (5) $n_{ave}$ | 1.62 | 1.62 | 1.59 |
| (6) $\Delta_{3G}/\Delta_{2G}$ | 0.90 | 0.90 | 0.96 |
| (7) $f_{1i}/f_{1o}$ | −6.12 | −5.95 | −5.77 |
| (8), (8-1) $f_1/(f_w \times f_t)^{1/2}$ | −1.11 | −1.08 | −1.14 |
| (9) $f_2/(f_w \times f_t)^{1/2}$ | 1.06 | 1.04 | 1.07 |
| (10) $(Fno_w \times Fno_t)^{1/2}/(f_w \times f_t)^{1/2}$ | 0.58 | 0.60 | 0.58 |
| (11), (11-1) $(r_{1po} + r_{1pi})/(r_{1po} - r_{1pi})$ | −6.3 | −5.36 | −5.33 |
| (12) $vd_{1n} - vd_{1p}$ | 36.06 | 37.05 | 31.31 |
| (13) $((\phi_{1F}/2) - D_{rR})/(D_{pri}/2)$ | 1.10 | 1.07 | 1.20 |
| (14) $f_3/(f_w \times f_t)^{1/2}$ | −2.14 | −2.19 | −2.14 |
| (15) $f_{1o}/f_t$ | −0.49 | −0.46 | −0.48 |
| (16) $f_3/f_4$ | −1.17 | −1.05 | −1.04 |
| (17) $|f_{1o}/f_w|$ | 1.38 | 1.31 | 1.37 |

| Conditional expressions | Example 7 | Example 8 | Example 9 |
|---|---|---|---|
| (1) $\phi_{1o}/\phi_{2o}$ | 1.47 | 1.47 | 1.45 |
| (2) $n_{3p} - n_{3n}$ | 0.00 | 0.00 | 0.00 |
| (3) $\Delta_{2G}/\phi_{1o}$ | 2.26 | 1.97 | 2.02 |
| (4) $(r_{3oi} - r_{3io})/(r_{3oi} + r_{3io})$ | 0.03 | 0.077 | 0.091 |
| (5) $n_{ave}$ | 1.56 | 1.59 | 1.57 |
| (6) $\Delta_{3G}/\Delta_{2G}$ | 0.99 | 0.99 | 1.03 |
| (7) $f_{1i}/f_{1o}$ | −5.67 | −6.02 | −5.73 |
| (8), (8-1) $f_1/(f_w \times f_t)^{1/2}$ | −1.17 | −1.15 | −1.18 |
| (9) $f_2/(f_w \times f_t)^{1/2}$ | 1.13 | 1.05 | 1.07 |
| (10) $(Fno_w \times Fno_t)^{1/2}/(f_w \times f_t)^{1/2}$ | 0.61 | 0.58 | 0.57 |
| (11), (11-1) $(r_{1po} + r_{1pi})/(r_{1po} - r_{1pi})$ | −4.74 | −5.74 | −5.22 |
| (12) $vd_{1n} - vd_{1p}$ | 31.31 | 31.31 | 31.31 |
| (13) $((\phi_{1F}/2) - D_{rR})/(D_{pri}/2)$ | 1.19 | 1.14 | 1.12 |
| (14) $f_3/(f_w \times f_t)^{1/2}$ | −2.25 | −1.98 | −2.06 |
| (15) $f_{1o}/f_t$ | −0.48 | −0.49 | −0.49 |
| (16) $f_3/f_4$ | −1.2 | −0.98 | −0.99 |
| (17) $|f_{1o}/f_w|$ | 1.38 | 1.40 | 1.40 |

| Conditional expressions | Example 10 | Example 11 |
|---|---|---|
| (1) $\phi_{1o}/\phi_{2o}$ | 1.33 | 1.45 |
| (2) $n_{3p} - n_{3n}$ | 0.10 | 0.10 |
| (3) $\Delta_{2G}/\phi_{1o}$ | 2.13 | 2.01 |
| (4) $(r_{3oi} - r_{3io})/(r_{3oi} + r_{3io})$ | −4.63 | −1.52 |
| (5) $n_{ave}$ | 1.62 | 1.57 |
| (6) $\Delta_{3G}/\Delta_{2G}$ | 0.949 | 0.82 |
| (7) $f_{1i}/f_{1o}$ | −6.99 | −6.51 |
| (8), (8-1) $f_1/(f_w \times f_t)^{1/2}$ | −1.110 | −1.09 |
| (9) $f_2/(f_w \times f_t)^{1/2}$ | 0.943 | 0.94 |
| (10) $(Fno_w \times Fno_t)^{1/2}/(f_w \times f_t)^{1/2}$ | 0.58 | 0.55 |
| (11), (11-1) $(r_{1po} + r_{1pi})/(r_{1po} - r_{1pi})$ | 0.38 | −10.48 |
| (12) $vd_{1n} - vd_{1p}$ | 37.91 | 36.70 |
| (13) $((\phi_{1F}/2) - D_{rR})/(D_{pri}/2)$ | 1.13 | 1.05 |
| (14) $f_3/(f_w \times f_t)^{1/2}$ | −1.173 | −1.5 |
| (15) $f_{1o}/f_t$ | −0.485 | −0.5 |
| (16) $f_3/f_4$ | −1.421 | −1.08 |
| (17) $|f_{1o}/f_w|$ | 1.38 | 1.43 |

(Information Processing Apparatus)

It is possible to install the zoom lens according to the present invention which has been described above, or an image pickup apparatus in which the zoom lens has been used, in an information processing apparatus such as a portable electronic equipment. A digital camera, a PC (personal computer), and a portable telephone as a portable electronic equipment are available as such information processing apparatus. However, the present invention is not restricted to the abovementioned portable electronic equipment. Moreover, the information processing apparatus according to the present invention is not restricted to portable electronic apparatuses.

Figure 33:
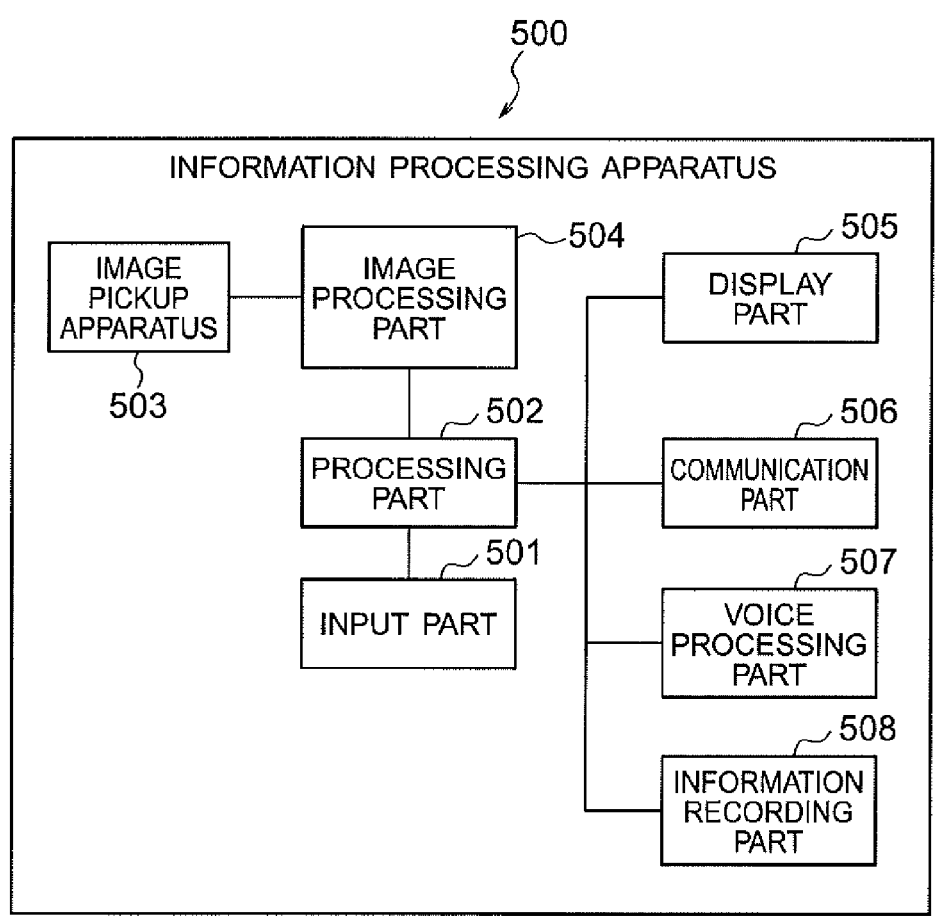
FIG. 33 is a block diagram showing a configuration of the information processing apparatus.

A block diagram of such information processing apparatus is shown in FIG. 33. An information processing apparatus 500 includes an input part 501, a processing part 502, an image pickup apparatus 503, an image processing part 504, and a display part 505. Moreover, as it has been shown in the diagram, it is preferable that the information processing apparatus further includes parts such as a communication part 506, voice (audio) processing part 507, and an information recording part 508.

The input part 501 is a part from where the information processing apparatus 500 is operated. The processing part 502 carries out processing of information at least from the input part 501. The image pickup apparatus 503 acquires image information based on the information from the processing part 502. The image processing part 504 carries out processing of the image information which the image pickup apparatus 503 has acquired. The display part 505 displays an image which has been subjected to processing. The image pickup apparatus 503 has the zoom lens according to the present invention installed therein.

Furthermore, the communication part 506 is arranged such that the image information which has been acquired by the image pickup apparatus 503 is transmittable. Moreover, the voice processing part 507 is a part which processes voice information, and the information recording part 508 records image information and voice information which have been acquired.

(Digital Camera)

Figure 26:
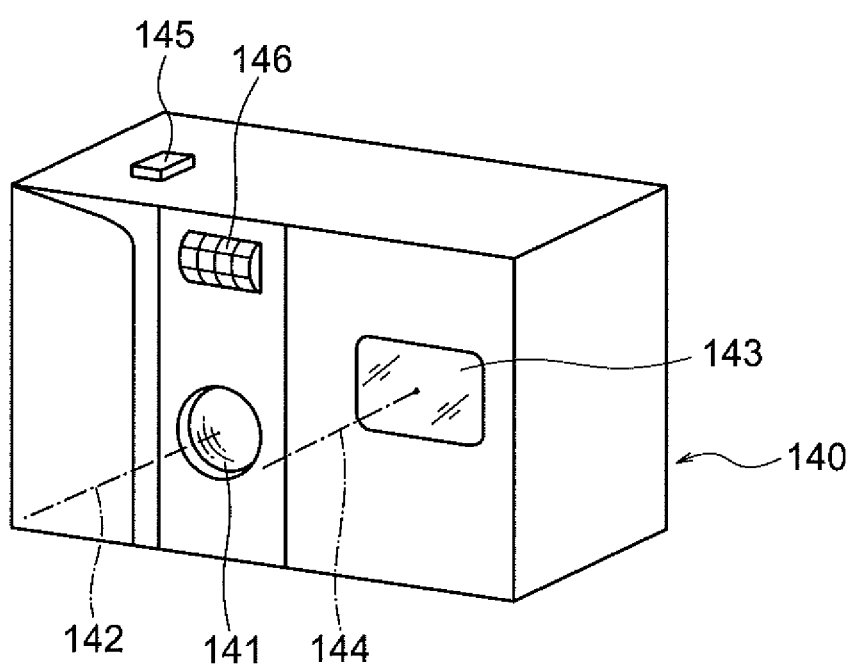
FIG. 26 is a front perspective view showing an appearance of a digital camera 140 in which, the zoom lens according to the present invention has been incorporated.
Figure 27:
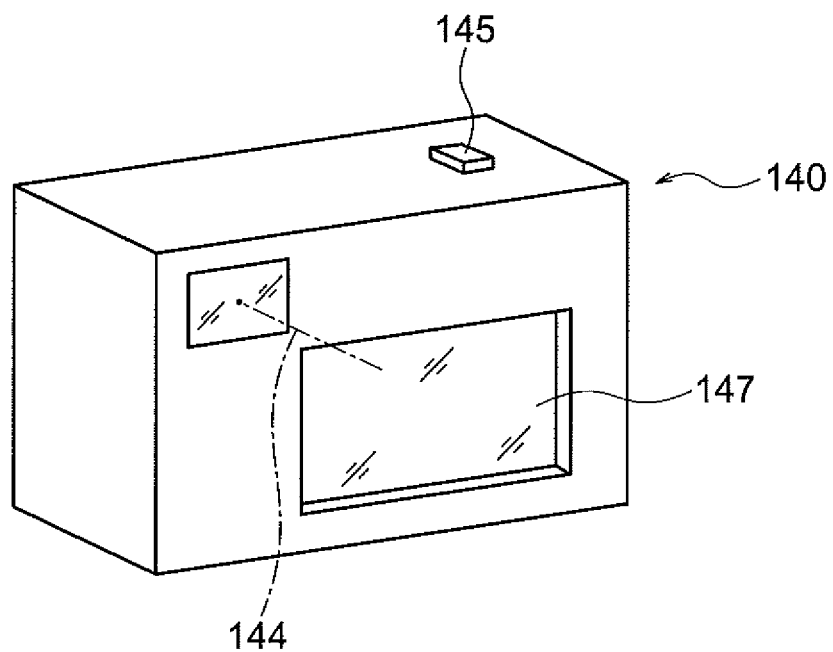
FIG. 27 is a rear perspective view of the digital camera 140.
Figure 28:
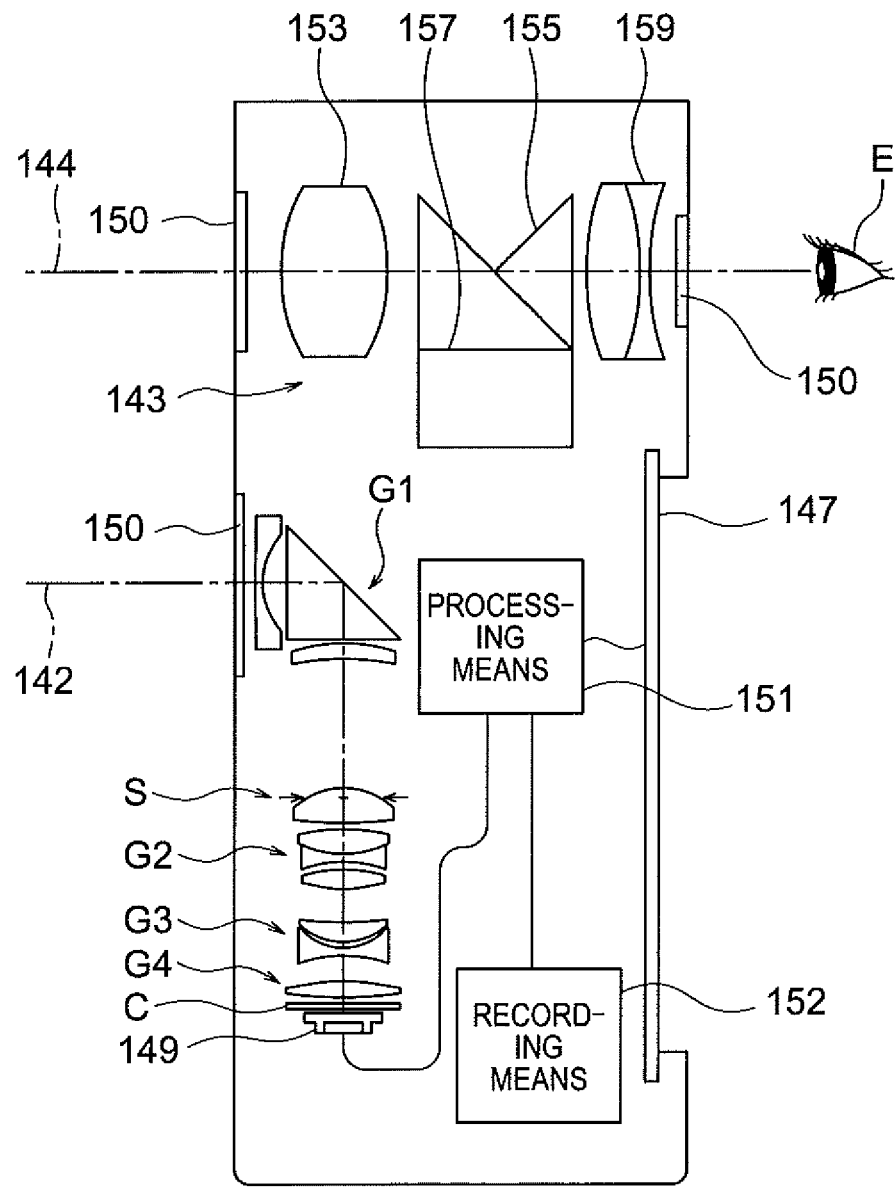
FIG. 28 is a cross-sectional view showing an optical arrangement in the digital camera 140.

FIG. 26 to FIG. 28 are conceptual diagrams of a structure of a digital camera according to the present invention in which a zoom lens described above is incorporated in a photographic optical system 141. FIG. 26 is a front perspective view showing an appearance of a digital camera 140, FIG. 27 is a rear view of the same, and FIG. 28 is a schematic cross-sectional view showing a structure of the digital camera 140.

The digital camera 140, in a case of this example, includes the photographic optical system 141 having a photographic optical path 142, a finder optical system 143 having a finder optical path 144, a shutter button 145, a flash 146, a liquid-crystal display monitor 147. When the shutter button 145 disposed on an upper portion of the digital camera 140 is pressed, in synchronization with the pressing of the shutter button 145, a photograph is taken by the photographic optical system 141 such as the zoom lens system in the first example. An object image formed by the photographic optical system 141 is formed on an image pickup surface of a CCD 149 via a cover glass C, near infrared cut filter and an optical low pass filter (not shown in the diagram).

The object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

In the digital camera 140, the shutter button 145 corresponds to the input part 501 of the information processing apparatus 500, the photographic optical system 141 and the CCD 149 correspond to the image pickup apparatus 503, the processing means 151 corresponds to the image processing part 504, and the liquid-crystal display monitor 147 corresponds to the display part 505. Moreover, a CPU (central processing unit) which controls throughout the digital camera 140 corresponds to the processing part 502, and the recording means 152 corresponds to the information recording part 508.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 55, an eyepiece optical system 159 which guides an erected image to a viewer's eyeball is disposed. A cover member 150 is disposed on an entrance side of the photographic optical system 141 and the finder objective optical system 153, and an emergence side of the eyepiece optical system 159.

In the digital camera 140 structured in such manner, since the photographic optical system 141 has a large aperture and a high optical performance, it is possible to realize the inexpensive digital camera which has a high performance of which thickness of the depth direction is extremely thin.

Also, in the example of FIG. 28, while a plane parallel plate is disposed as a cover member 150, the plane parallel plate may be omitted.

(Personal Computer)

Figure 29:
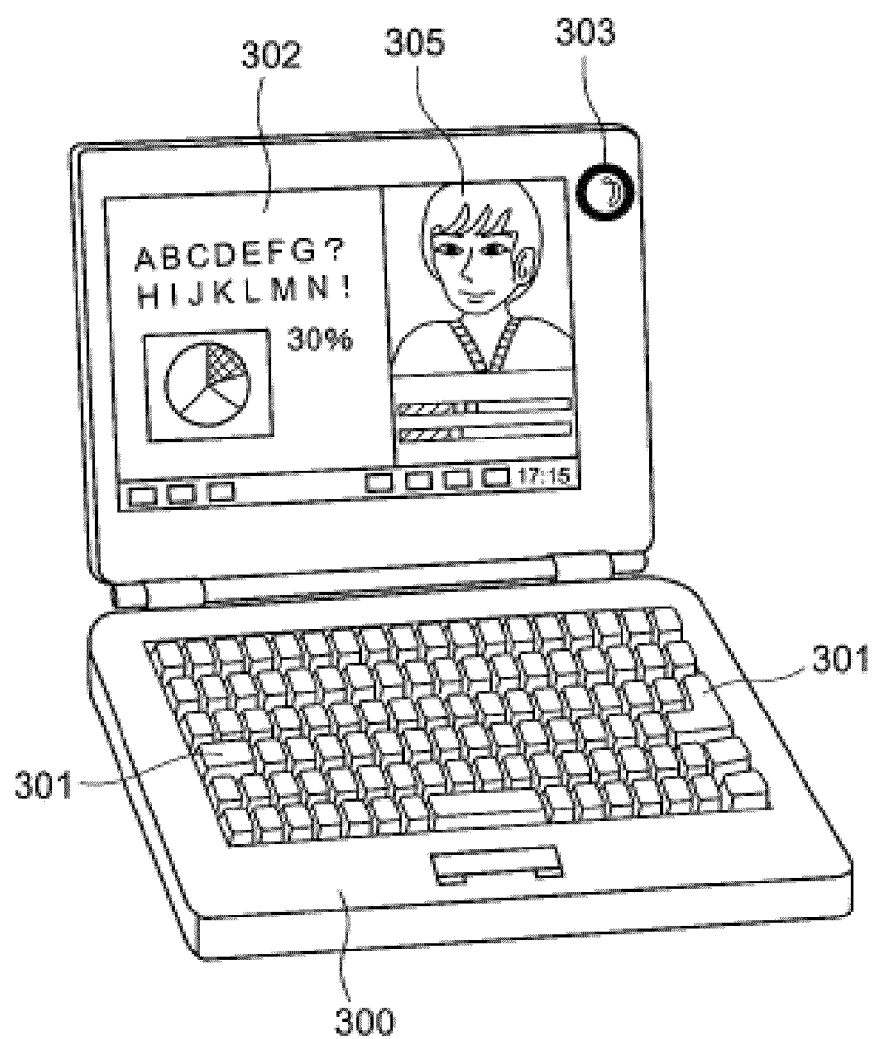
FIG. 29 is a front perspective view of a state in which, a cover of a personal computer 300 which is an example of an information processing apparatus in which, the zoom lens according to the present invention has been built-in as an objective optical system, is open.
Figure 30:
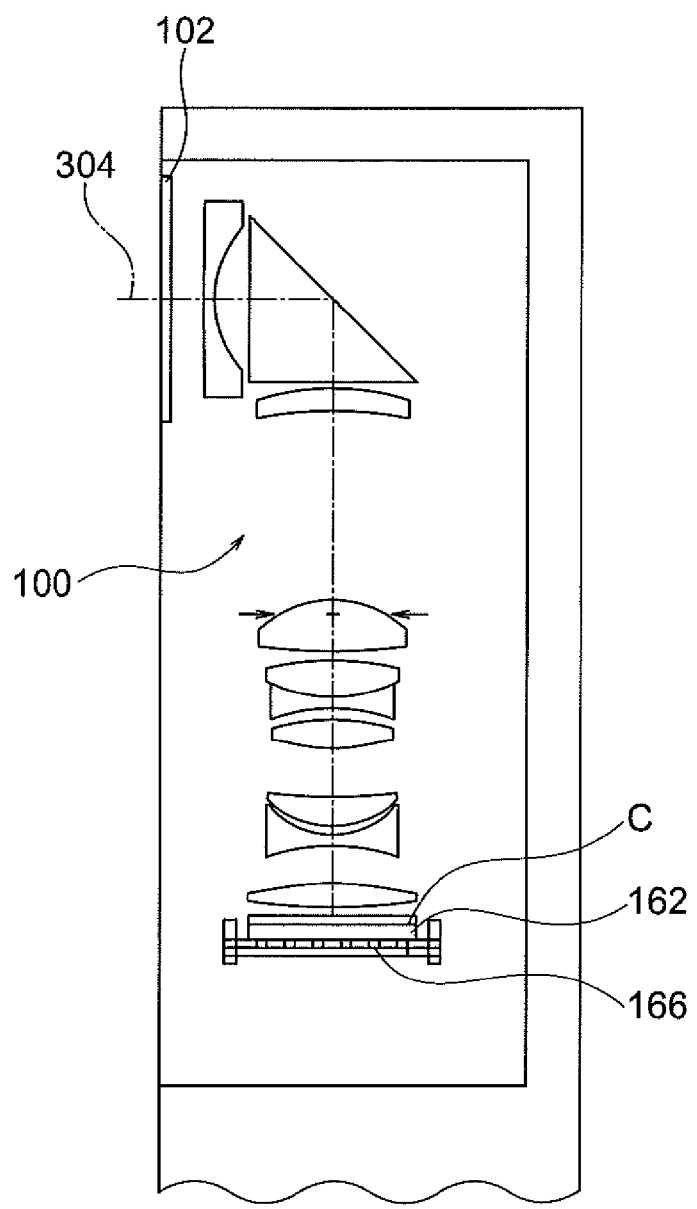
FIG. 30 is a cross-sectional view of a photographic optical system 303 of the personal computer 300.
Figure 31:
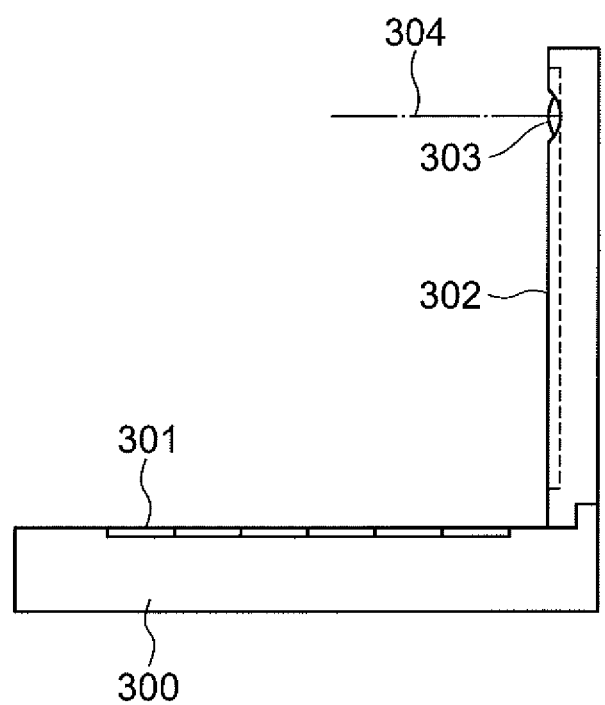
FIG. 31 is a side view of the personal computer 300.

Next, a personal computer which is an example of an information processing apparatus with a built-in zoom lens as an objective optical system is shown in FIG. 29 to FIG. 31. FIG. 29 is a frontward perspective view of a personal computer 300 with its cover opened, FIG. 30 is a cross-sectional view of a photographic optical system 303 of the personal computer 300, and FIG. 31 is a side view of FIG. 29. As it is shown in FIG. 29 to FIG. 31, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first example for instance, and an electronic image pickup element chip 162 which receives an image. These are built into the personal computer 300. Moreover, a cover glass C is disposed between the objective optical system 100 and the electronic image pickup element chip 162.

At a front end of a mirror frame, a cover glass 102 for protecting the objective optical system 100 is disposed. An object image received at the electronic image pickup element chip 162 is input to a processing means of the personal computer 300 via a terminal 166. Further, the object image is displayed as an electronic image on the monitor 302 finally. In FIG. 29, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

In the personal computer 300, the keyboard 301 corresponds to the input part 501 of the information processing apparatus 500, the objective optical system 100 and the electronic image pickup element chip 162 correspond to the image pickup apparatus 503, and the monitor 302 corresponds to the display part 505. Moreover, a CPU (central processing unit) which is built-in corresponds to the processing part 502 and image processing part 504.

(Portable Telephon)

Next, a telephone which is an example of an information processing apparatus in which the zoom lens of the present invention is built-in as a photographic optical system, particularly a portable telephone which is easy to carry is shown in FIG. 32A, FIG. 32B, and FIG. 32C. FIG. 32A is a front view of a portable telephone 400, FIG. 32B is a side view of the portable telephone 400, and FIG. 32C is a cross-sectional view of a photographic optical system 405. As shown in FIG. 32A to FIG. 32C, the portable telephone 400 includes a microphone section 401 for inputting a voice of the operator as information, a speaker section 402 for outputting a voice of the communication counterpart, an input button 403 for the operator to input information, a monitor 404 for displaying a photographic image of the operator himself and the communication counterpart, and information such as a telephone number, the photographic optical system 405, an antenna 406 for carrying out a transmission and a reception of communication electric waves, and a processing means (CPU 408 in FIG. 34) for carrying out processing of image information, communication information, and input signal etc. Here, the monitor 404 is a liquid-crystal display device. Moreover, in the diagram, a position of disposing each structural element is not restricted in particular to a position in the diagram.

This photographic optical system 405 has an objective optical system 212 which includes the zoom lens (not shown in the diagram) according to the present invention, and is disposed in a photographic optical path 407, and an image pickup element chip 162 which receives an object image. These are built into the portable telephone 400. Moreover, a cover glass C is disposed between the objective optical system 212 and the electronic image pickup element chip 162.

Here, optical low pass filter (not shown in the diagram) is adhered on the electronic image pickup element chip 162 additionally, and is formed integrally as an image pickup unit 160. Furthermore, the image pickup unit 160 becomes available to attach to a rear end of a mirror frame 213 of the objective optical system 212 by fitting one touch. Therefore, an alignment of a center and an adjustment of a surface distance are unnecessary between the objective optical system 212 and the electronic image pickup element chip 162, and assembling becomes easy. Moreover, at a front end of a mirror frame 213 (not shown in the diagram), a cover glass 104 for protecting the objective optical system 100 is disposed. Also, in the mirror frame 213, a drive mechanism of the zoom lens and the like are omitted in the diagram.

An object image received at the electronic image pickup element chip 162 is input to an image processing means which is not shown in the diagram, via a terminal. Further, the object image displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted. Also, the electronic image pickup element chip 162 may have not only a function to receive a light from an object and convert to an image data but also a function to carry out a simple processing using the image data.

Figure 34:
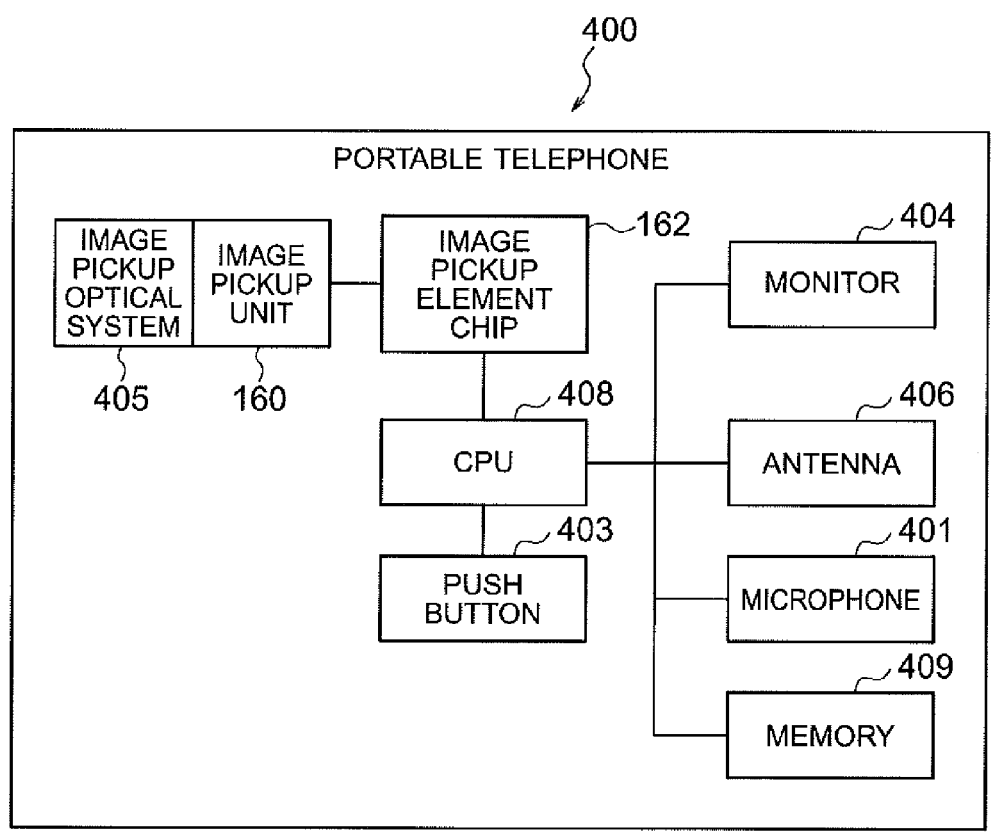
FIG. 34 is a block diagram showing a configuration of a processing section of a portable telephone.

In the portable telephone 400, the push buttons 403 corresponds to the input part 501 of the information processing apparatus, the image pickup optical system 405 and the image pickup unit 160 correspond to the image pickup apparatus 503, the image pickup element chip 162 corresponds to the image processing part 504, the monitor 404 corresponds to the display part 505, the antenna 406 corresponds to the communication part 506, and the microphone part 401 corresponds to the voice processing part 507. Moreover, the CPU (central processing unit) 408 which controls the portable telephone 400 corresponds to the processing part 502, and the memory 409 which is built-in corresponds to the information recording part 508. A block diagram of the portable telephone 400 is shown in FIG. 34.

As it has been described above, the zoom lens according to the present invention, and the image pickup apparatus in which the zoom lens has been used are useful from a point that the aperture of the optical system has been made large, while being a small-size and slim with an improved imaging performance.

What is claimed is:

1. A zoom lens comprising in order from an object side:
a first lens group having a negative refractive power;
a second lens group having a positive refractive power;
a third lens group having a negative refractive power; and
a fourth lens group having a positive refractive power, wherein:
when zooming, the first lens group is fixed, the second lens group moves, the third lens group moves, and the fourth lens group is fixed,
the first lens group comprises in order from the object side, a negative lens, a reflecting optical element, and a positive lens,
the positive lens is a single lens, and
an object-side surface of the positive lens and an image-side surface of the positive lens are in contact with air.

2. The zoom lens according to claim 1, wherein the second lens group comprises in order from the object side, an aperture stop, a positive lens, a cemented lens having a negative refractive power, and a positive lens.

3. The zoom lens according to claim 1, wherein the following conditional expression is satisfied:

$$1.1 \leq \phi_{1o}/\phi_{2o} \leq 1.8$$

where,
$\phi_{1o}$ denotes half of an effective aperture at a lens surface nearest to the object side in the first lens group, and
$\phi_{2o}$ denotes half of an effective aperture at a lens surface nearest to the object side in the second lens group.

4. The zoom lens according to claim 1, wherein
the third lens group includes a positive lens and a negative lens, and
the following conditional expression is satisfied:

$$0 \leq n_{3p} < n_{3n} \leq 0.20$$

where,
$n_{3p}$ denotes a refractive index for a d-line of the positive lens in the third lens group, and
$n_{3n}$ denotes a refractive index for a d-line of the negative lens in the third lens group.

5. The zoom lens according to claim 1, wherein the following conditional expression is satisfied:

$$1.8 \leq \Delta_{2G}/\phi_{1o} \leq 2.6$$

where,
$\Delta_{2G}$ denotes an amount of movement of the second lens group when moved from a wide angle end to a telephoto end, and
$\phi_{1o}$ denotes half of an effective aperture at a lens surface nearest to the object side in the first lens group.

6. The zoom lens according to claim 1, wherein
the third lens group includes a lens on the object side and a lens on an image side, and
the following conditional expression is satisfied:

$$-0.4 \leq (r_{3oi}-r_{3io})/(r_{3oi}+r_{3io}) \leq 0.4$$

where,
$r_{3oi}$ denotes a paraxial radius of curvature of an image-side surface of the lens on the object side in the third lens group, and
$r_{3io}$ denotes a paraxial radius of curvature of an object-side surface of the lens on the image side in the third lens group.

7. The zoom lens according to claim 1, wherein the following conditional expression is satisfied:

$$n_{ave} \leq 1.75$$

where,
$n_{ave}$ denotes an average value of a refractive index calculated from all lenses positioned on an image side of the first lens group.

8. The zoom lens according to claim 1, wherein the following conditional expression is satisfied:

$$0.7 \leq \Delta_{3G}/\Delta_{2G} \leq 1.2$$

where,
$\Delta_{2G}$ denotes an amount of movement of the second lens group when moved from a wide angle end to a telephoto end, and
$\Delta_{3G}$ denotes an amount of movement of the third lens group when moved from the wide angle end to the telephoto end.

9. The zoom lens according to claim 1, wherein the following conditional expression is satisfied:

$$-10 \leq f_{1i}/f_{1o} \leq -2$$

where,
$f_{1o}$ denotes a focal length of a lens on the object side in the first lens group, and
$f_{1i}$ denotes a focal length of a lens on an image side in the first lens group.

10. The zoom lens according to claim 1, wherein the following conditional expression is satisfied:

$$-1.5 \leq f_1/(f_w \times f_t)^{1/2} \leq -0.7$$

where,
$f_1$ denotes a focal length of the first lens group,
$f_w$ denotes a focal length of an overall zoom lens system at a wide angle end, and
$f_t$ denotes a focal length of the overall zoom lens system at a telephoto end.

11. The zoom lens according to claim 1, wherein the following conditional expression is satisfied:

$$0.5 \leq f_2/(f_w \times f_t)^{1/2} \leq 1.5$$

where,
$f_2$ denotes a focal length of the second lens group,
$f_w$ denotes a focal length of an overall zoom lens system at a wide angle end, and
$f_t$ denotes a focal length of the overall zoom lens system at a telephoto end.

12. The zoom lens according to claim 1, wherein the following conditional expression is satisfied:

$$0.53 \leq (Fno_w \times Fno_t)^{1/2}/(f_w \times f_t)^{1/2} \leq 0.65$$

Where,
$Fno_w$ denotes an F-number of the zoom lens at a wide angle end,
$Fno_t$ denotes an F-number of the zoom lens at a telephoto end,
$f_w$ denotes a focal length of an overall zoom lens system at the wide angle end, and
$f_t$ denotes a focal length of the overall zoom lens system at the telephoto end.

13. The zoom lens according to claim 1, wherein the fourth lens group includes one resin lens.

14. The zoom lens according to claim 1, wherein a diameter of an aperture stop is constant when zooming.

15. The zoom lens according to claim 1, wherein the following conditional expression is satisfied:

$$-20 \leq (r_{1po}+r_{1pi})/(r_{1po}-r_{1pi}) < -1.5$$

where,
$r_{1po}$ denotes a paraxial radius of curvature of an object-side surface of the positive lens in the first lens group, and
$r_{1pi}$ denotes a paraxial radius of curvature of an image-side surface of the positive lens in the first lens group.

16. The zoom lens according to claim 1, wherein the following conditional expression is satisfied:

$$0 < vd_{1n}-vd_{1p} < 30$$

where,
$vd_{1n}$ denotes Abbe's number for the negative lens in the first lens group, and
$vd_{1p}$ denotes Abbe's number for the positive lens in the first lens group.

17. The zoom lens according to claim 1, wherein the following conditional expression is satisfied:

$$1.0 < ((\phi_{1F}/2)-D_{rR})/(D_{pri}/2) < 1.3$$

where,
$\phi_{1F}$ denotes an effective aperture of a lens nearest to a surface of incidence of the reflecting optical element,
$D_{rR}$ denotes a distance from a lens nearest to an exit surface of the reflecting optical element up to the exit surface, which is a distance when measured parallel to an optical axis from a position of an effective aperture of the lens, and
$D_{pri}$ denotes an optical axial distance from the surface of incidence of the reflecting optical element up to the exit surface of the reflecting optical element.

18. The zoom lens according to claim 1, wherein following conditional expression is satisfied:

$$-5.0 \leq f_3/(f_w \times f_t)^{1/2} \leq -0.5$$

where,
$f_3$ denotes a focal length of the third lens group,
$f_w$ denotes a focal length of an overall zoom lens system at a wide angle end, and $f_t$ denotes a focal length of the overall zoom lens system at a telephoto end.

19. The zoom lens according to claim 1, wherein the second lens group comprises in order from the object side, an aperture stop, a positive lens, a positive lens, a negative lens, and a positive lens.

20. The zoom lens according to claim 1, wherein the following conditional expression is satisfied:

$$-1.5 \leq f_1/(f_w \times f_t)^{1/2} \leq -0.5$$

where, $f_1$ denotes a focal length of the first lens group, $f_w$ denotes a focal length of the overall zoom lens system at a wide angle end, and $f_t$ denotes a focal length of the overall zoom lens system at a telephoto end.

21. The zoom lens according to claim 1, wherein the following conditional expression is satisfied:

$$-1.0 \leq f_{1o}/f_t \leq -0.2$$

where, $f_{1o}$ denotes a focal length of a lens on the object side in the first lens group, and $f_t$ denotes a focal length of the overall zoom lens system at a telephoto end.

22. The zoom lens according to claim 1, wherein the following conditional expression is satisfied:

$$-2.0 \leq f_3/f_4 \leq -0.5$$

where, $f_3$ denotes a focal length of the third lens group, and $f_4$ denotes a focal length of the fourth lens group.

23. A zoom lens comprising in order from an object side:
a first lens group having a negative refractive power;
a second lens group having a positive refractive power;
a third lens group having a negative refractive power; and
a fourth lens group having a positive refractive power,
wherein:
when zooming, the first lens group is fixed, the second lens group moves, the third lens group moves, and the fourth lens group is fixed,
the first lens group comprises in order from the object side, a negative lens, a reflecting optical element, and a positive lens,
the positive lens is a single lens,
an object-side surface of the positive lens and an image-side surface of the positive lens are in contact with air,
one of the lens group which constitute the zoom lens includes a plurality of lens components,
at least one of the plurality of lens components is an integrated lens in which, a light transmission portion and a holding portion are integrated,
the holding portion is provided to an outer periphery of the light transmission portion, and has a protruding portion which is formed in a direction along a central axis of the light transmission portion, and
at least one of the plurality of lens components other than the integrated lens is held via the protruding portion.

24. The zoom lens according to claim 23, wherein all of the plurality of lens components, are integrated lenses.

25. The zoom lens according to claim 23, wherein the second lens group includes in order from the object side, an aperture stop, a positive lens, a positive lens, a negative lens, and a positive lens.

26. The zoom lens according to claim 23, wherein all the lenses in the second lens group are fitted to an adjacent lens by a flange.

27. The zoom lens according to claim 23, wherein all the lenses in the third lens group are fitted to an adjacent lens by a flange.

28. The zoom lens according to claim 23, wherein the following conditional expression which constitute $$|f_{1o}/f_w| < 1.8$$

where, $f_{1o}$ denotes a focal length of a lens on the object side in the first lens group, and $f_w$ denotes a focal length of the overall zoom lens system at a wide angle end.

29. The zoom lens according to claim 23, wherein the positive lens which is disposed in the first lens group is a meniscus lens having a convex surface directed toward the object side.

30. The zoom lens according to claim 23, wherein the following conditional expression is satisfied:

$$-20 < (r_{1po} + r_{1pi})/(r_{1po} - r_{1pi}) < -1.2$$

where, $r_{1po}$ denotes a paraxial radius of curvature of an object-side surface of the positive lens in the first lens group, and $r_{1pi}$ denotes a paraxial radius of curvature of an image-side surface of the positive lens in the first lens group.

31. An image pickup apparatus comprising:
a zoom lens according to claim 1, and
an image pickup element which has an image pickup surface.

32. An information processing apparatus comprising:
an input part which operates the information processing apparatus;
a processing part which carries out processing of information at least from the input part;
an image pickup apparatus which acquires image information based on information from the processing part;
an image processing part which carries out processing of the image information which the image pickup apparatus has acquired; and
a display part which displays an image which has been subjected to processing, wherein
the image pickup apparatus is the image pickup apparatus according to claim 31.

33. The information processing apparatus according to claim 32, comprising:
a communication part, wherein
the image information which has been acquired by the image pickup apparatus is transmittable.

34. The information processing apparatus according to claim 32, comprising:
an voice processing part; and
an information recording part.

35. The information processing apparatus according to claim 32, wherein the information processing apparatus is a portable electronic equipment.

36. An information processing apparatus comprising:
an input part which operates the information processing apparatus;
a processing part which carries out processing of information at least from the input part;
an image pickup apparatus which acquires image information based on information from the processing part;
an image processing part which carries out processing of the image information which the image pickup apparatus has acquired; and
a display part which displays an image which has been subjected to processing wherein the image pickup apparatus comprises the zoom lens according to claim 23 and an image pickup element which has an image pickup surface.

37. The information processing apparatus according to claim 36, comprising:
a communication part, wherein
the image information which has been acquired by the image pickup apparatus is transmittable.

38. The information processing apparatus according to claim 36, comprising:
an voice processing part; and
an information recording part.

39. A zoom lens comprising in order from an object side:
a first lens group having a negative refractive power;
a second lens group having a positive refractive power;
a third lens group having a negative refractive power; and
a fourth lens group having a positive refractive power,
wherein:
when zooming, the first lens group is fixed, the second lens group moves, the third lens group moves, and the fourth lens group is fixed, and
in order from the object side, the first lens group consists of a negative lens, a reflecting optical element, and a positive single lens.

\* \* \* \* \*